United States Patent
Kazi et al.

(10) Patent No.: US 9,277,011 B2
(45) Date of Patent: Mar. 1, 2016

(54) PROCESSING AN UNSUCCESSFUL WRITE REQUEST IN A DISPERSED STORAGE NETWORK

(71) Applicant: CLEVERSAFE, INC., Chicago, IL (US)

(72) Inventors: Asimuddin Kazi, Naperville, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 14/029,124

(22) Filed: Sep. 17, 2013

(65) Prior Publication Data

US 2014/0122924 A1     May 1, 2014

Related U.S. Application Data

(60) Provisional application No. 61/720,204, filed on Oct. 30, 2012.

(51) Int. Cl.
| | |
|---|---|
| *G06F 11/00* | (2006.01) |
| *H04L 29/08* | (2006.01) |
| *G06F 21/62* | (2013.01) |
| *G06F 11/10* | (2006.01) |

(52) U.S. Cl.
CPC ........ *H04L 67/1097* (2013.01); *G06F 21/6218* (2013.01); *G06F 11/1076* (2013.01)

(58) Field of Classification Search
CPC ............ H04L 67/1097; G06F 21/6218; G06F 11/1076
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Philip Guyton
(74) *Attorney, Agent, or Firm* — Garlick & Markison; Timothy W. Markison

(57) ABSTRACT

A method begins by a first device of a dispersed storage network (DSN), when a number of successful write requests of a set of write requests is equal to or greater than a threshold number but less than all, identifying one or more unsuccessful write requests of the set of write requests. The method continues with first device sending the one or more unsuccessful write requests to an auxiliary writing unit of the DSN. The method continues with the auxiliary writing unit, for an unsuccessful write request, identifying a storage unit of the DSN to produce an identified storage unit, sending the unsuccessful write request to the identified storage unit, and verifying successful execution of the unsuccessful write request by the identified storage unit.

16 Claims, 71 Drawing Sheets

(56) References Cited

U.S. PATENT DOCUMENTS

| | | |
|---|---|---|
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0112222 A1* | 5/2006 | Barrall .......................... 711/114 |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0126042 A1* | 5/2011 | Dhuse .......................... 714/5.11 |
| 2011/0191628 A1* | 8/2011 | Noguchi et al. ............... 714/6.2 |
| 2013/0283094 A1* | 10/2013 | Baptist et al. .................. 714/6.2 |
| 2013/0326264 A1* | 12/2013 | Resch ........................... 714/6.2 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): the Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed computing system 10

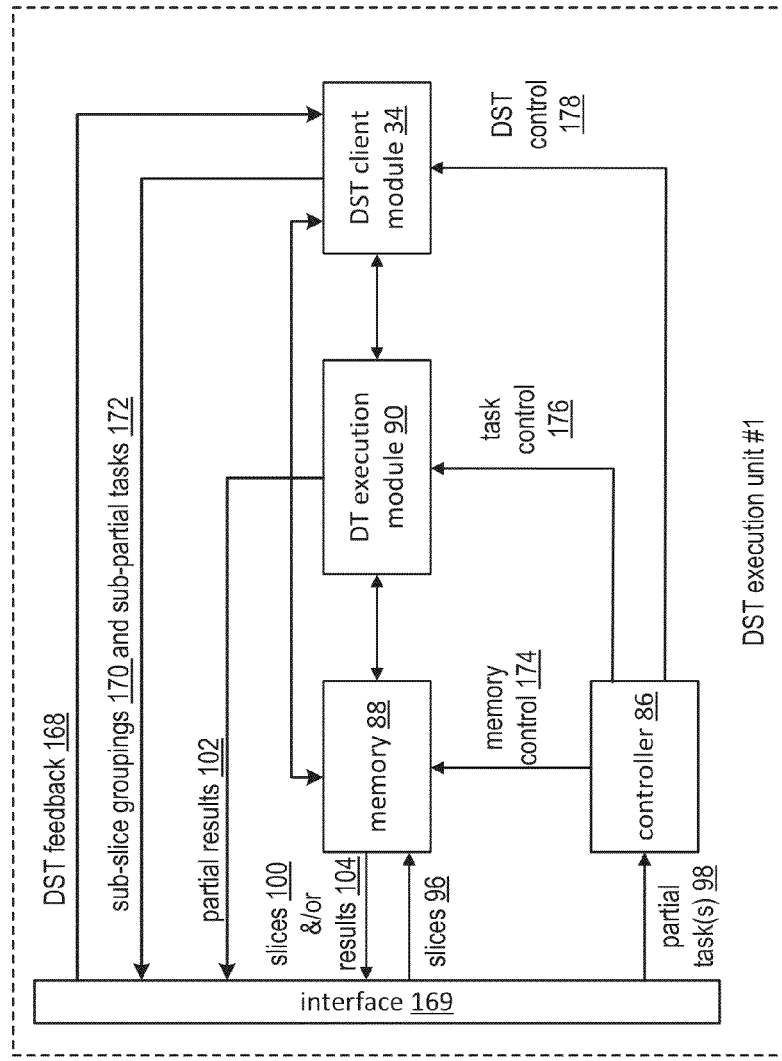
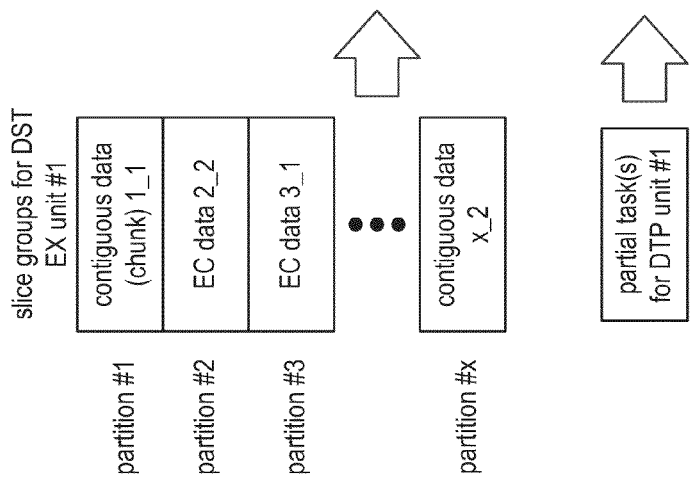
FIG. 11

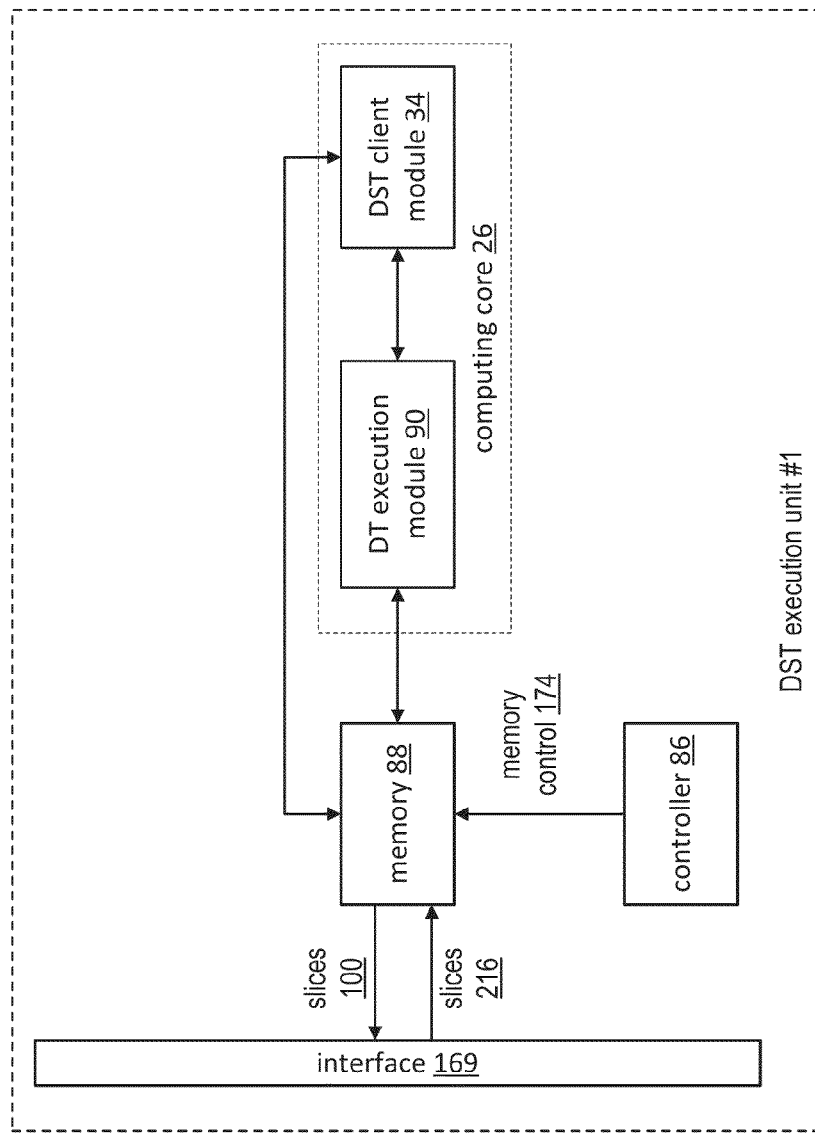
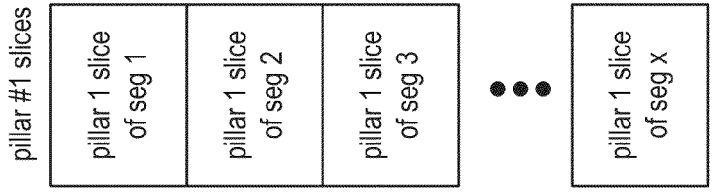
FIG. 24

| DST allocation info 242 | data partition info 320: data ID; | | Addr. info for each partition; | No. of partitions; | format conversion indication | | |
|---|---|---|---|---|---|---|---|
| | task execution info 322 | | | | intermediate result info 324 | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 2_3, 2_4, 2_5, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 2_3, 2_4, 2_5, & 5_2 | R3-2 | DST unit 5 | DST unit 5 | DST units 5,6, 1-3 |

FIG. 32

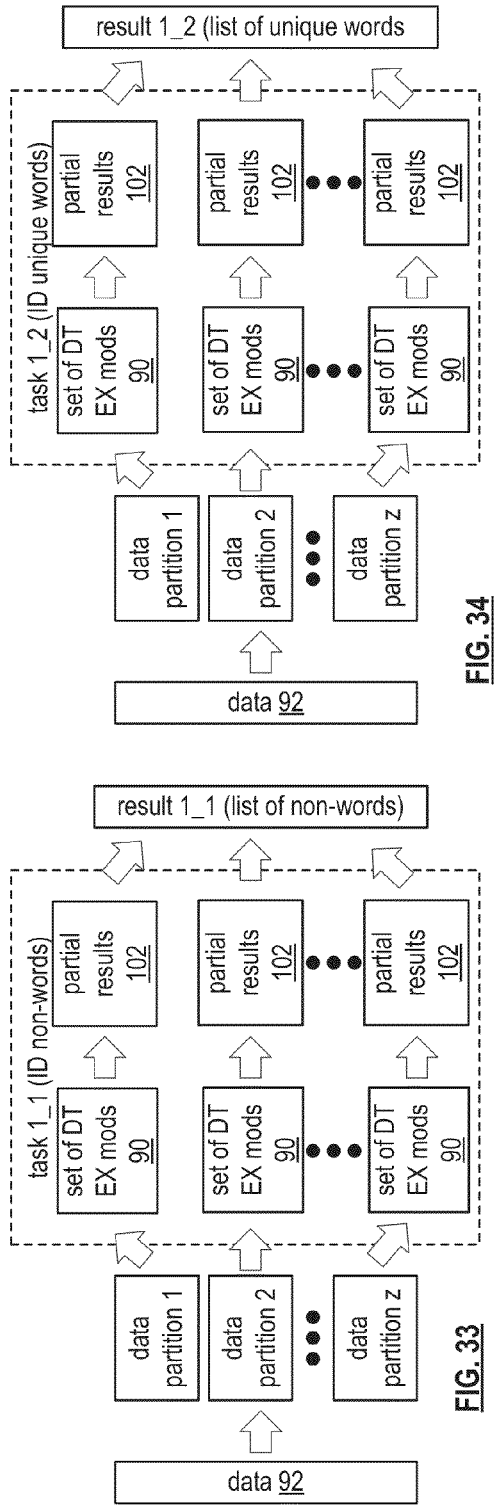
FIG. 33
FIG. 34
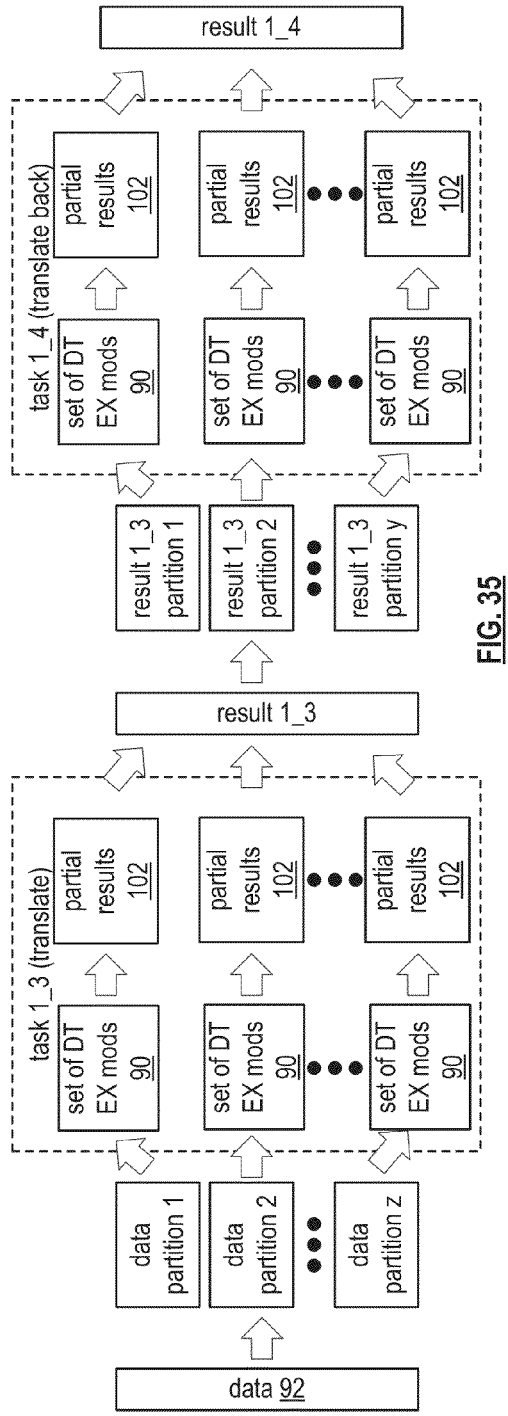
FIG. 35

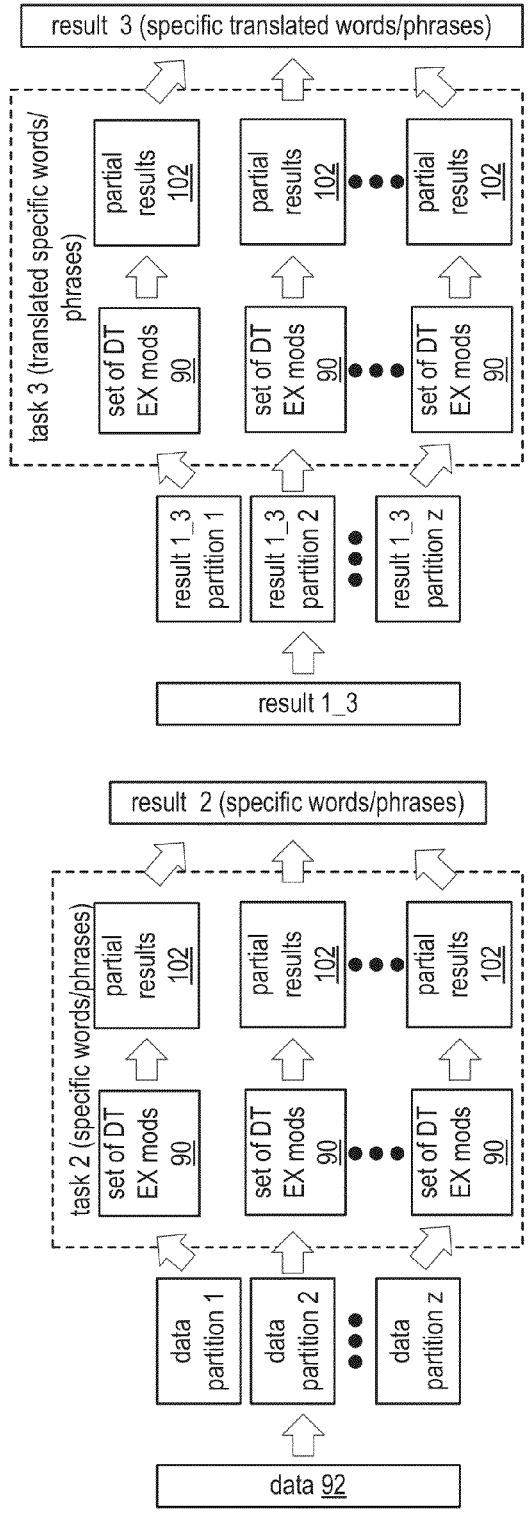
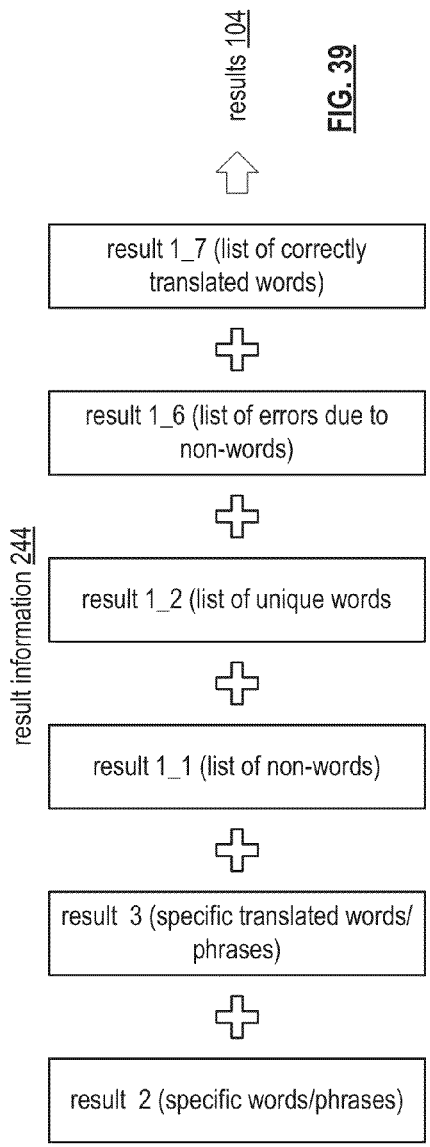

addressing pinwheel 400 addressing pinwheel 400 site 2 storage nodes 404

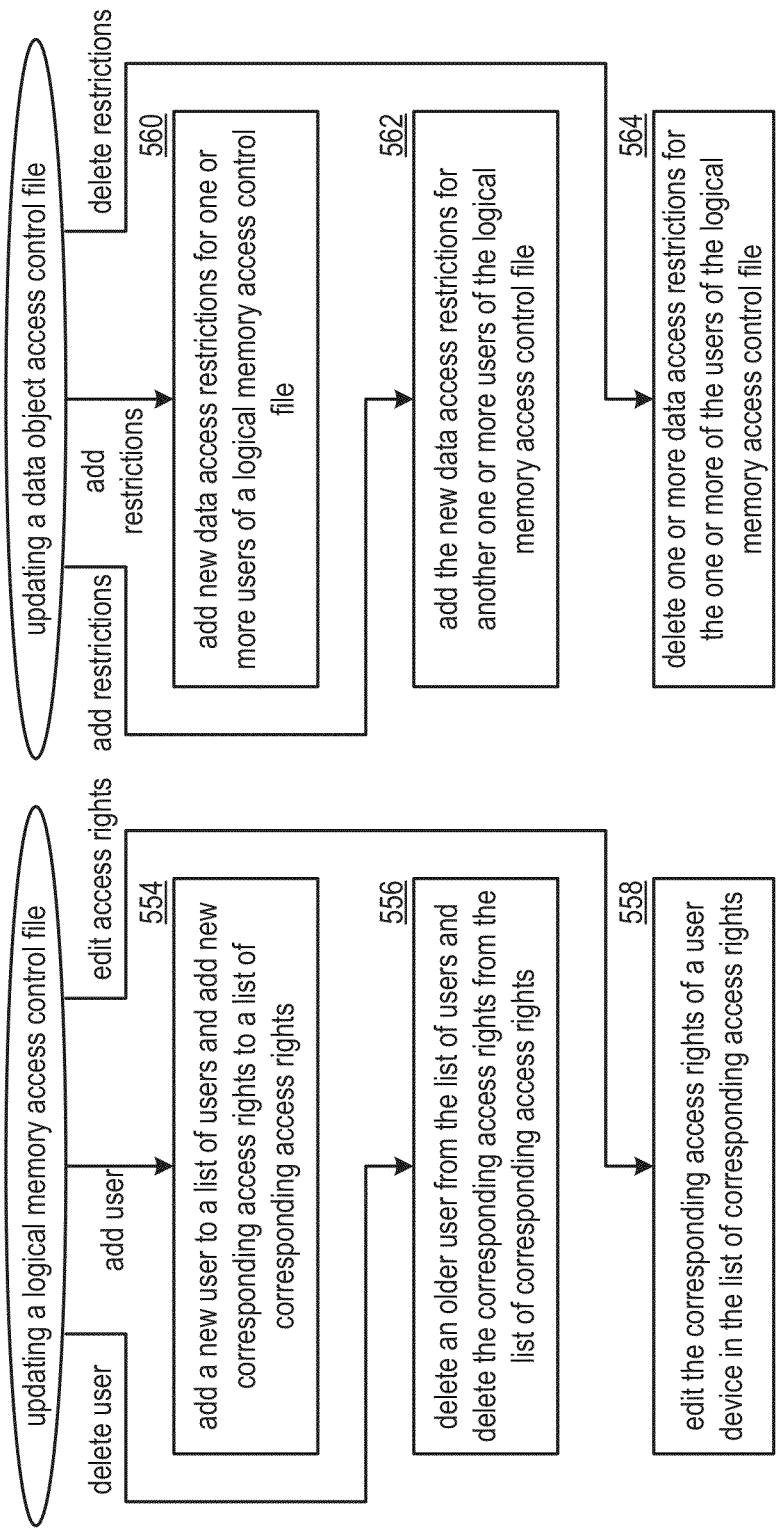

PROCESSING AN UNSUCCESSFUL WRITE REQUEST IN A DISPERSED STORAGE NETWORK

CROSS REFERENCE TO RELATED PATENTS

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:
1. U.S. Provisional Application Ser. No. 61/720,204, entitled "ACCESSING A DISTRIBUTED STORAGE AND TASK NETWORK," filed Oct. 30, 2012, pending.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computer networks and more particularly to dispersed storage of data and distributed task processing of data.

2. Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 11 is a schematic block diagram of an embodiment of a DST execution unit in accordance with the present invention;

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 42A:
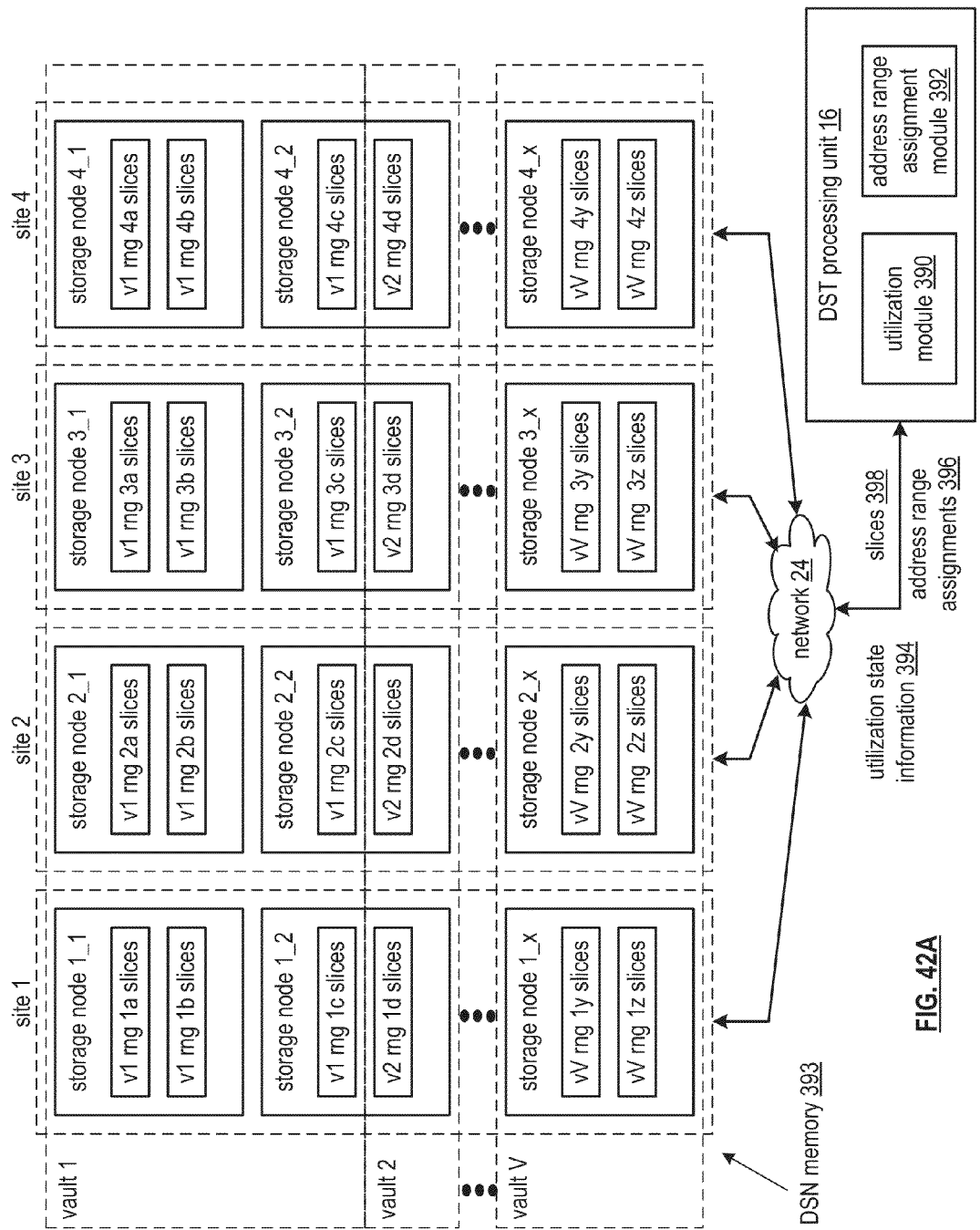
FIG. 42A is a schematic block diagram of an embodiment of a dispersed storage network (DSN) in accordance with the present invention.
Figure 42B:
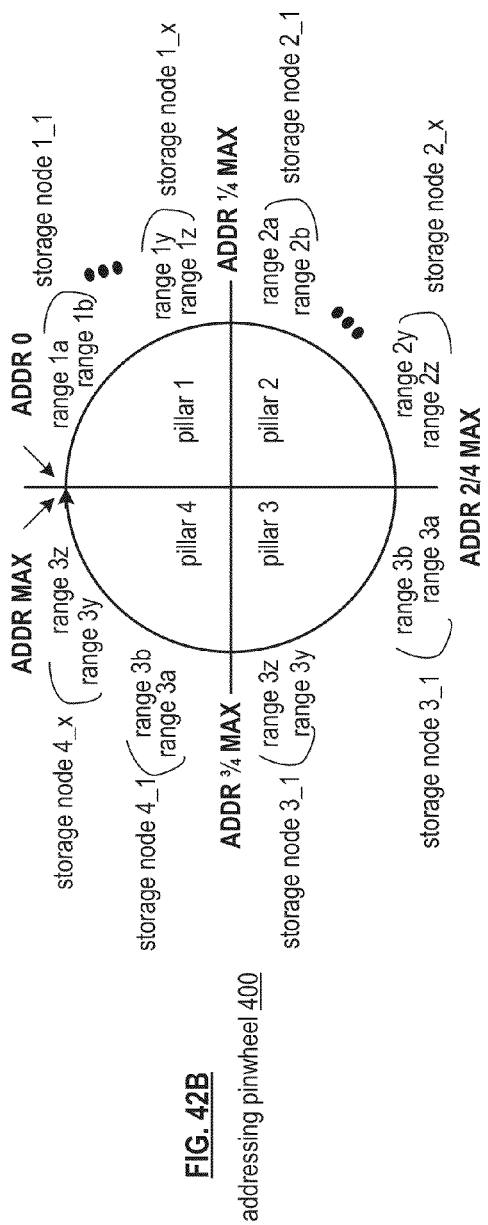
Figure 42C:
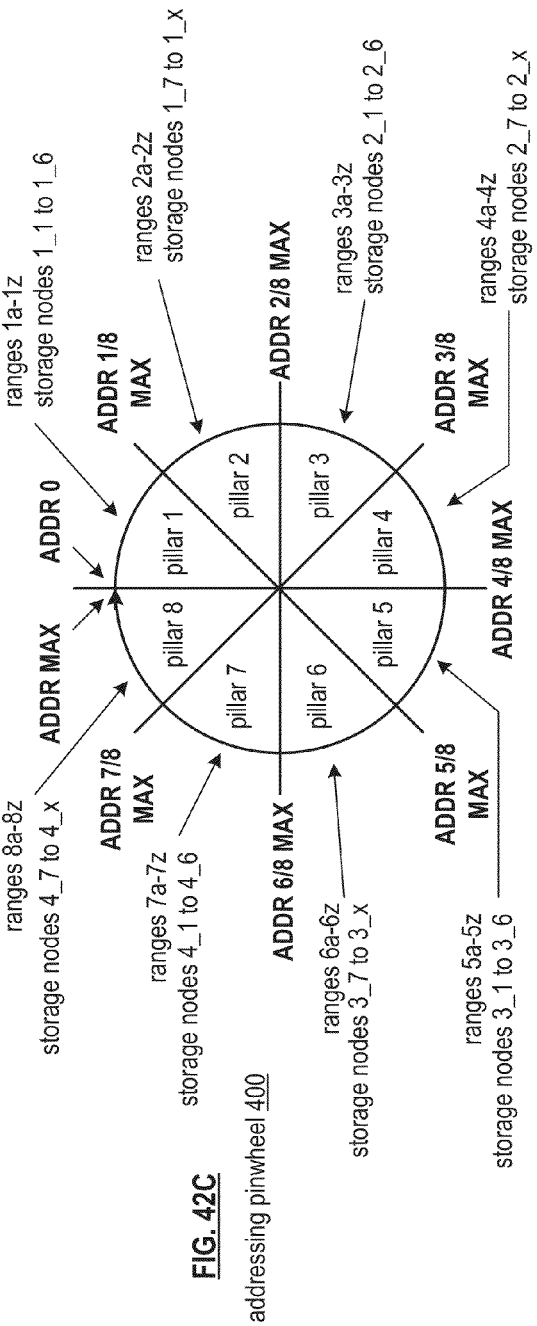
Figure 42G:
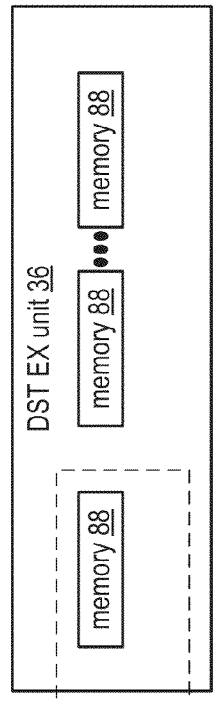
Figure 42D:
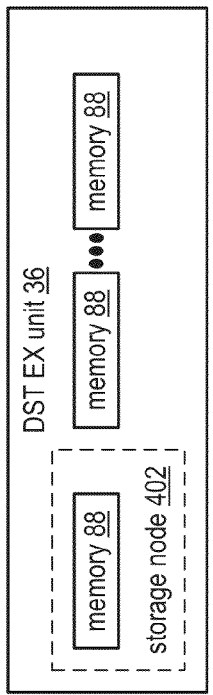
Figure 42E:
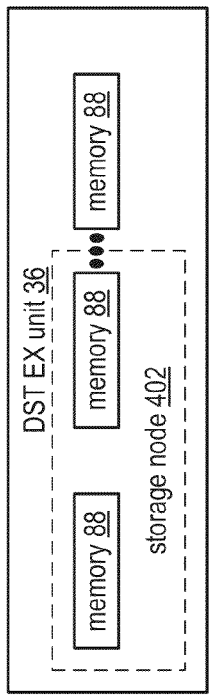
Figure 42F:
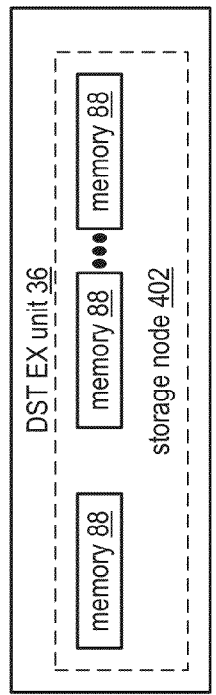
Figure 42G:
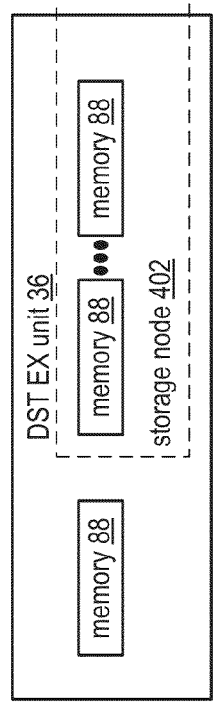
Figure 42H:
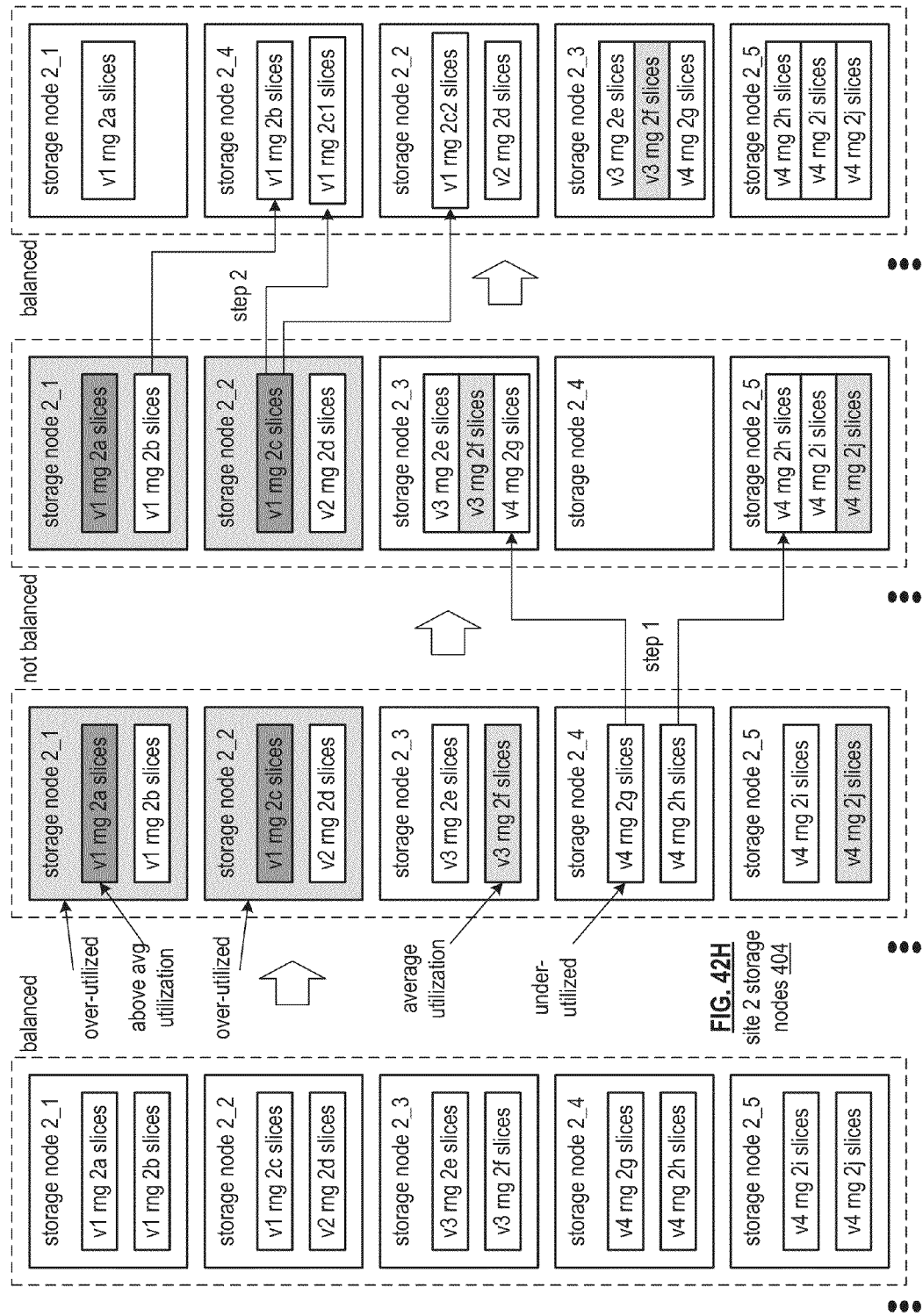
Figure 42I:
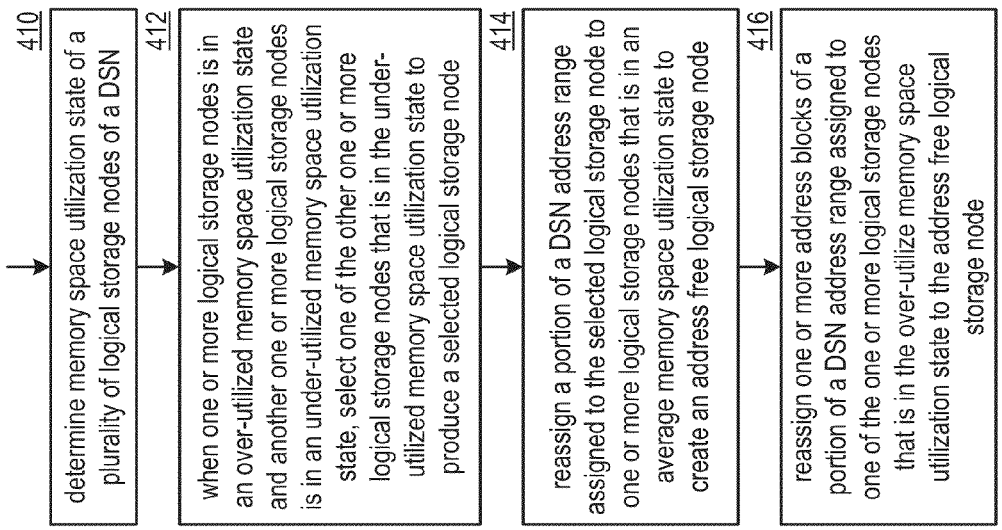
Figure 43A:
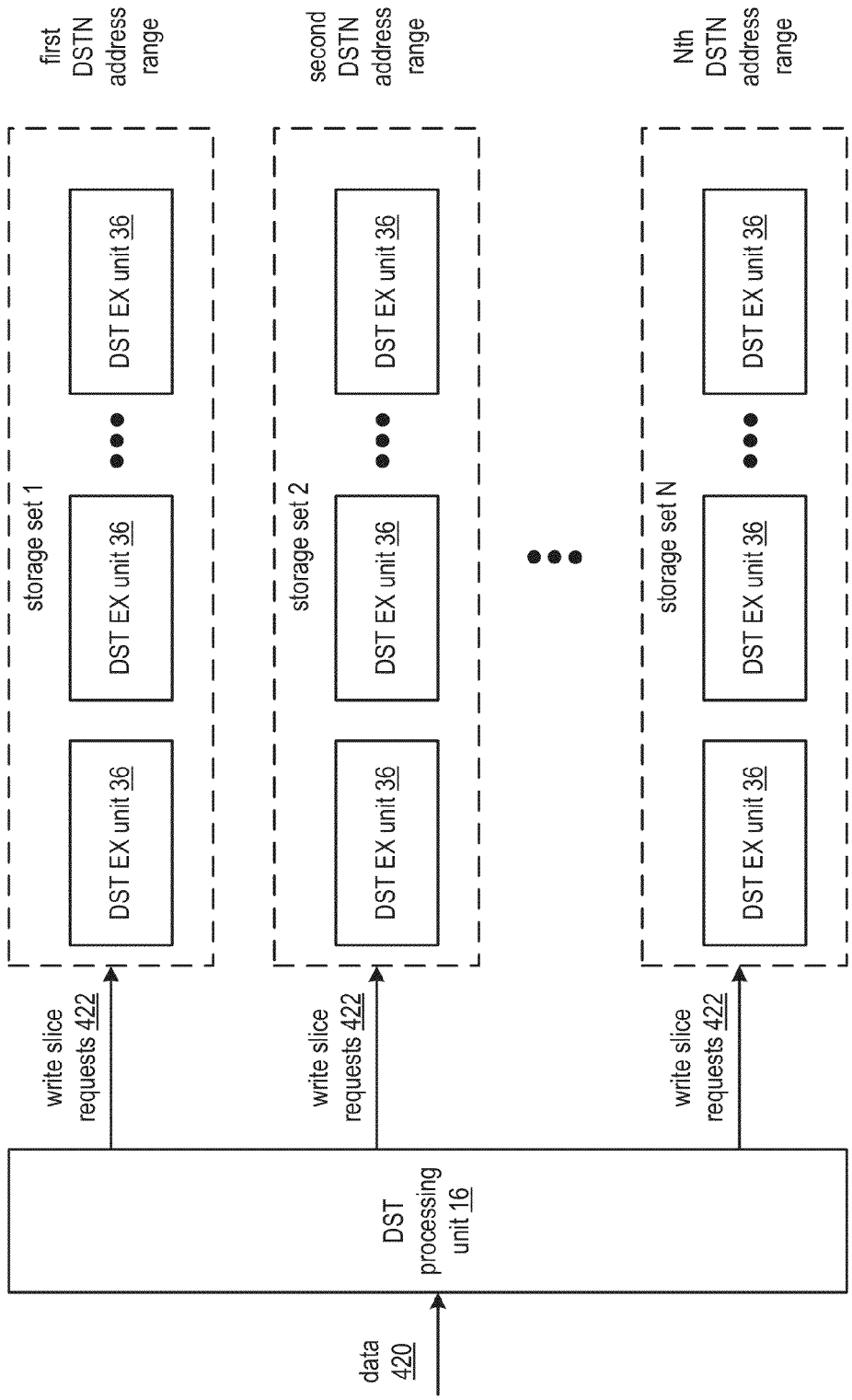
Figure 43B:
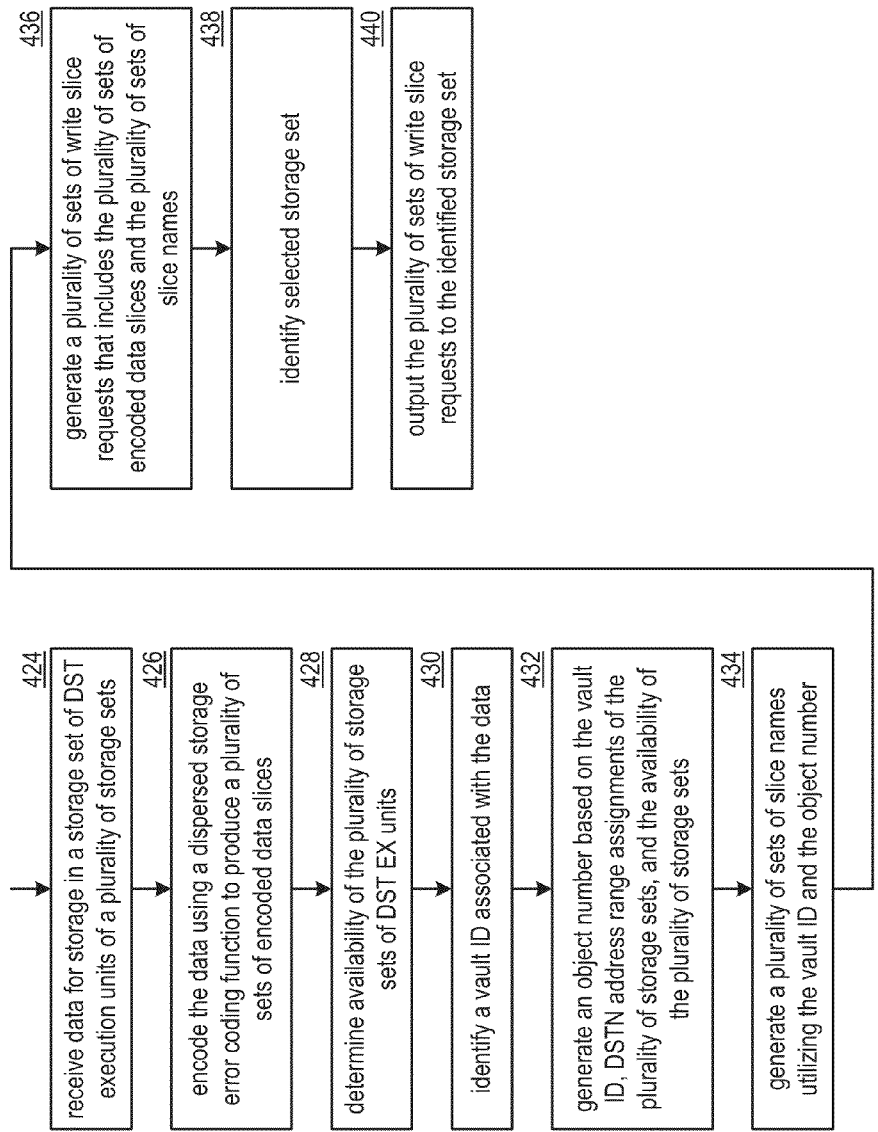
Figure 44A:
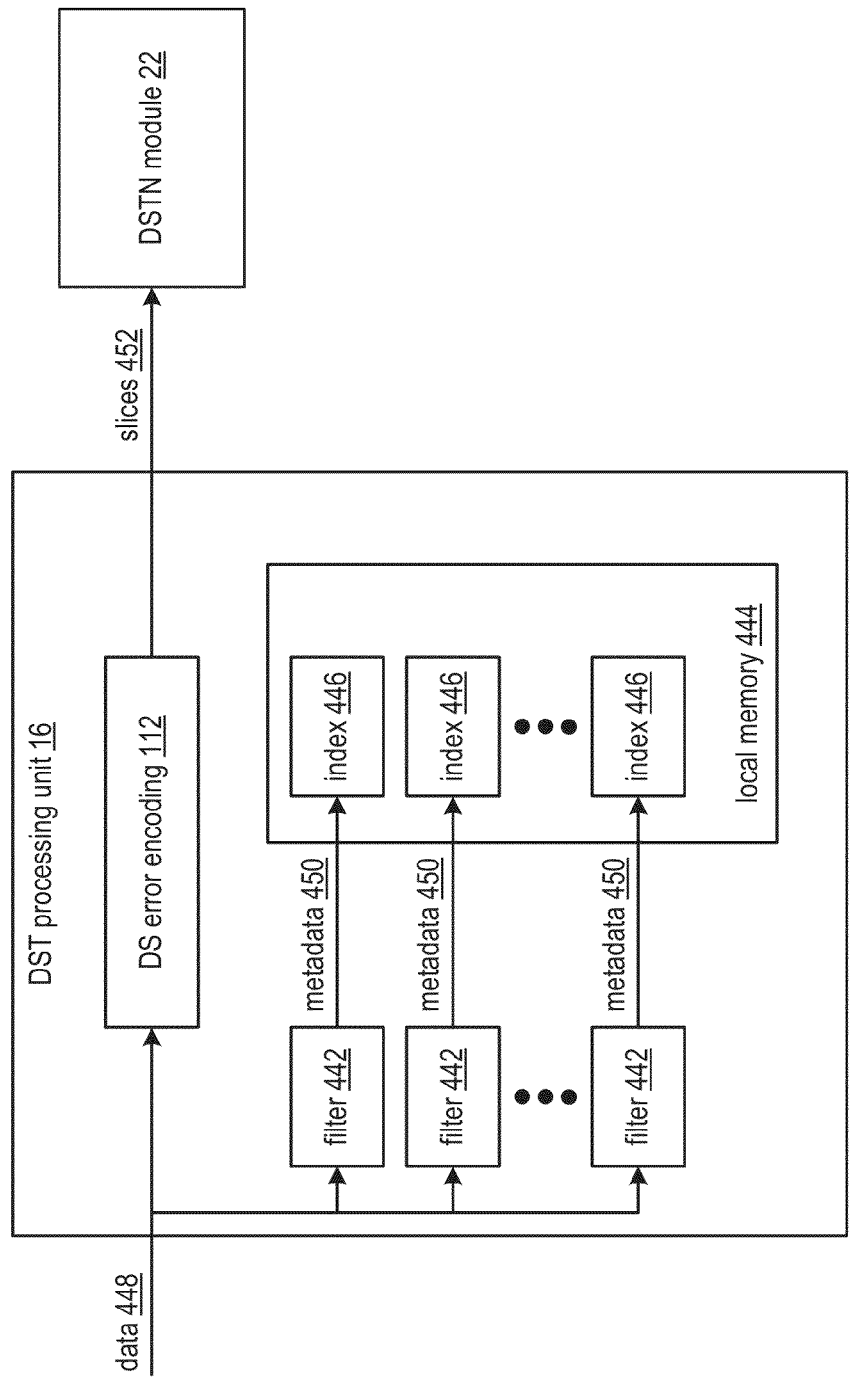
Figure 44B:
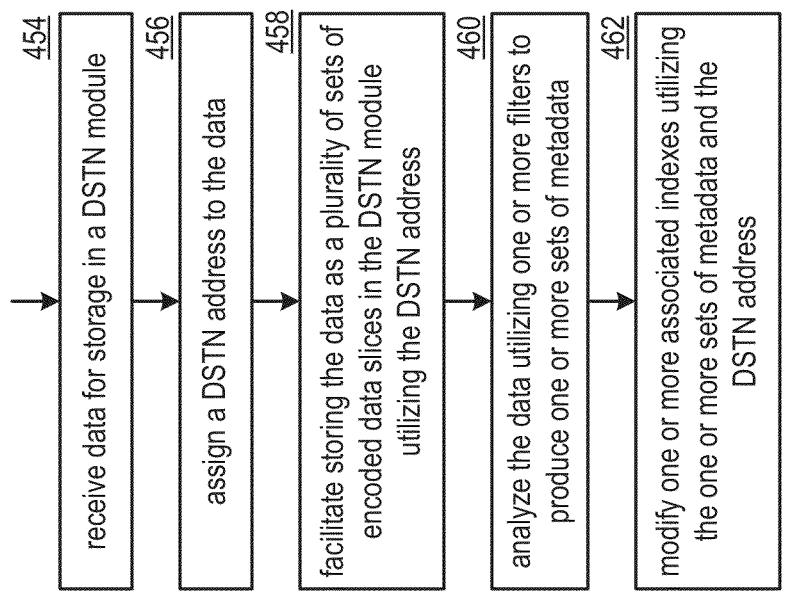
Figure 45A:
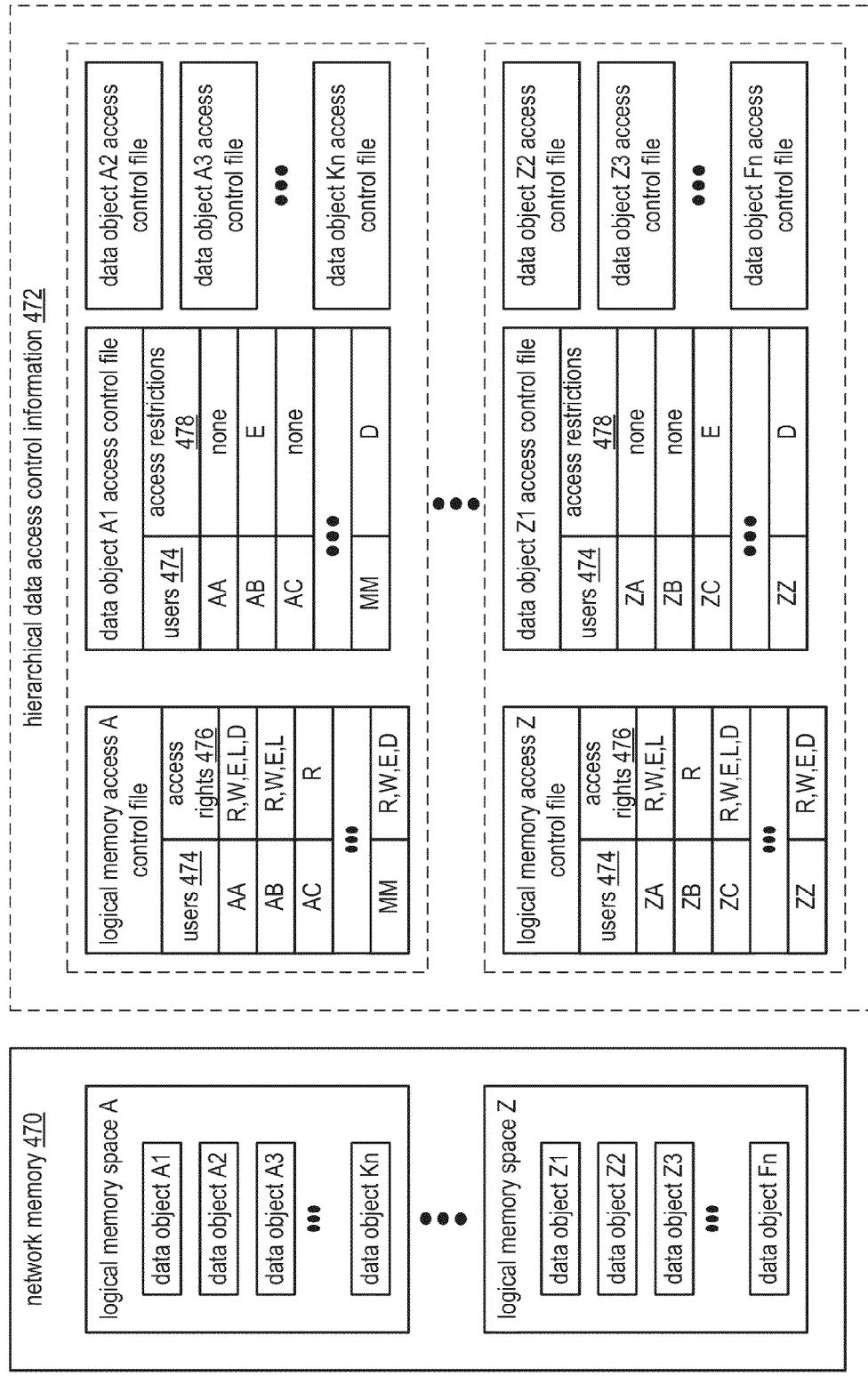
Figure 45B:
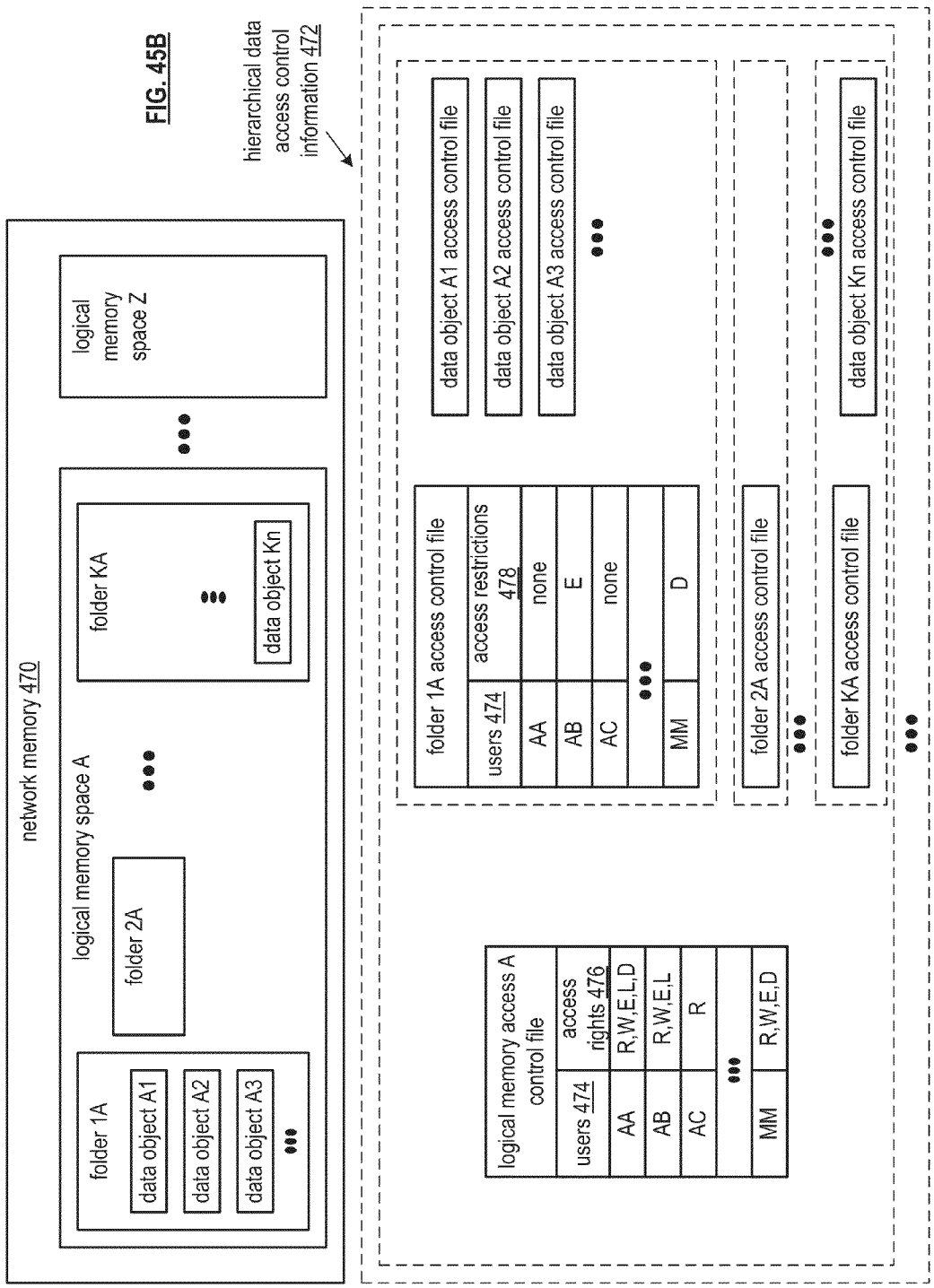
Figure 45C:
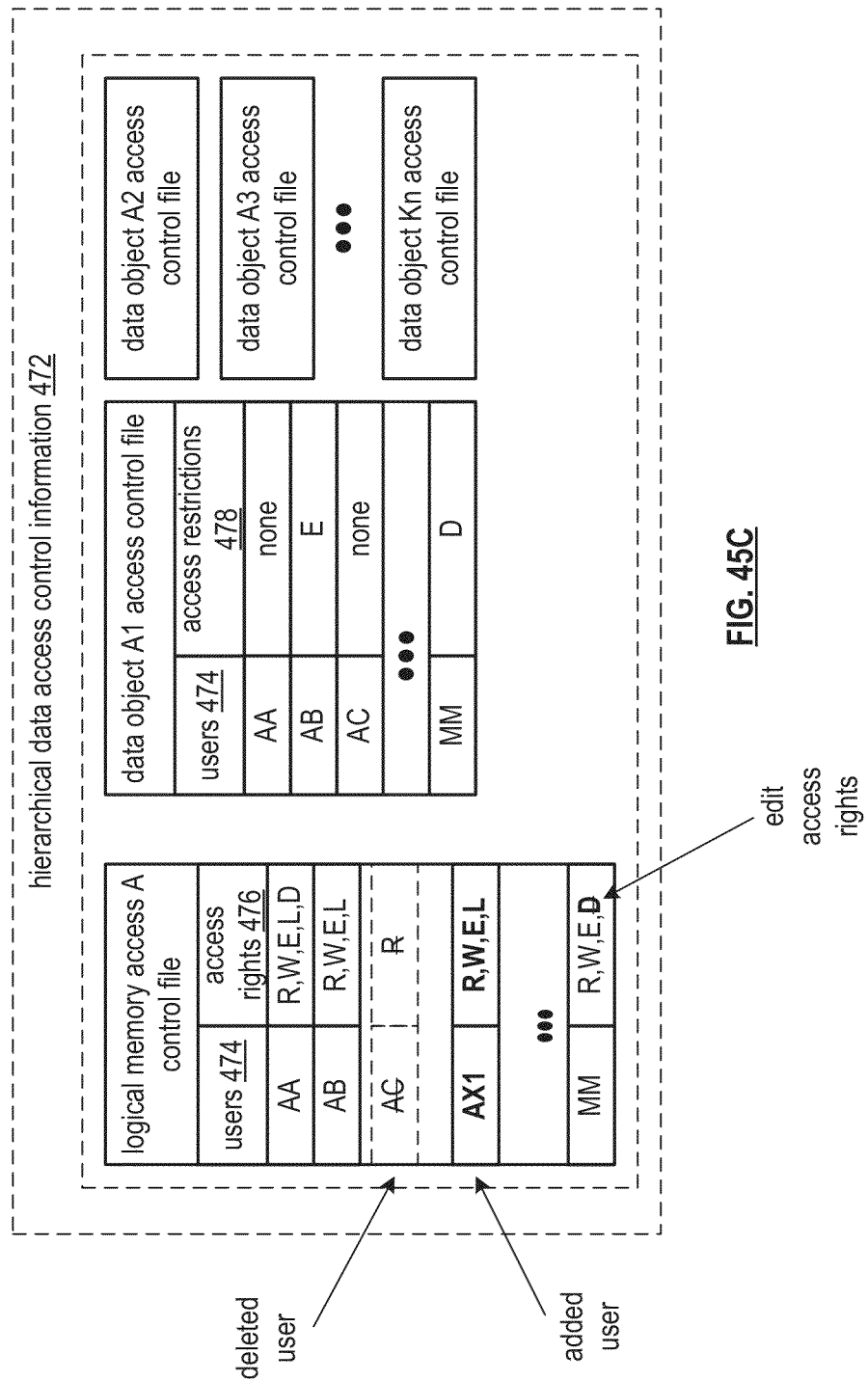
Figure 45D:
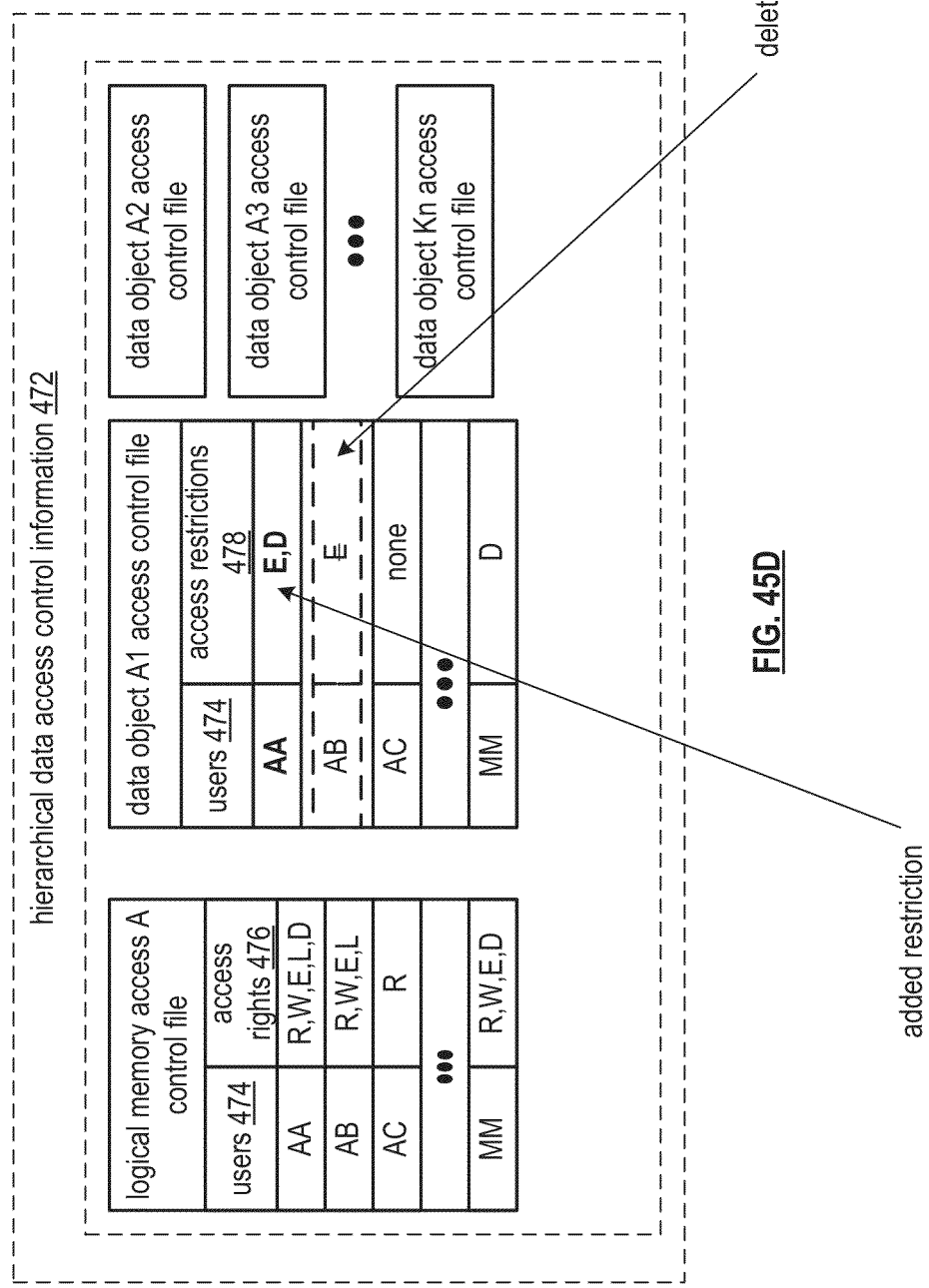
Figure 45E:
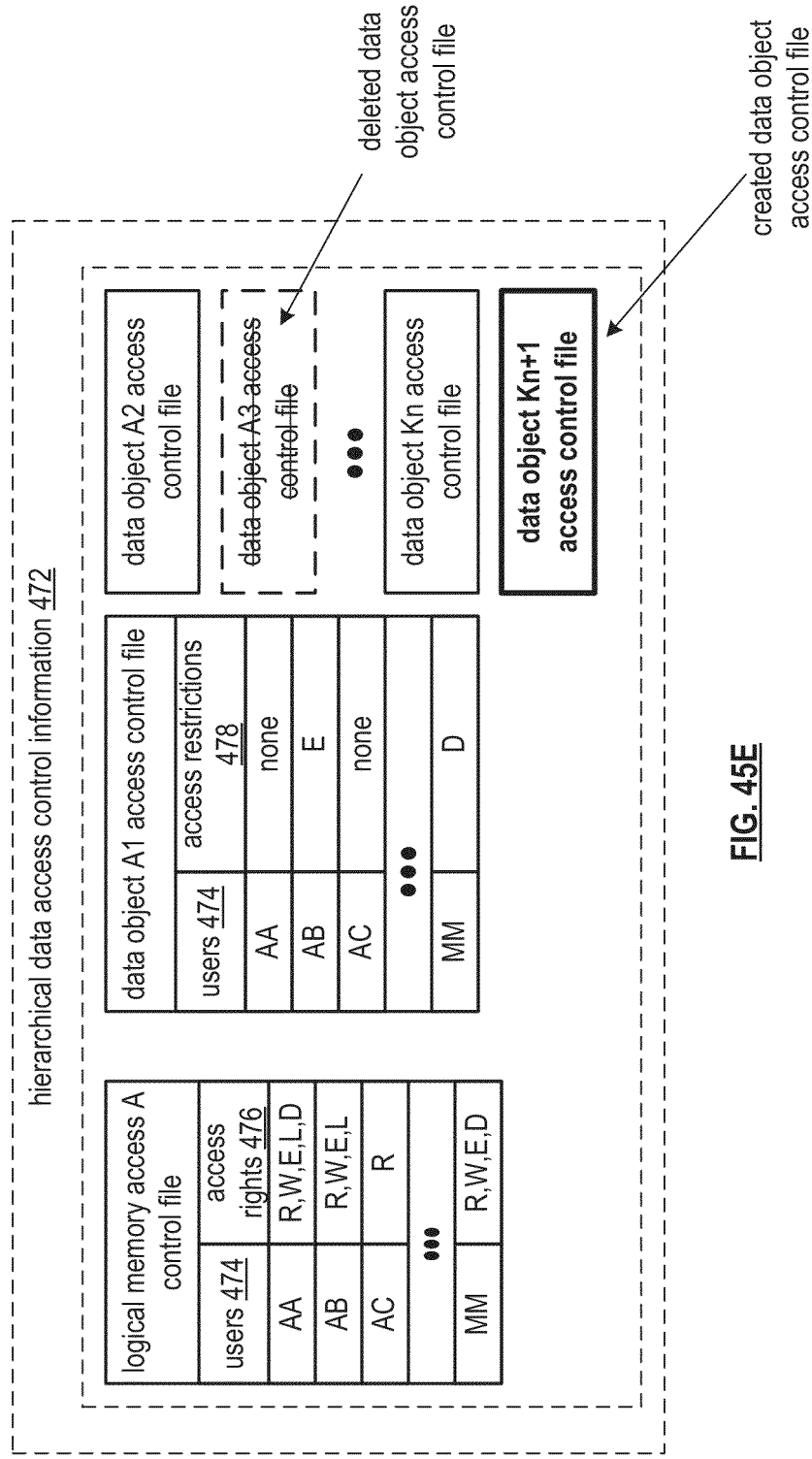
Figure 45F:
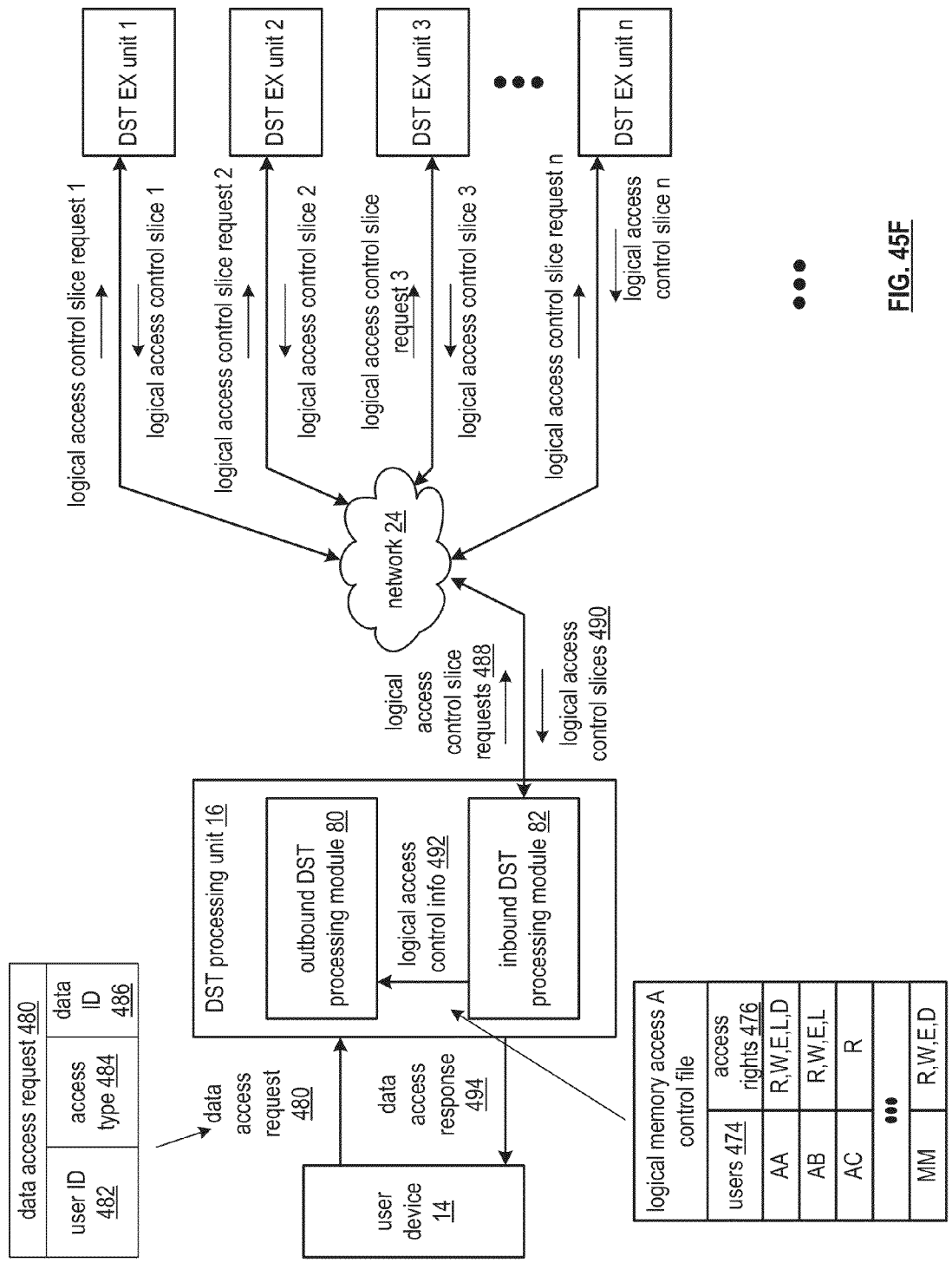
Figure 45G:
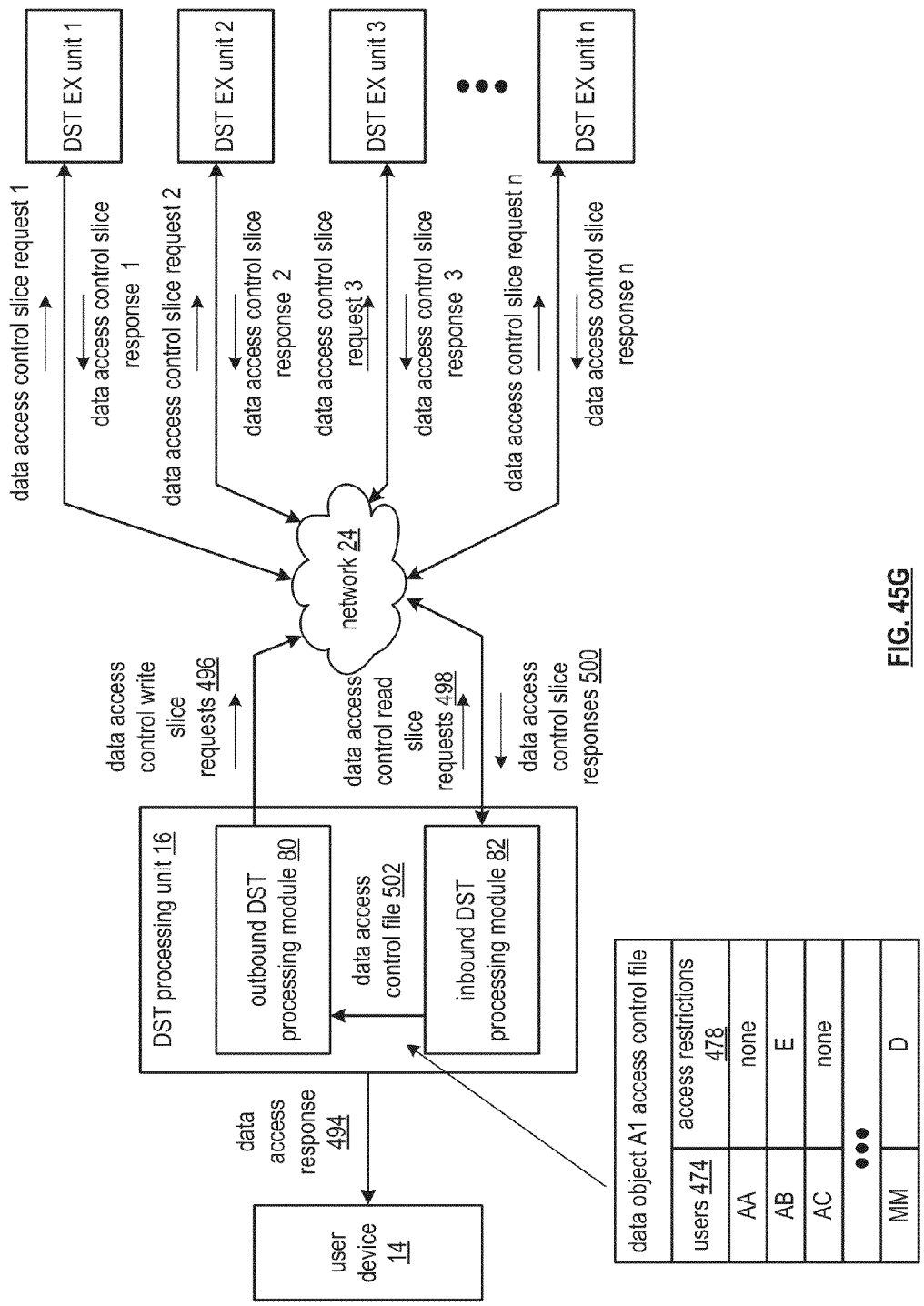
Figure 45H:
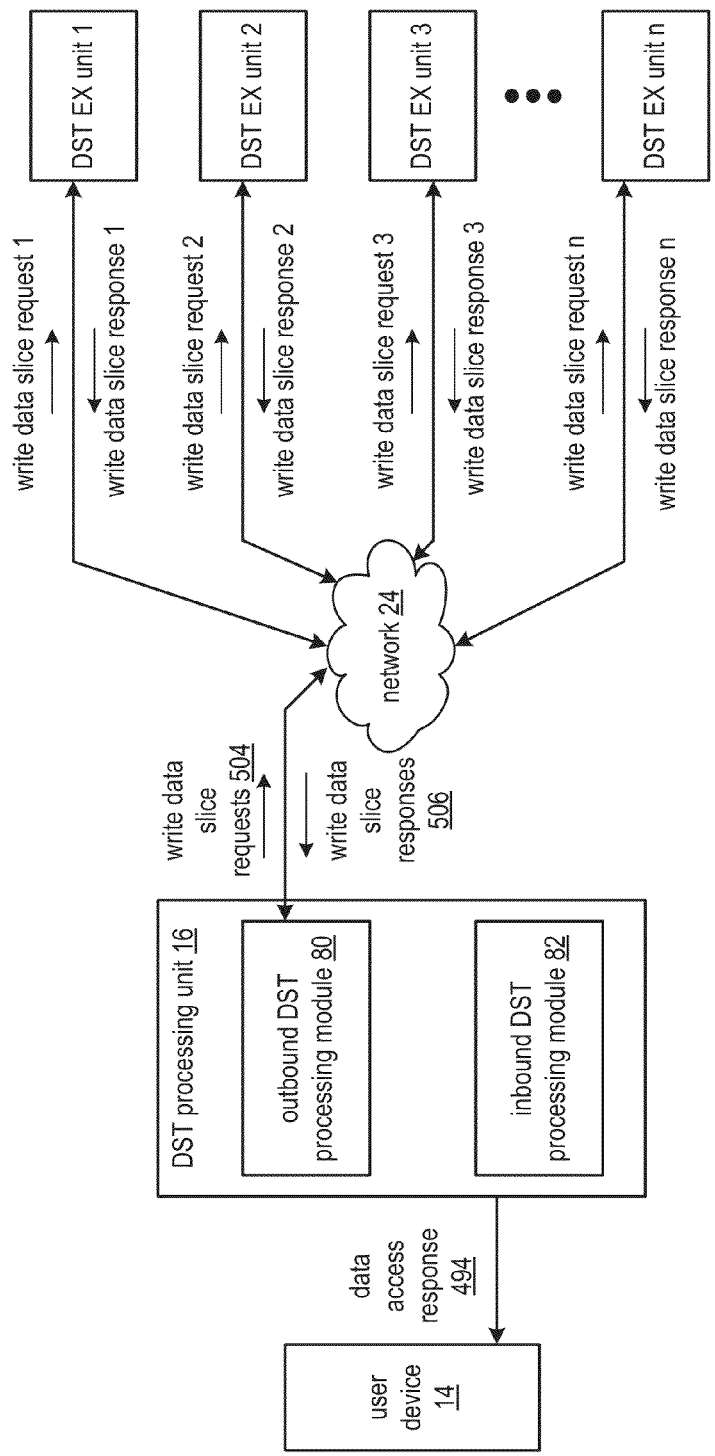
Figure 45I:
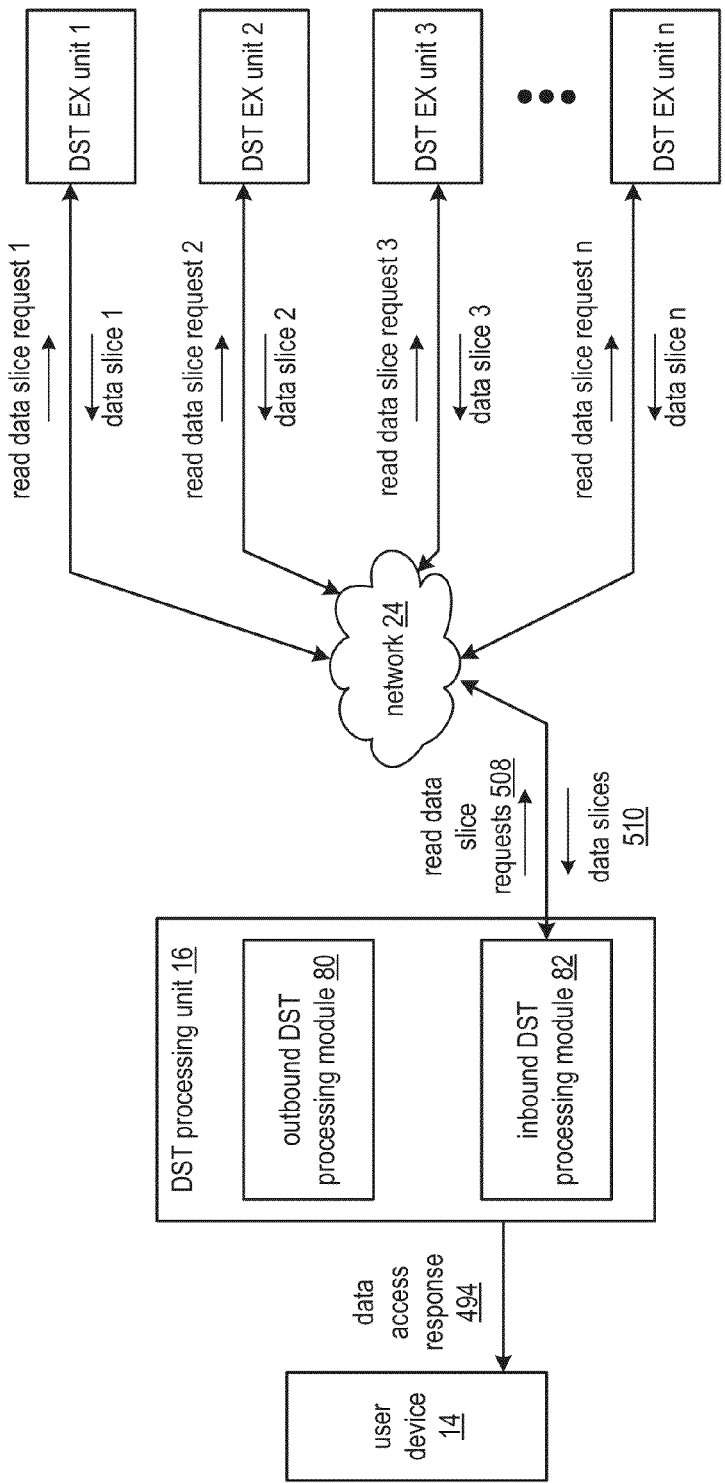
Figure 45J:
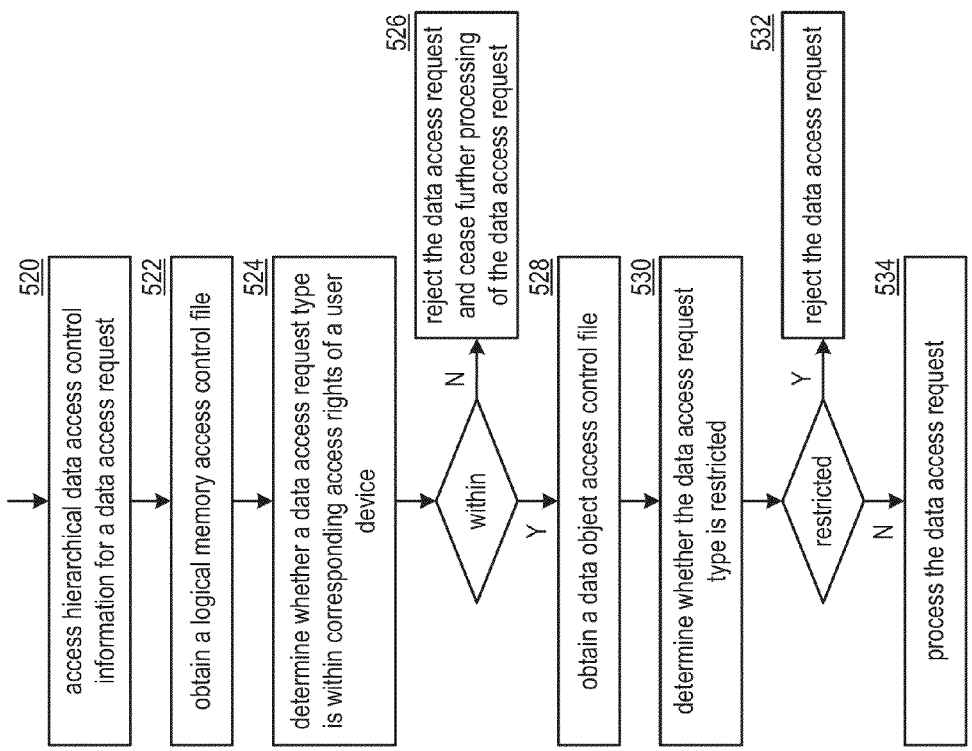
Figure 45K:
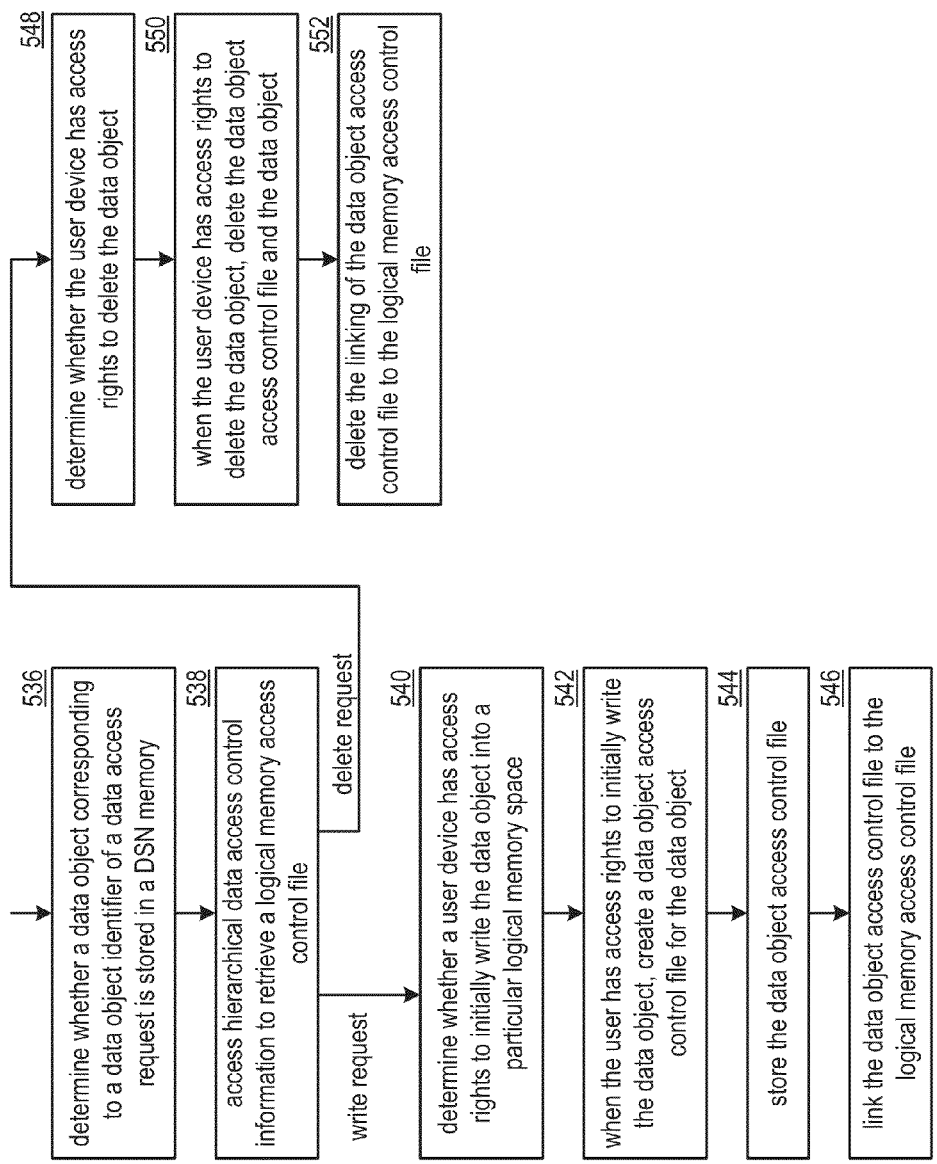
Figure 46A:
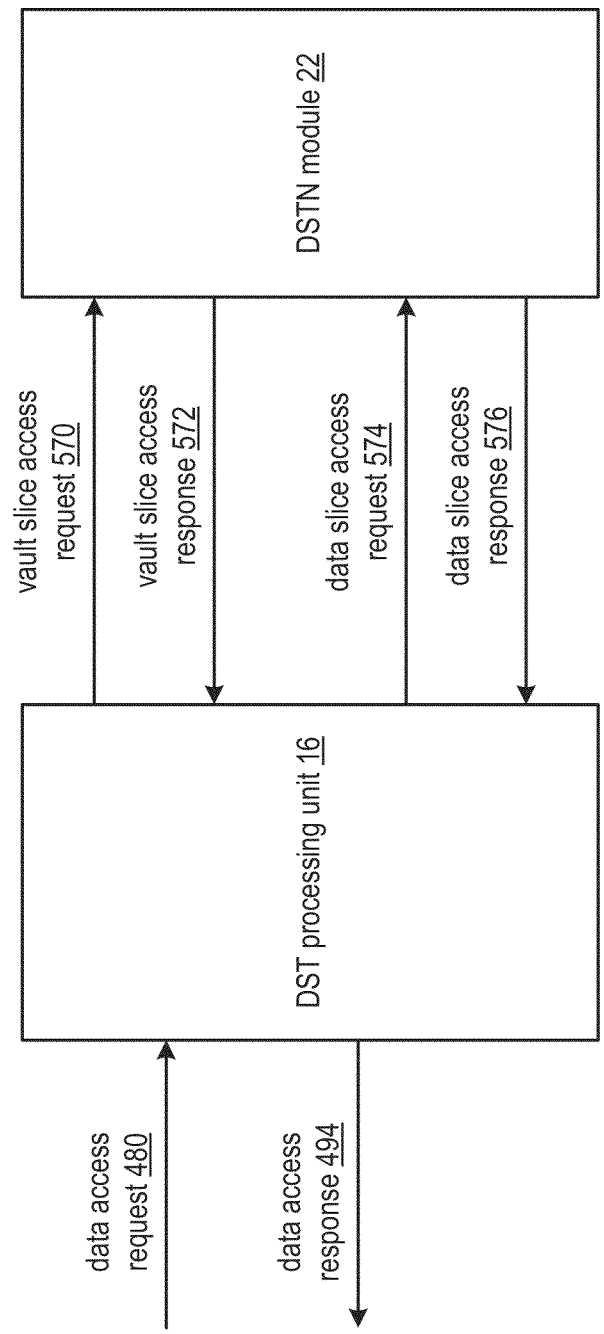
Figure 46B:
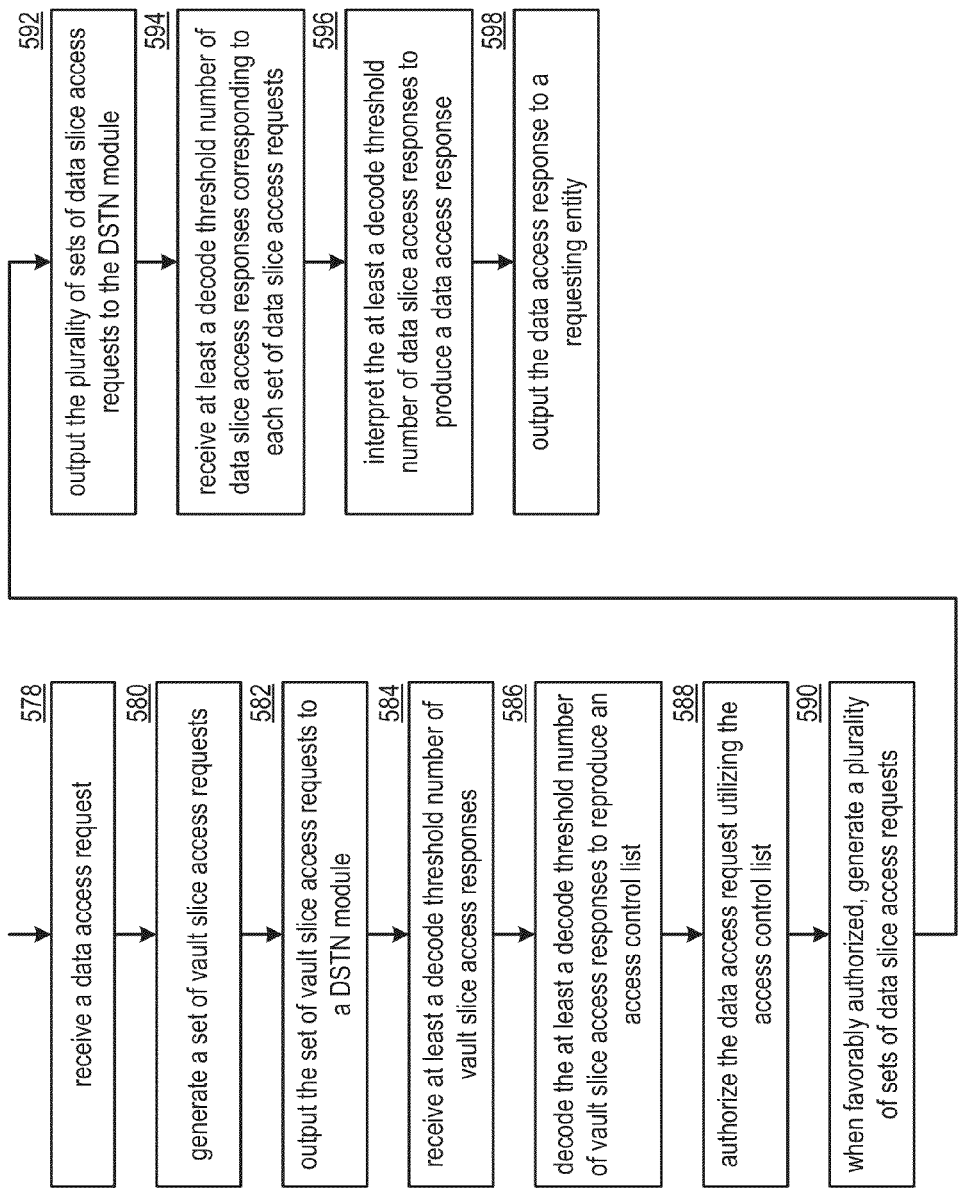
Figure 47A:
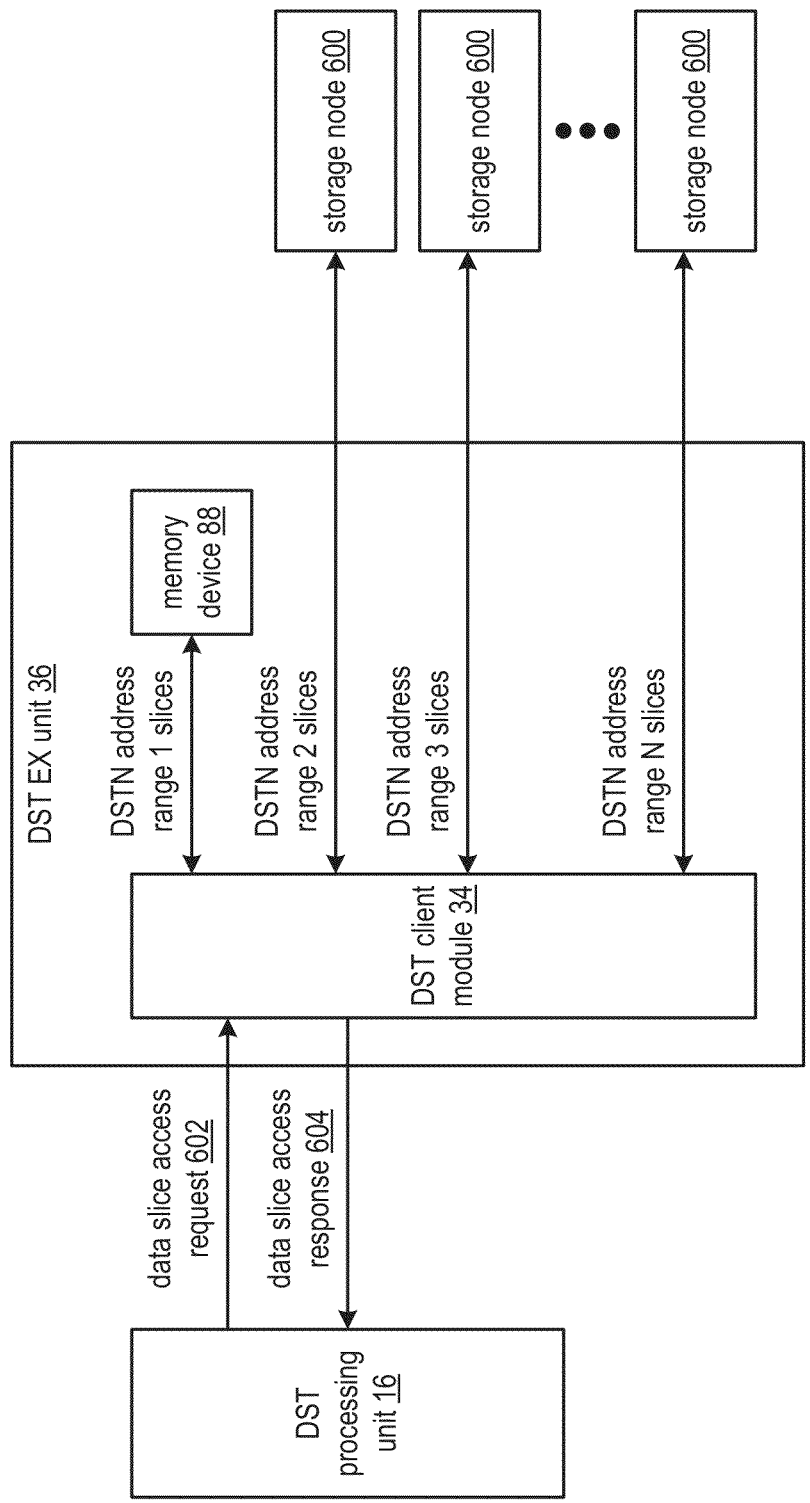
Figure 47B:
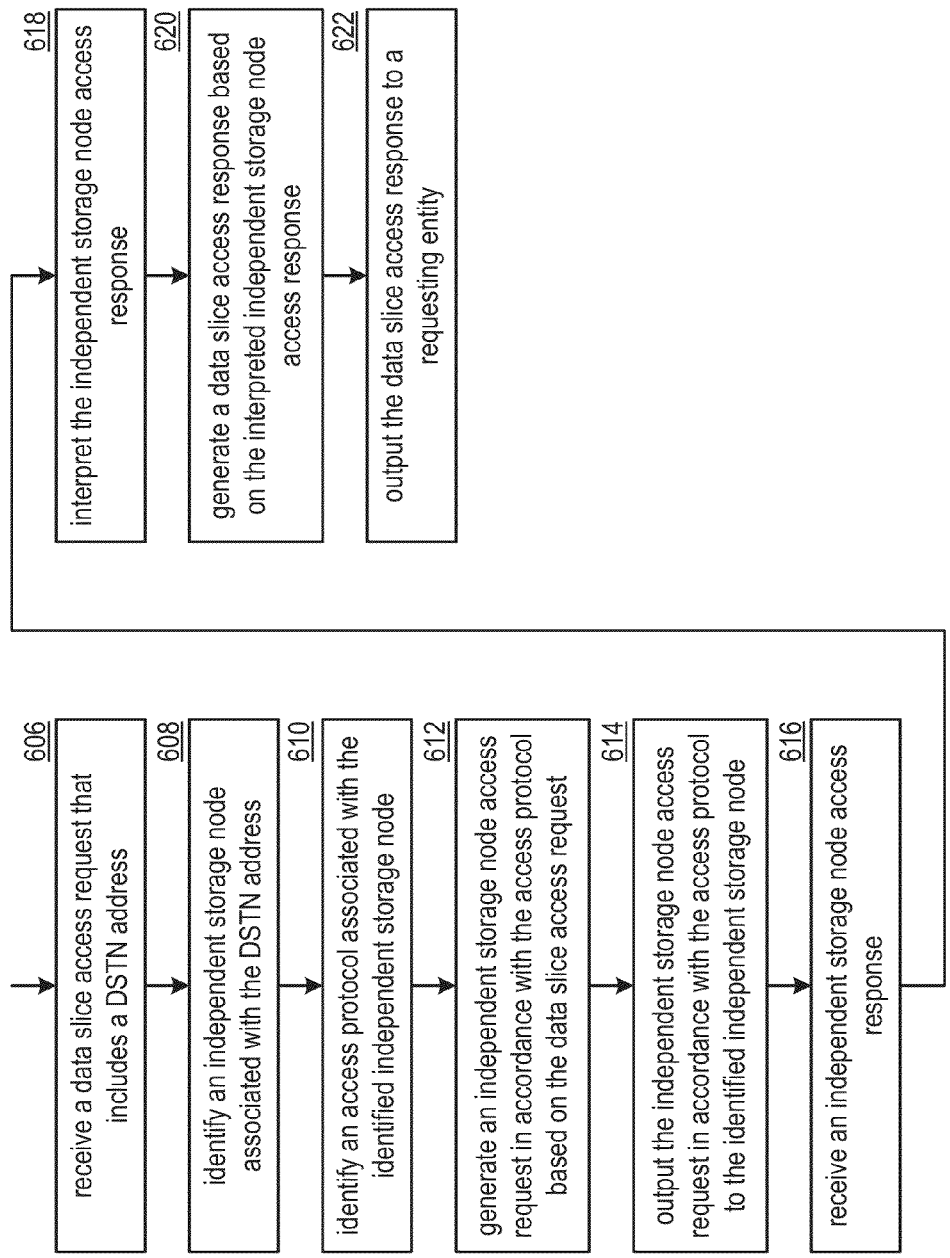
Figure 48A:
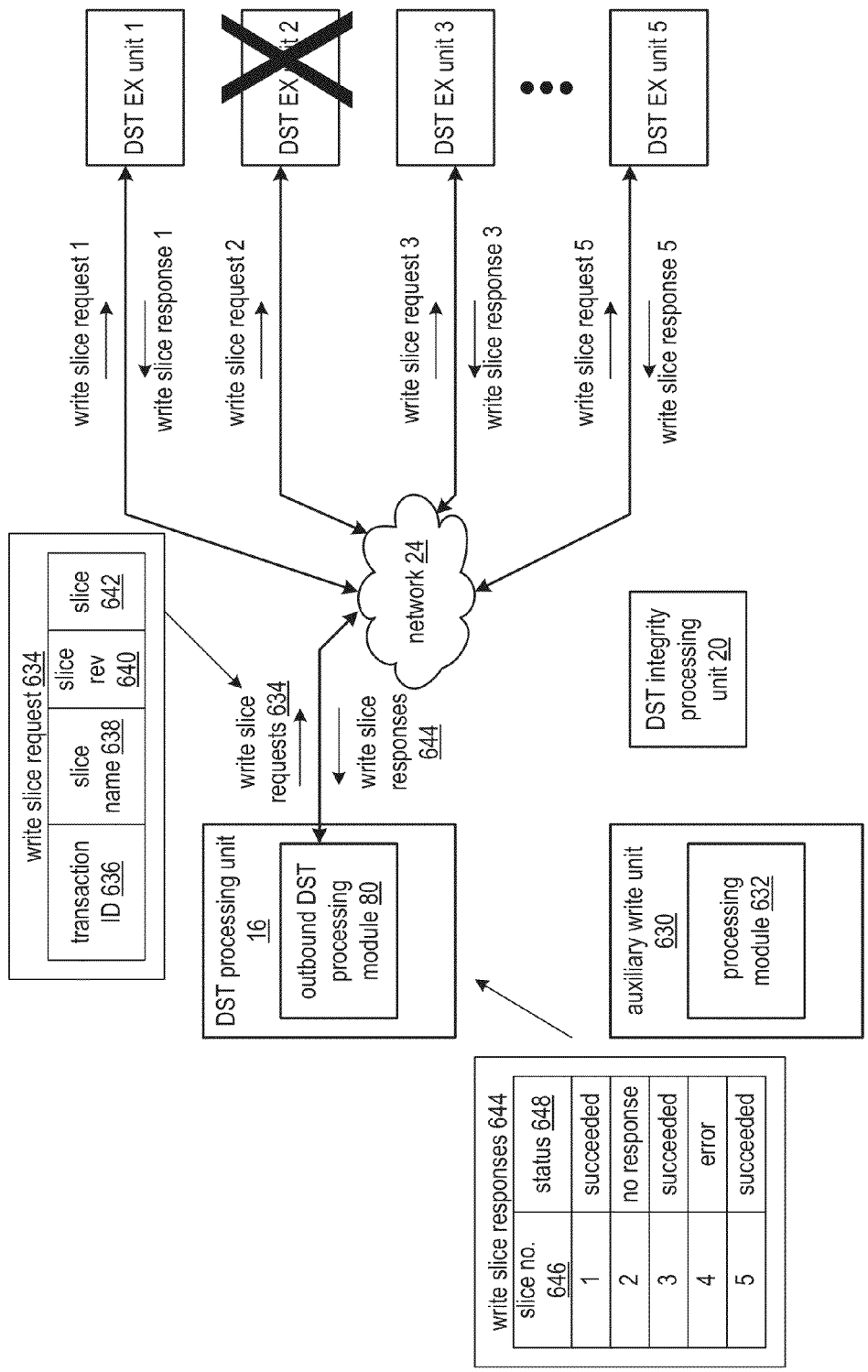
Figure 48B:
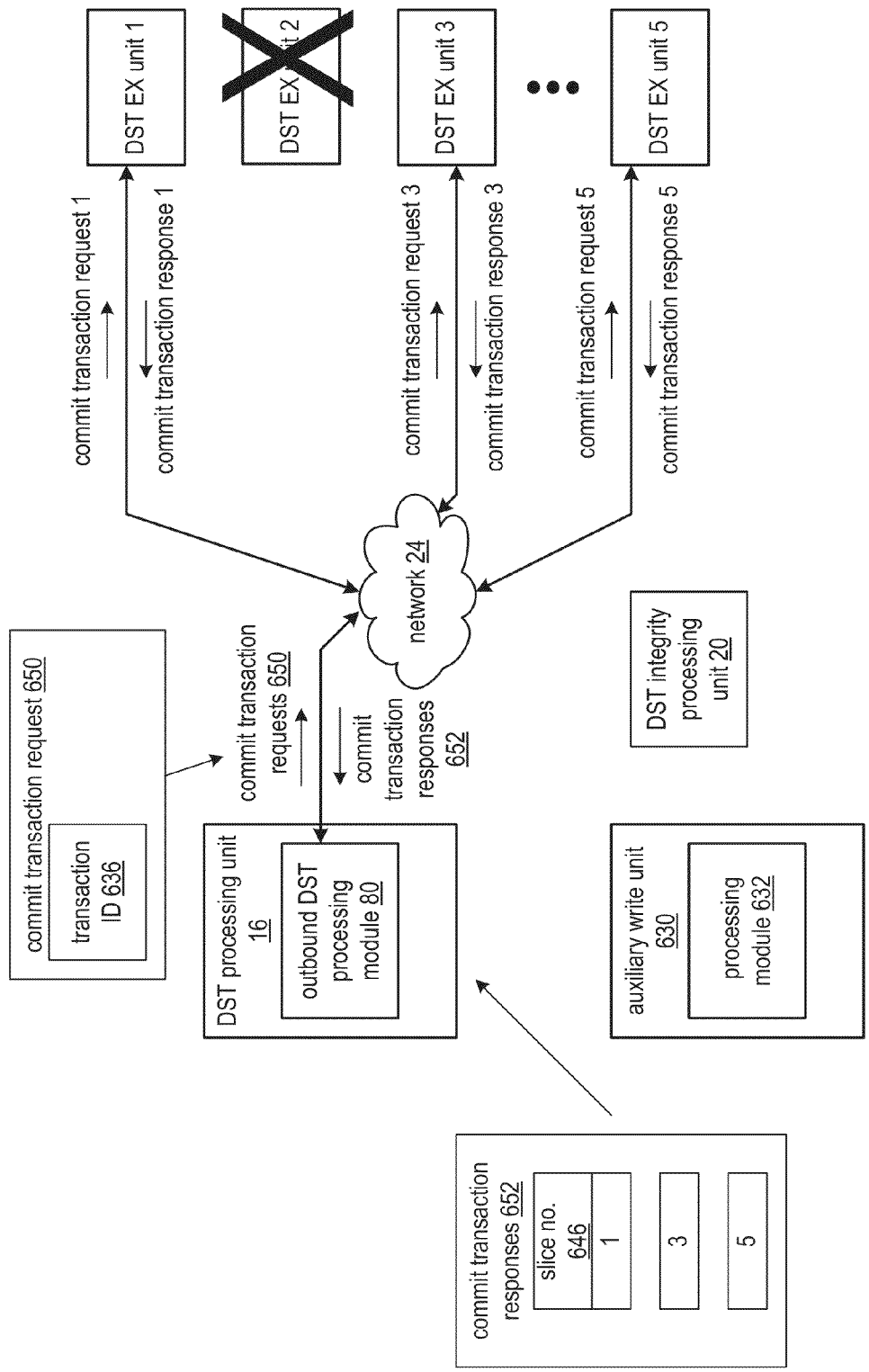
Figure 48C:
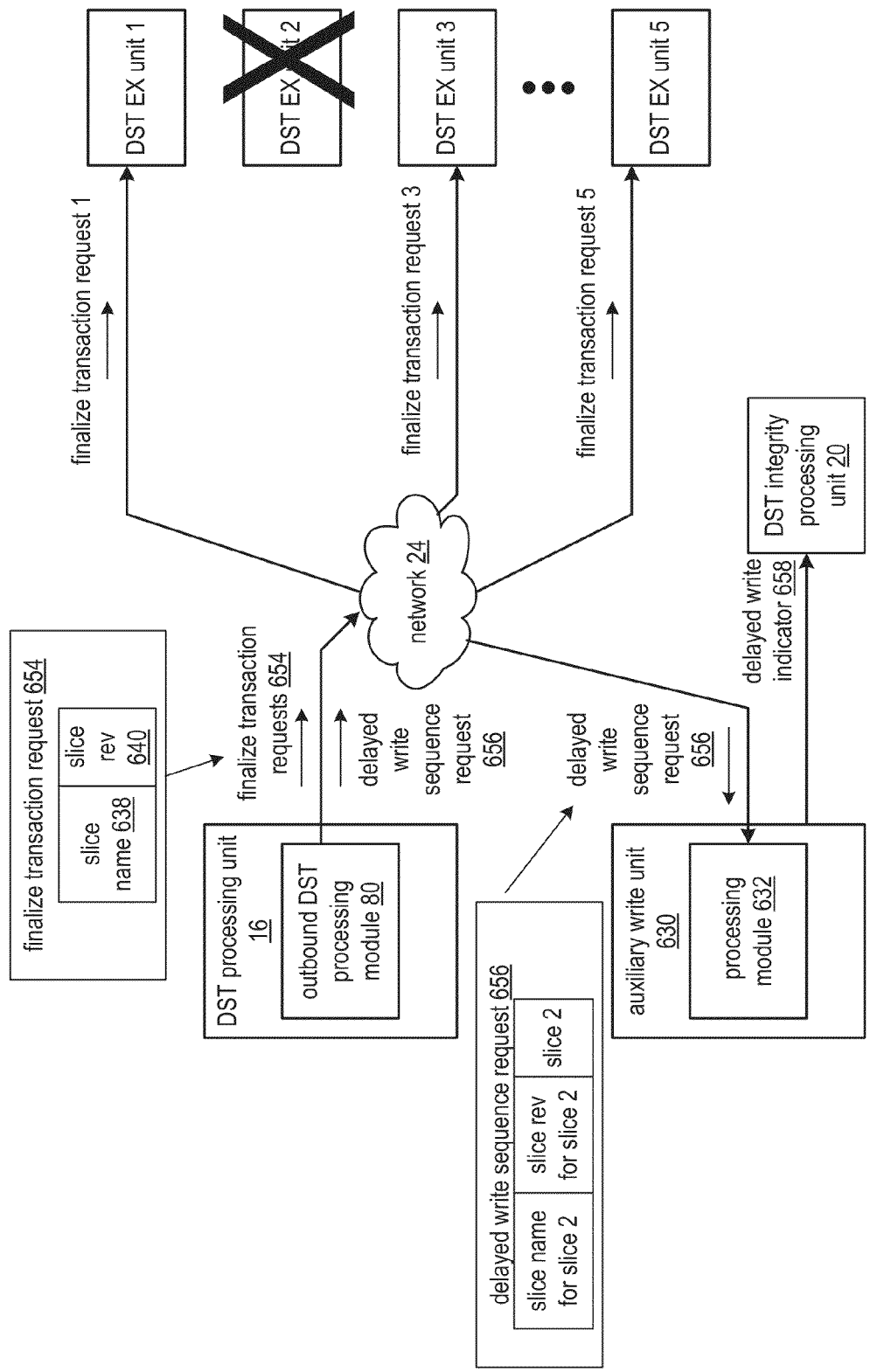
Figure 48D:
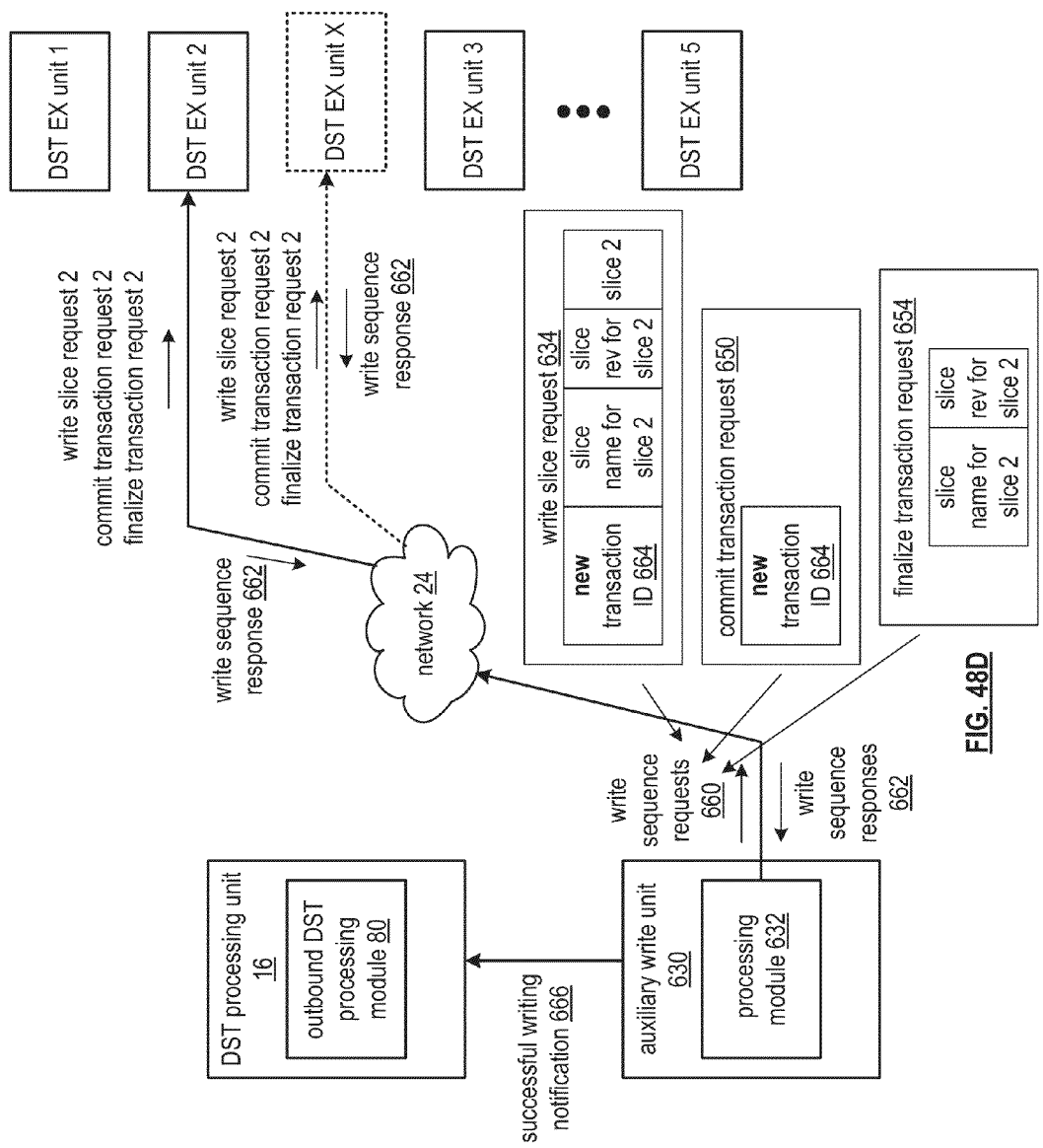
Figure 48E:
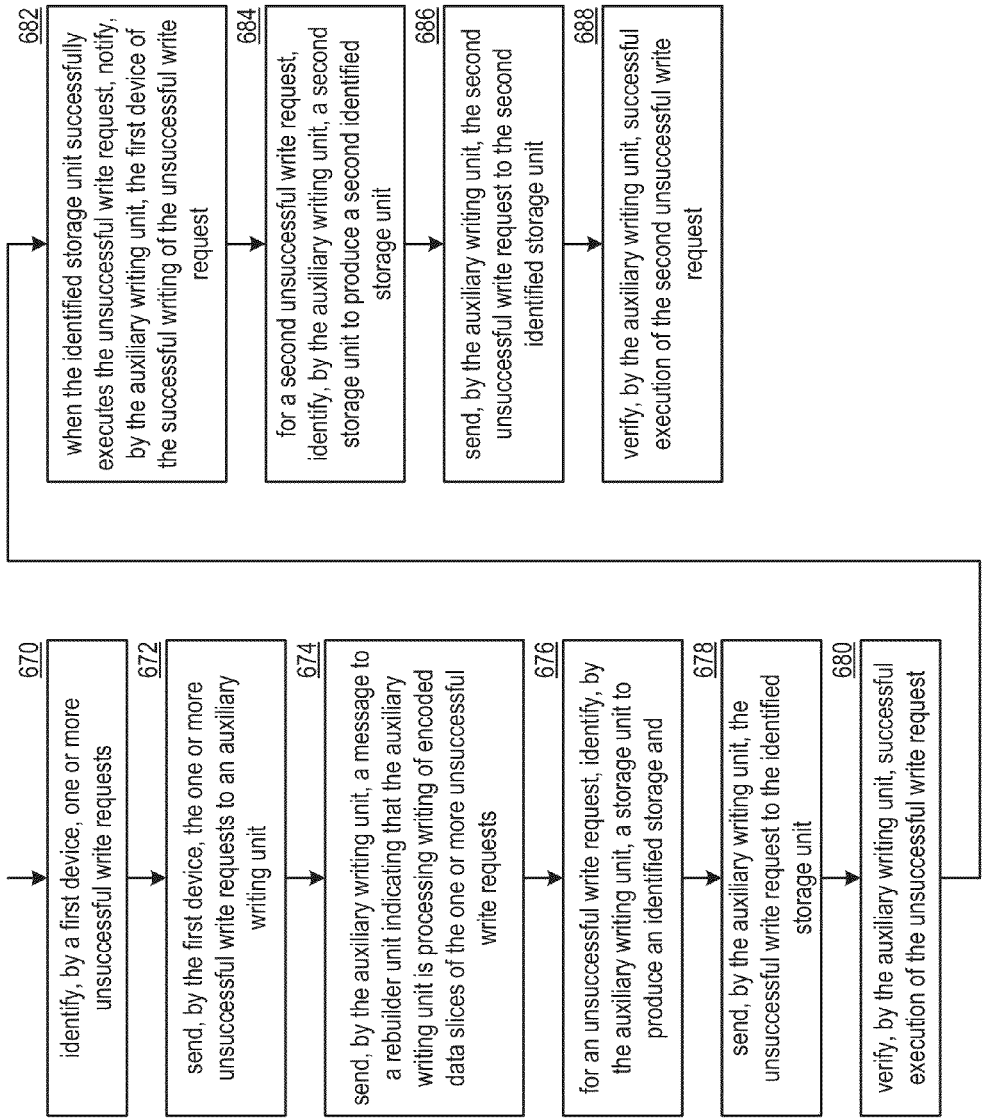
Figure 49A:
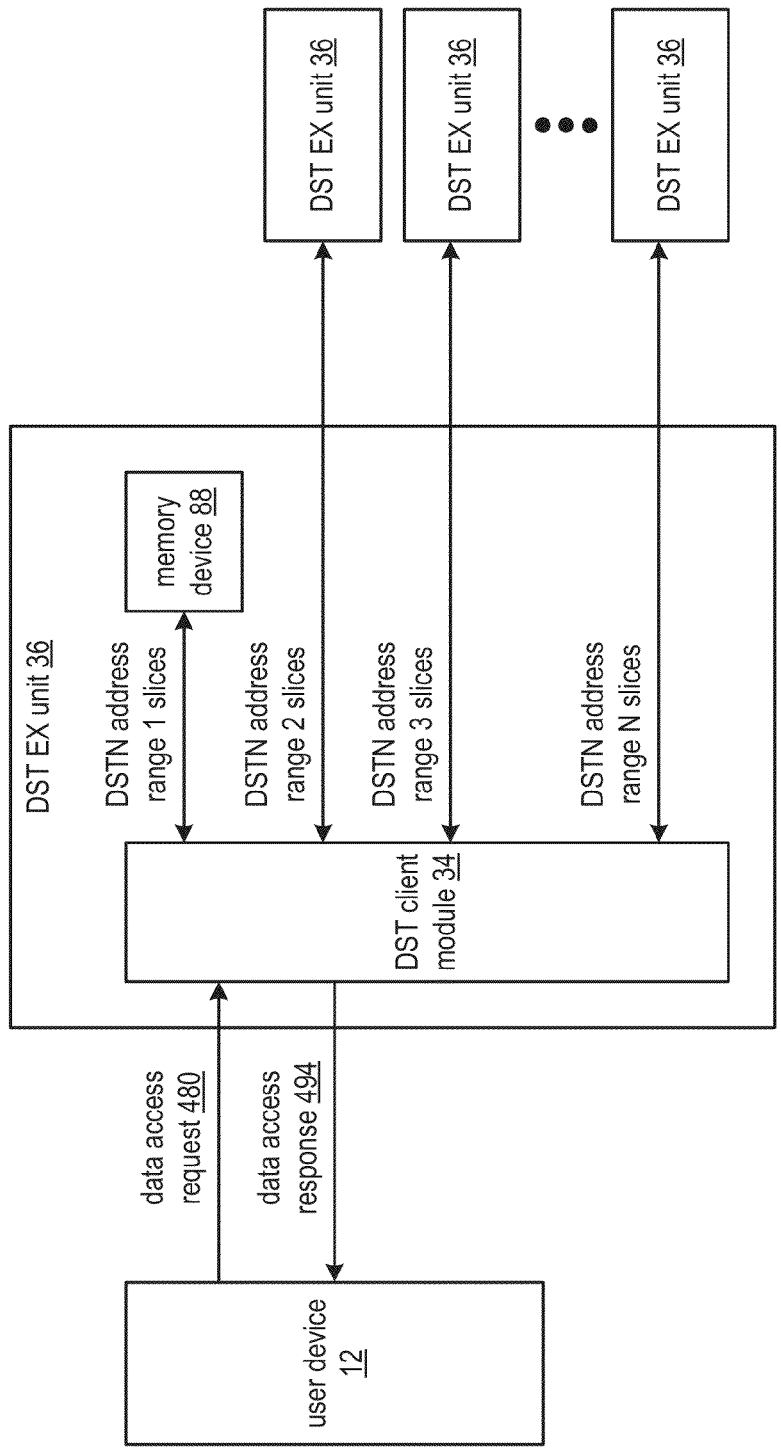
Figure 49B:
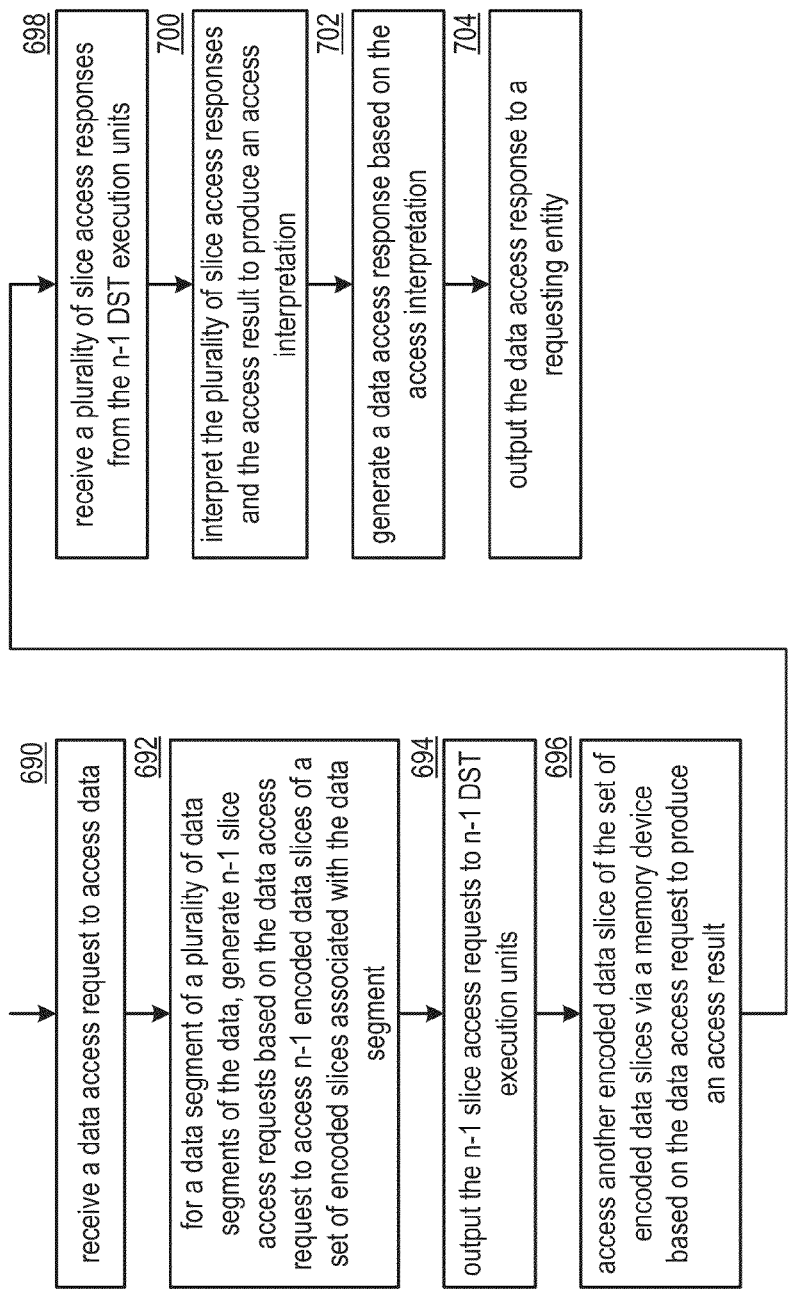

FIGS. 42B-C are diagrams illustrating examples of an addressing mapping in accordance with the present invention;

FIGS. 42D, E, F, and G are schematic block diagrams illustrating examples of logical storage node mapping to physical memories in accordance with the present invention;

FIG. 42H is a series of schematic block diagrams of storage nodes undergoing balancing of storage node utilization in accordance with the present invention;

FIG. 42I is a flowchart illustrating an example of balancing storage node utilization in accordance with the present invention;

FIG. 43A is a schematic block diagram of another embodiment of a distributed computing system in accordance with the present invention;

FIG. 43B is a flowchart illustrating an example of generating slice names in accordance with the present invention;

FIG. 44A is a schematic block diagram of another embodiment of a distributed computing system in accordance with the present invention;

FIG. 44B is a flowchart illustrating an example of ingesting data in accordance with the present invention;

FIGS. 45A-E are diagrams illustrating examples of hierarchical data access control information in accordance with the present invention;

FIGS. 45F-I are schematic block diagrams of more embodiments of a dispersed storage network (DSN) in accordance with the present invention;

FIG. 45J is a flowchart illustrating an example of utilizing data access control in accordance with the present invention;

FIG. 45K is a flowchart illustrating an example of maintaining access control information for data storage in accordance with the present invention;

FIG. 45L is a flowchart illustrating an example of updating a logical memory access control file in accordance with the present invention;

FIG. 45M is a flowchart illustrating an example of updating a data object access control file in accordance with the present invention;

FIG. 46A is a schematic block diagram of another embodiment of a distributed computing system in accordance with the present invention;

FIG. 46B is a flowchart illustrating another example of providing access control to data in accordance with the present invention;

FIG. 47A is a schematic block diagram of another embodiment of a distributed computing system in accordance with the present invention;

FIG. 47B is a flowchart illustrating an example of providing access to data in accordance with the present invention; and FIGS. 48A-D are schematic block diagrams of another embodiment of a dispersed storage network (DSN) illustrating example steps of processing an unsuccessful write request in accordance with the present invention;

FIG. 48E is a flowchart illustrating an example of processing an unsuccessful write request in accordance with the present invention;

FIG. 49A is a schematic block diagram of another embodiment of a distributed computing system in accordance with the present invention; and FIG. 49B is a flowchart illustrating another example of providing access to data in accordance with the present invention.

DETAILED DESCRIPTION OF THE INVENTION

Figure 1:
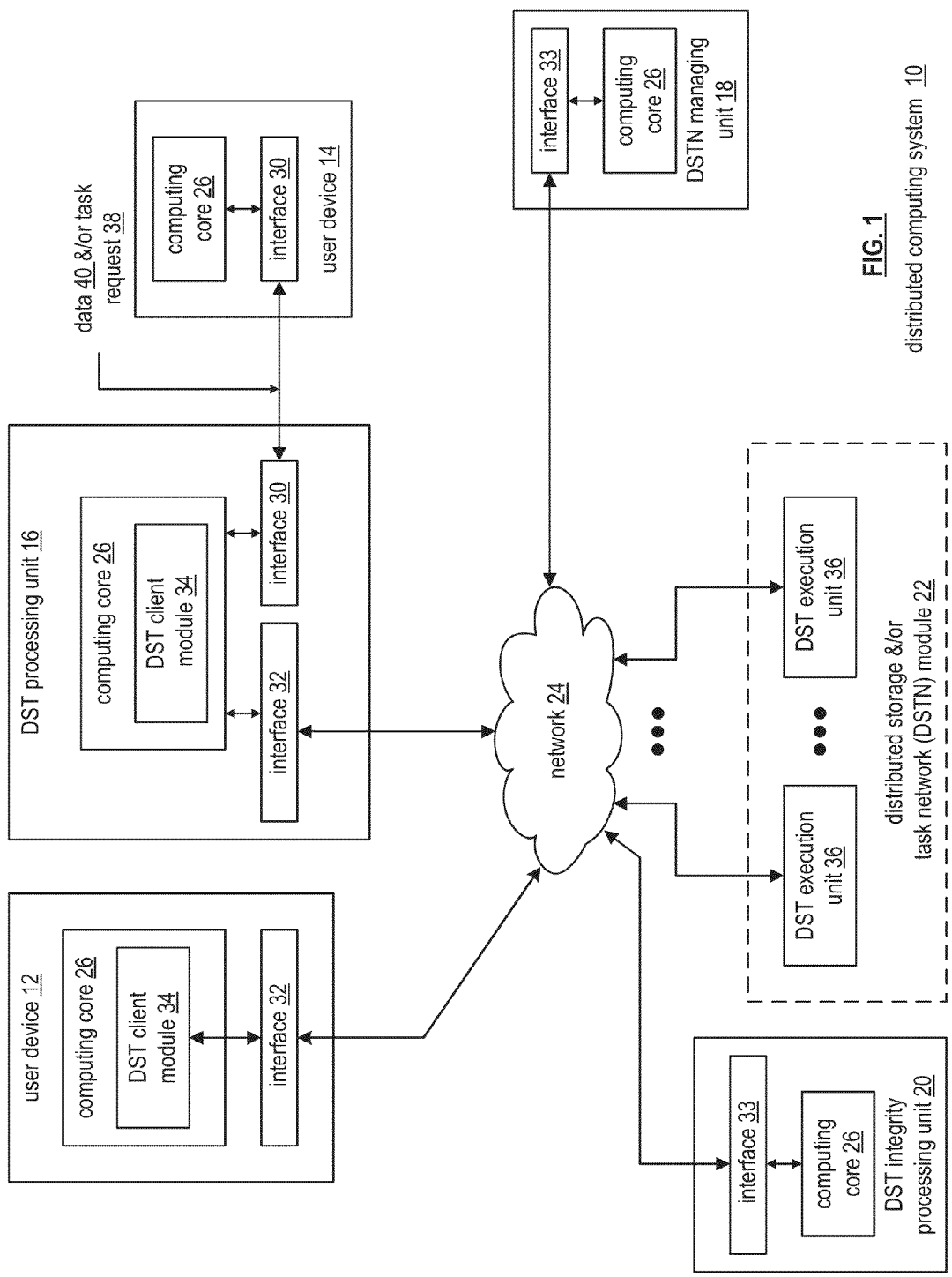
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing module unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
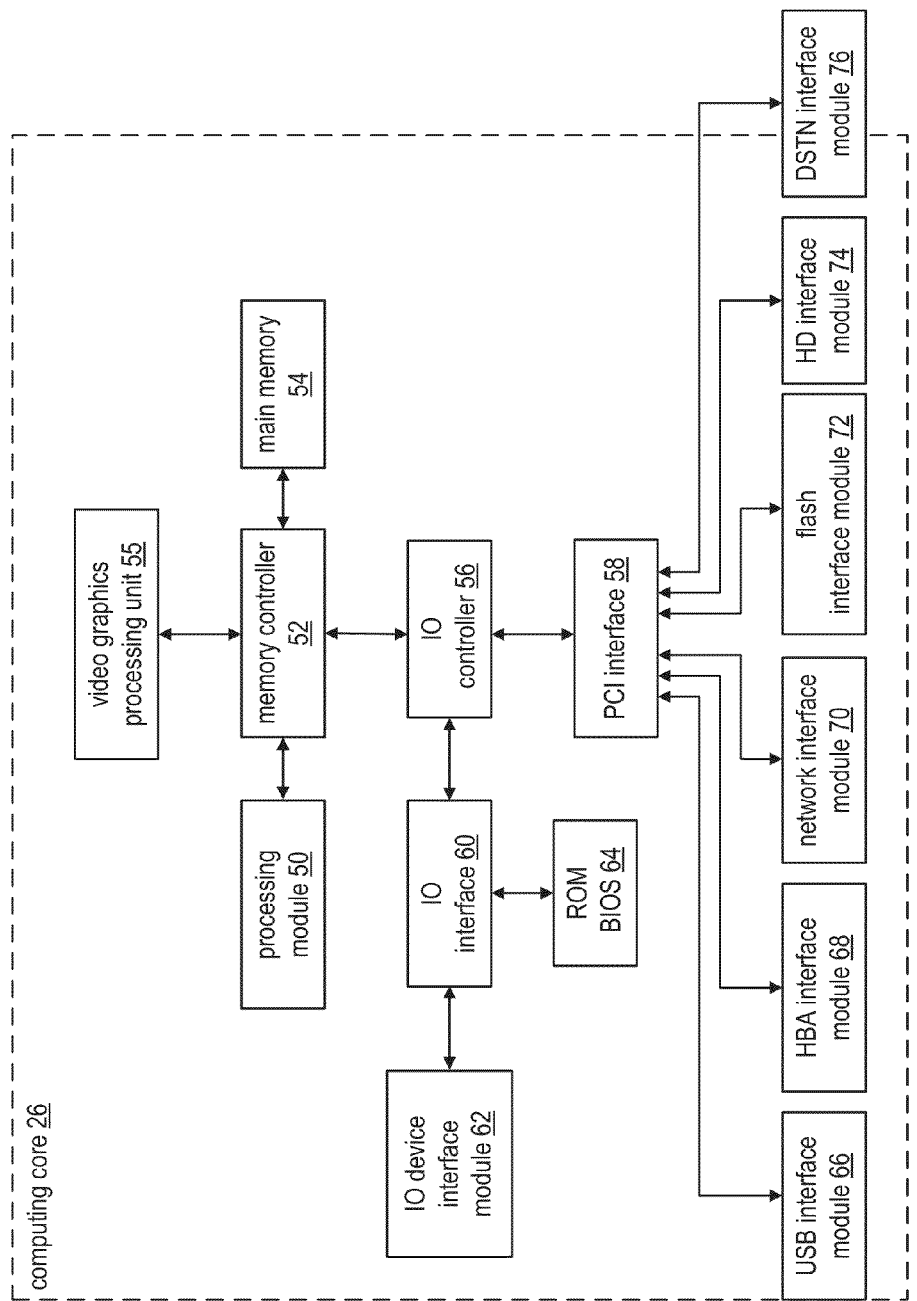
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
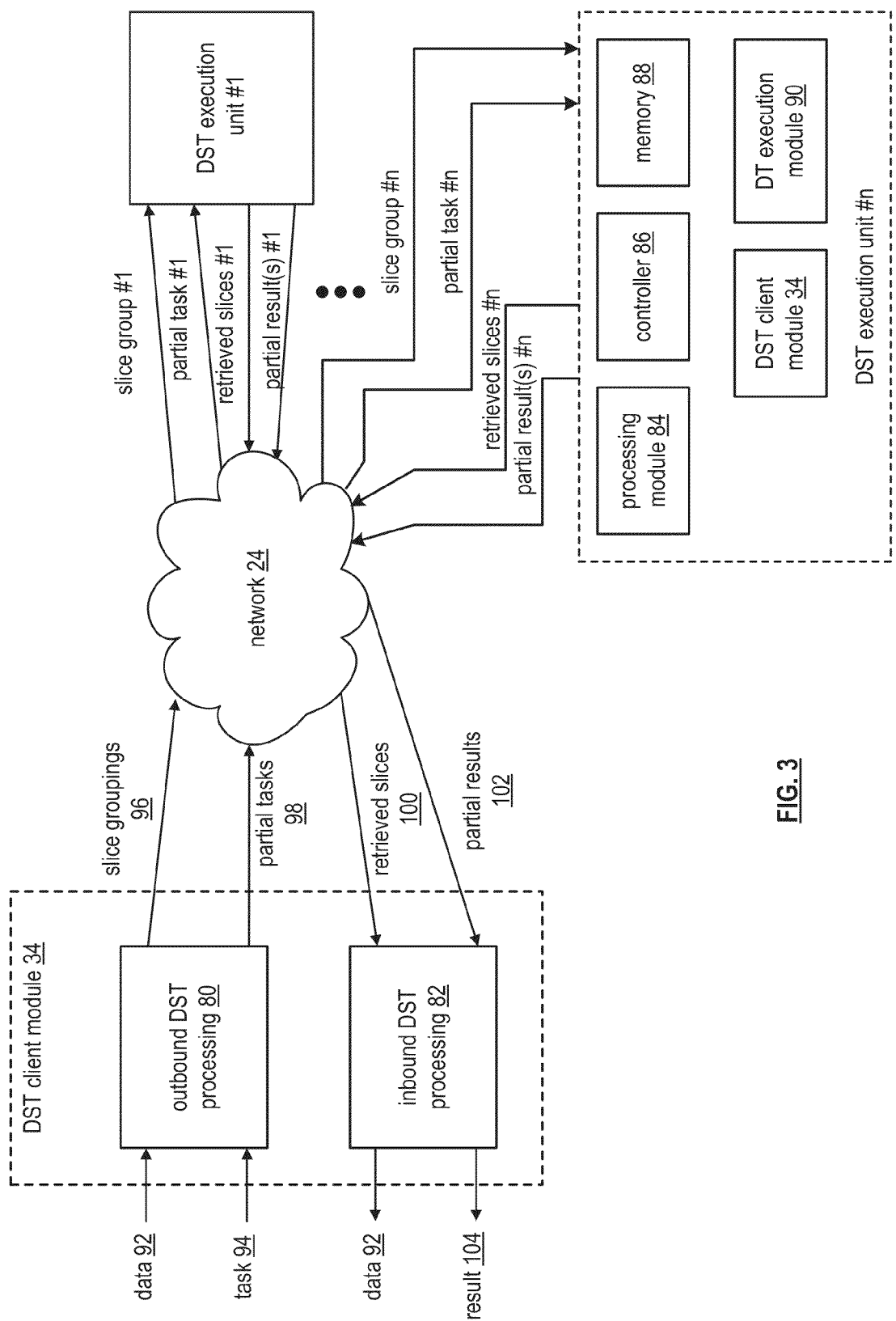
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1.

As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
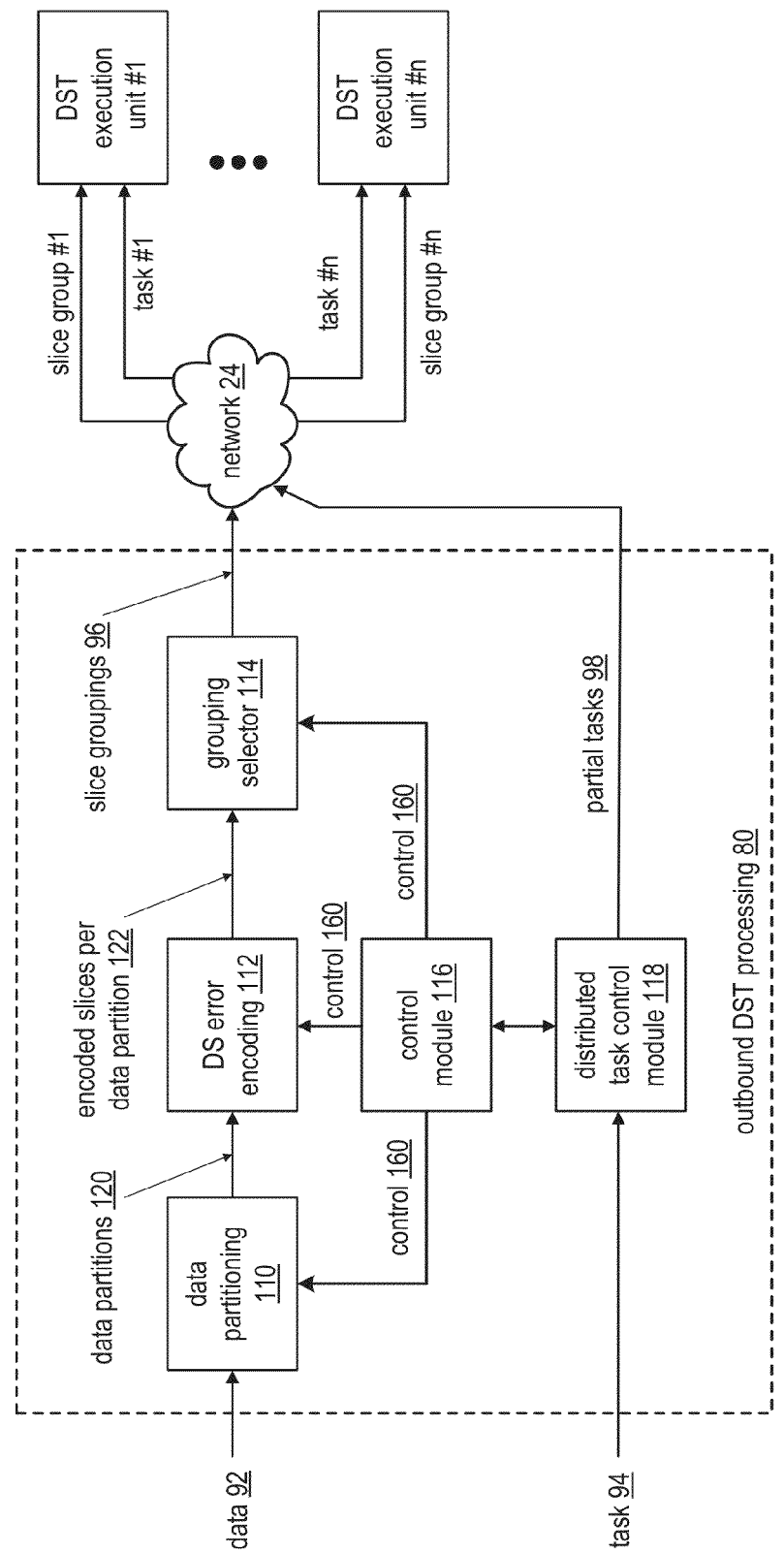
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
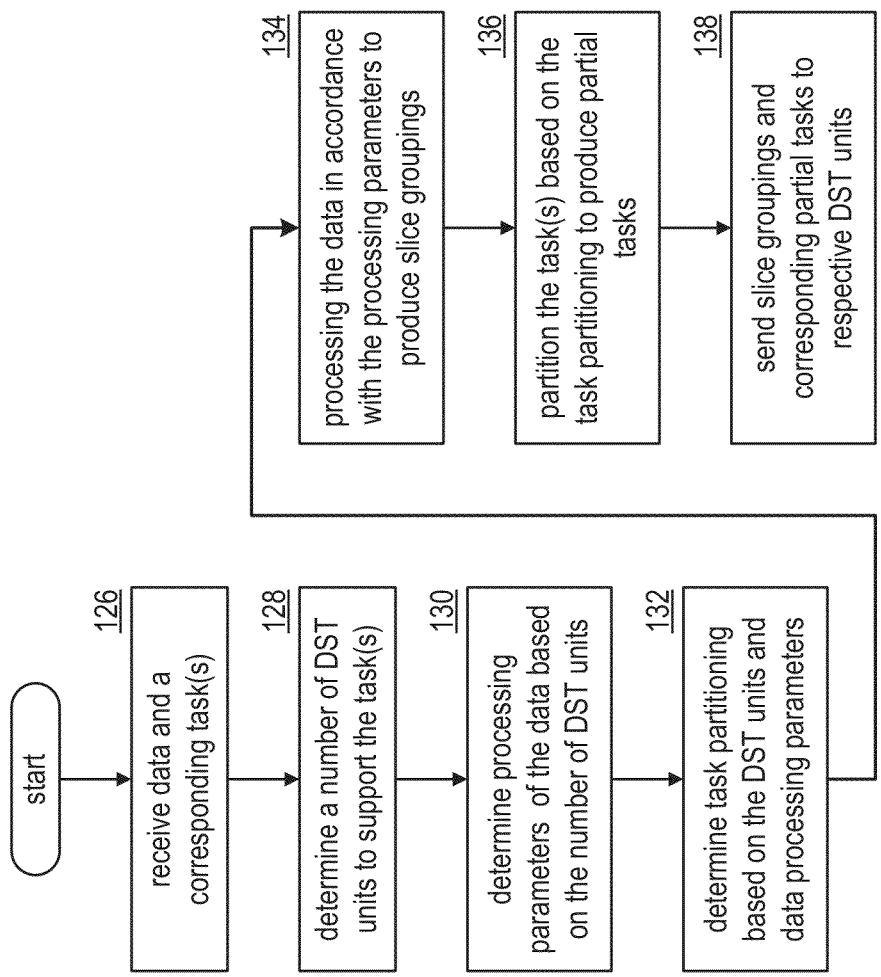
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
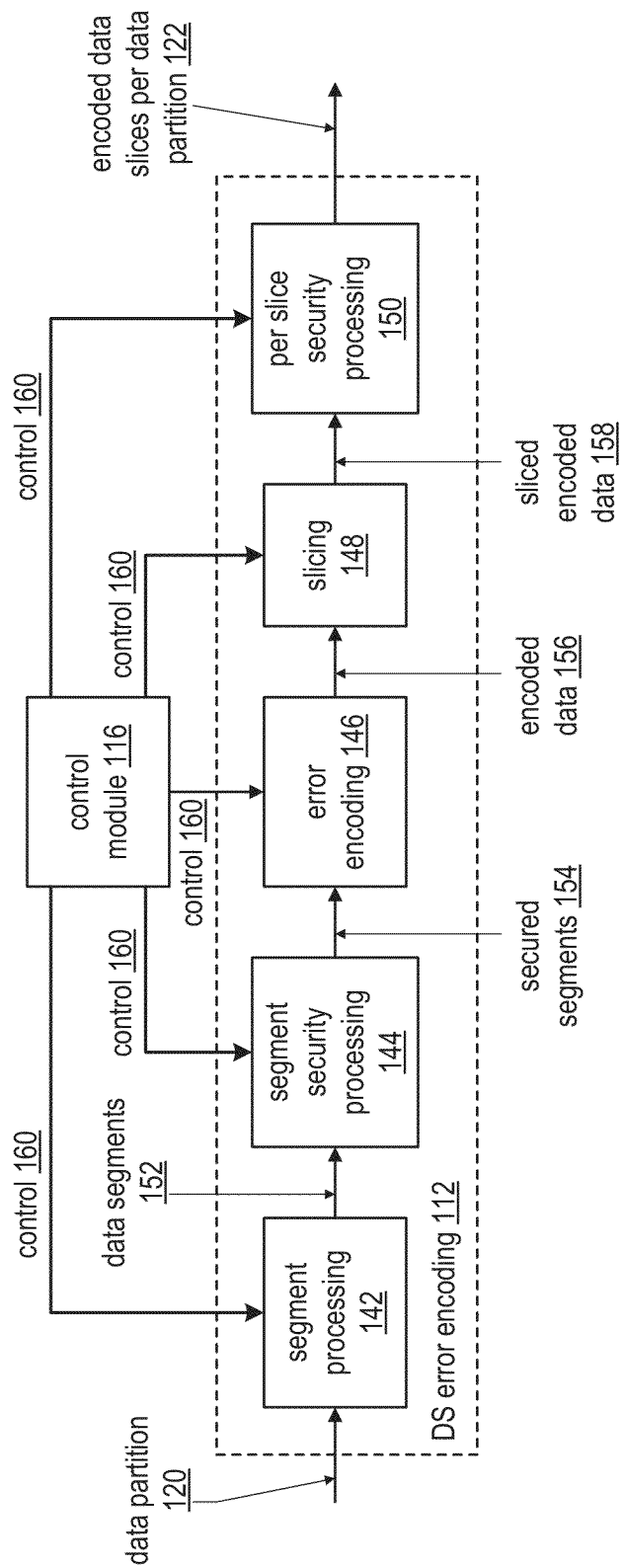
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
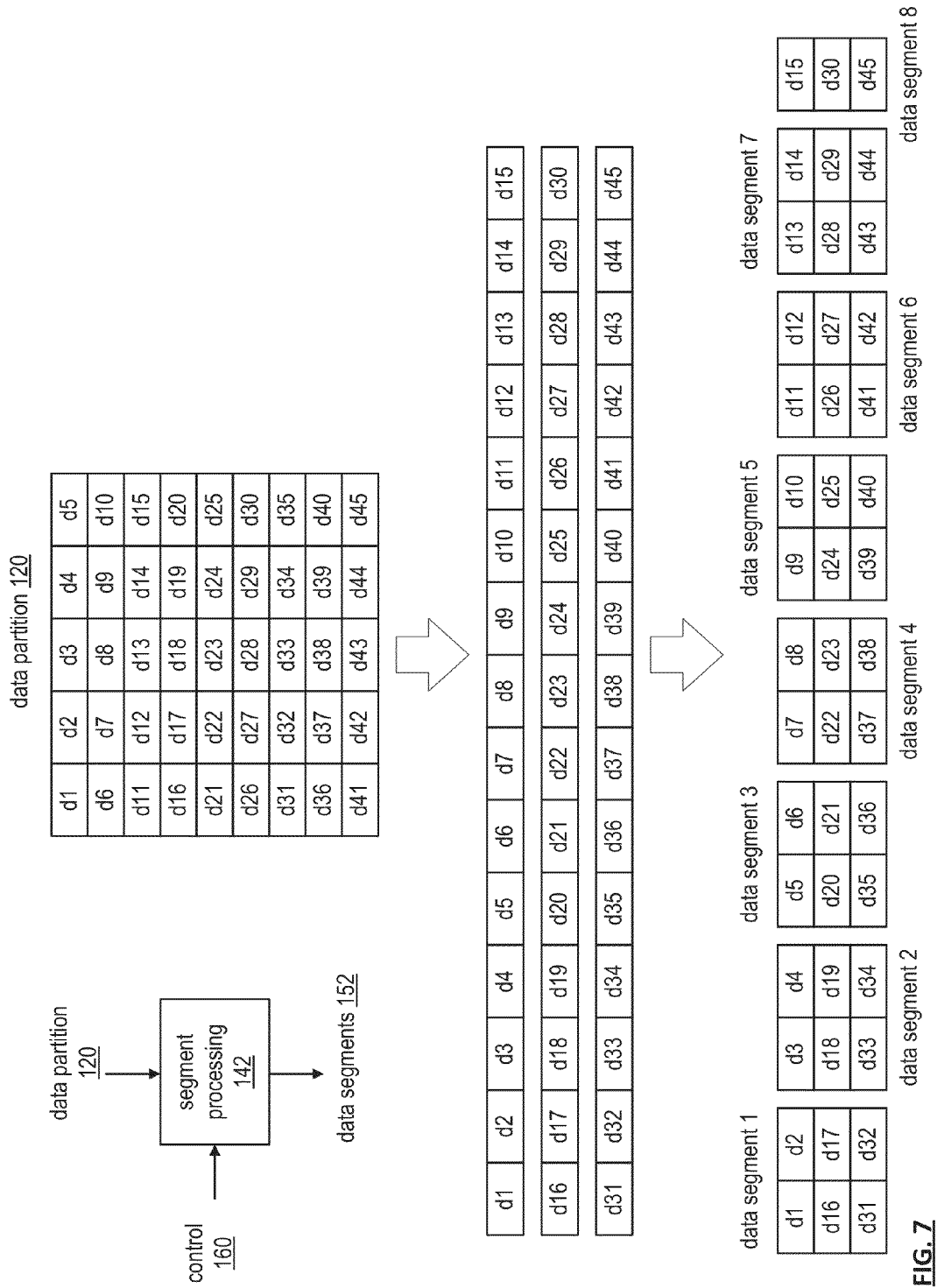
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
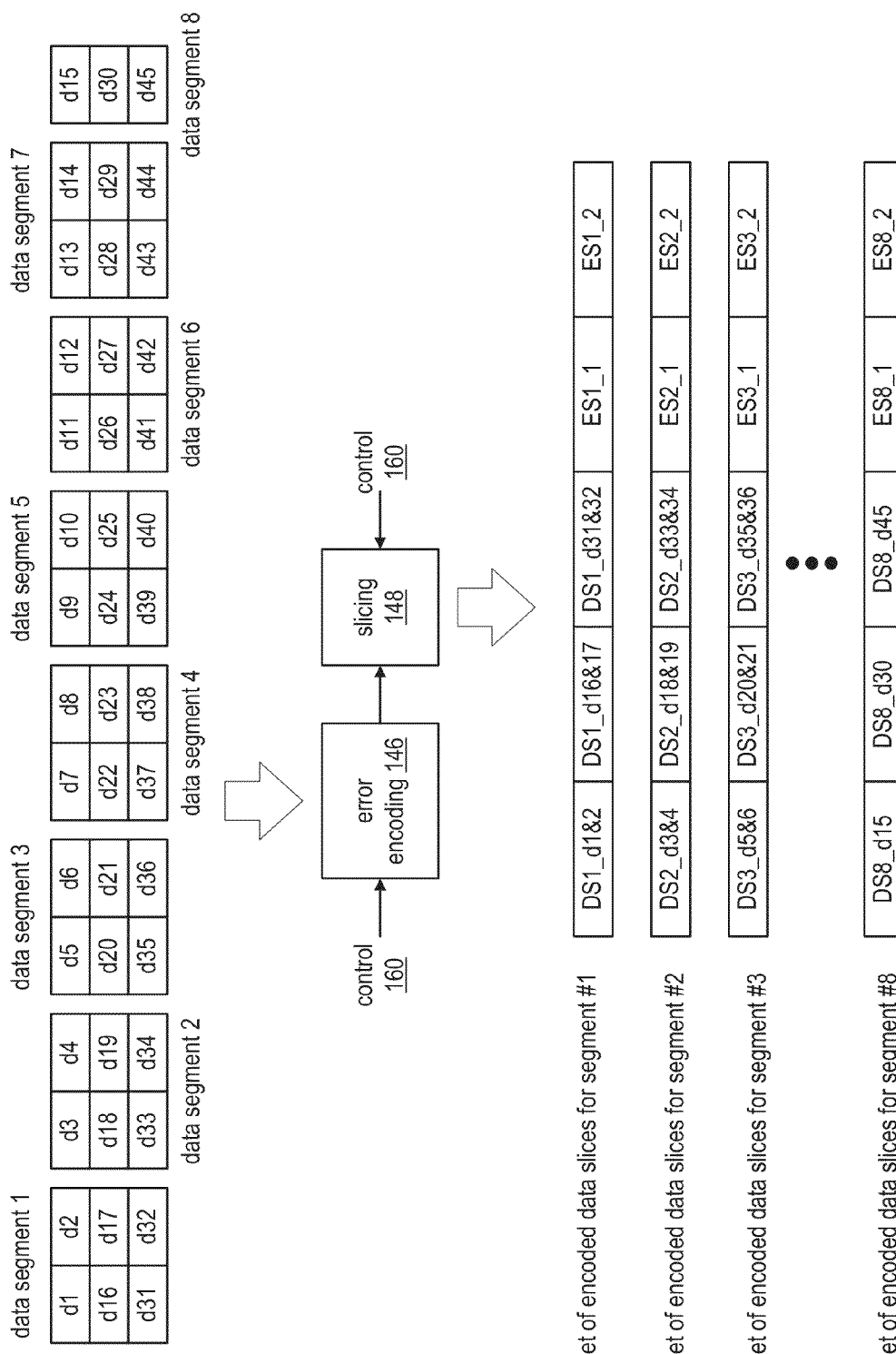
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3 , the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first—third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first—third words of the second data segment.

Figure 9:
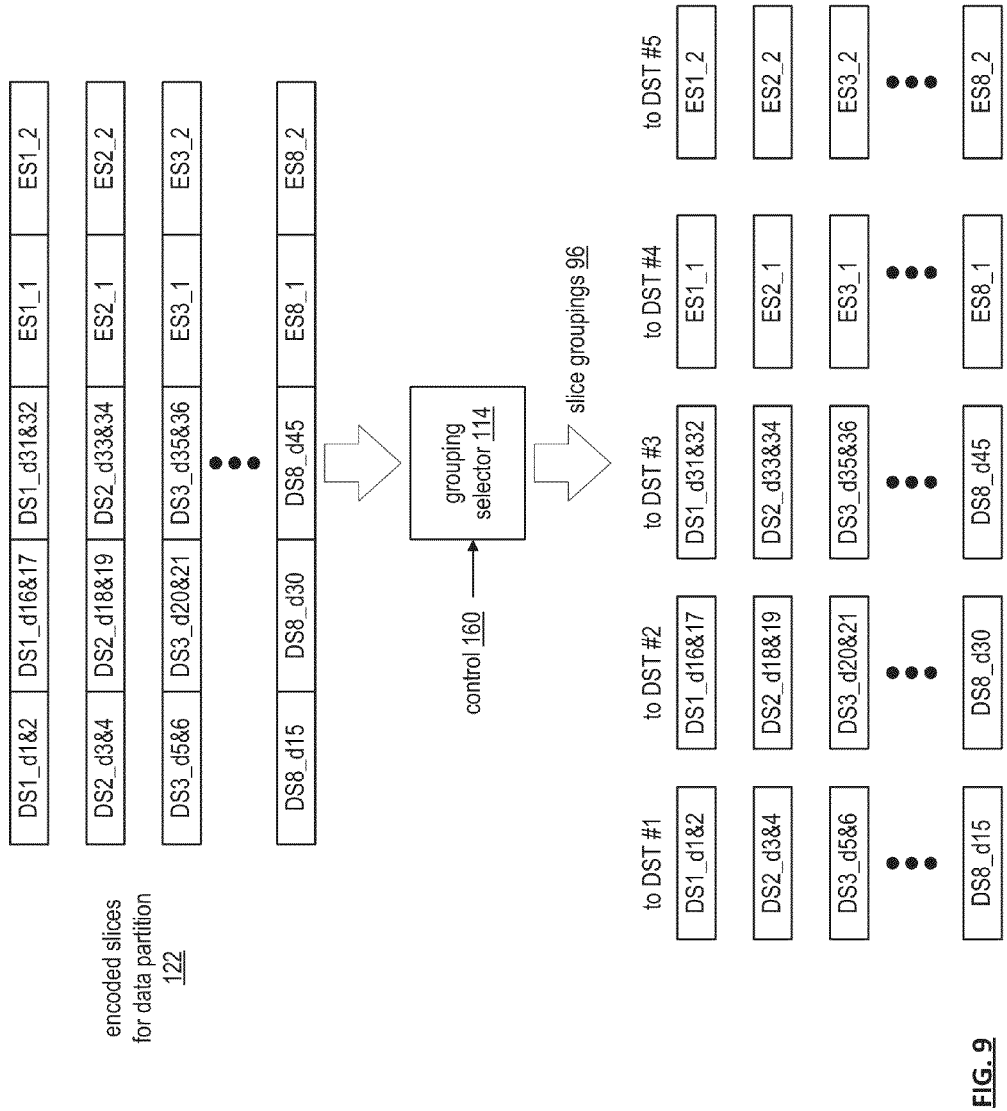
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices.

As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
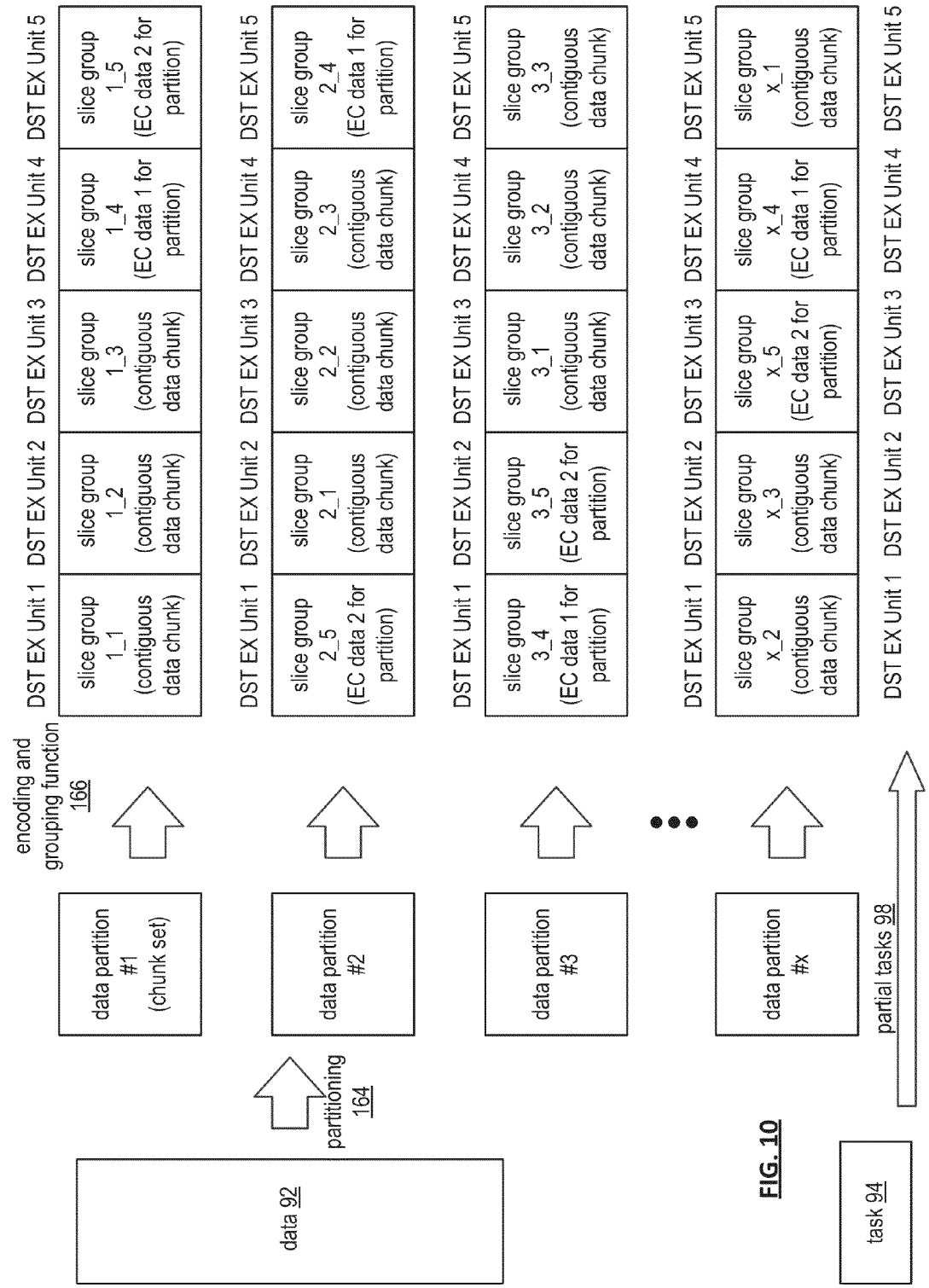
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
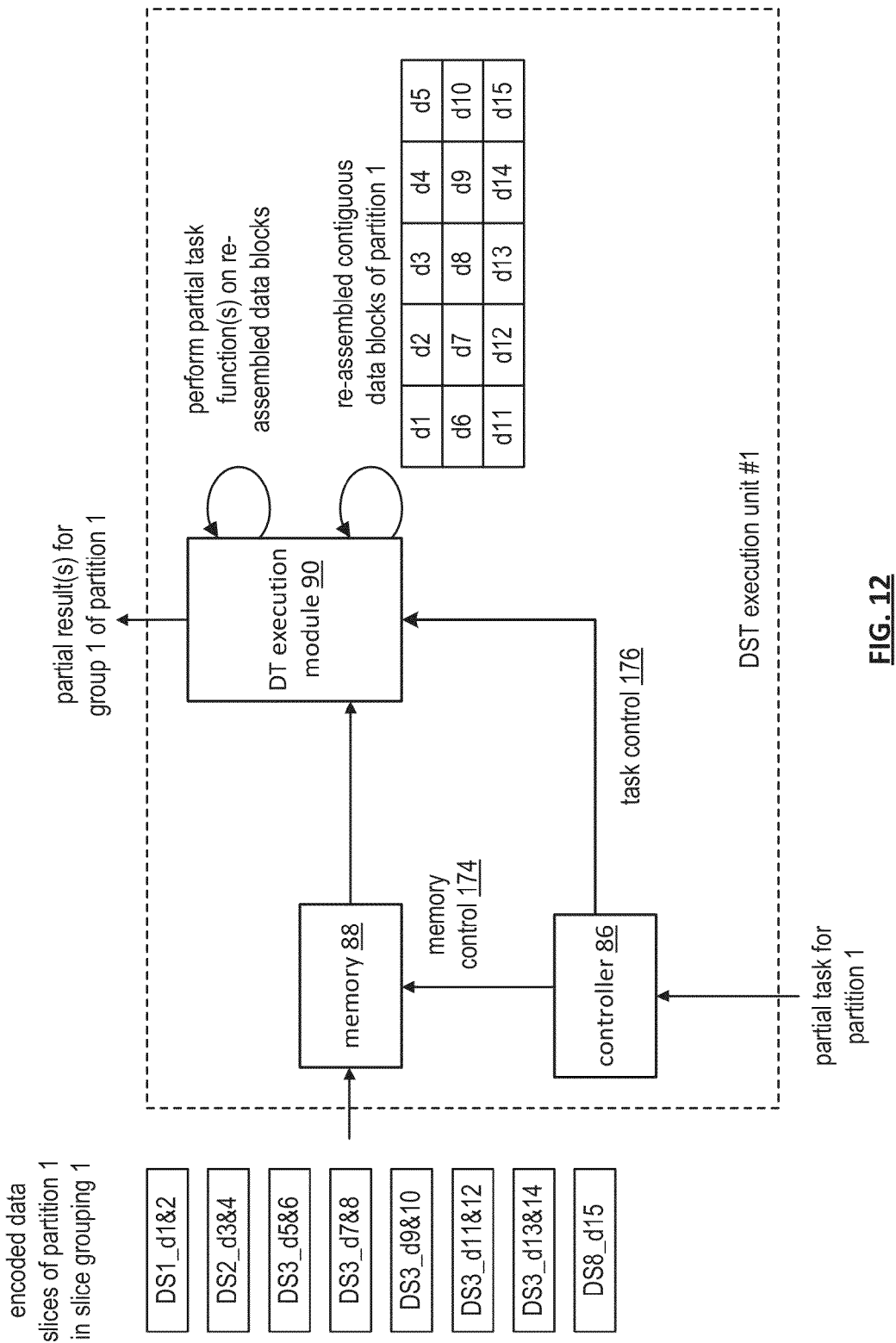
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
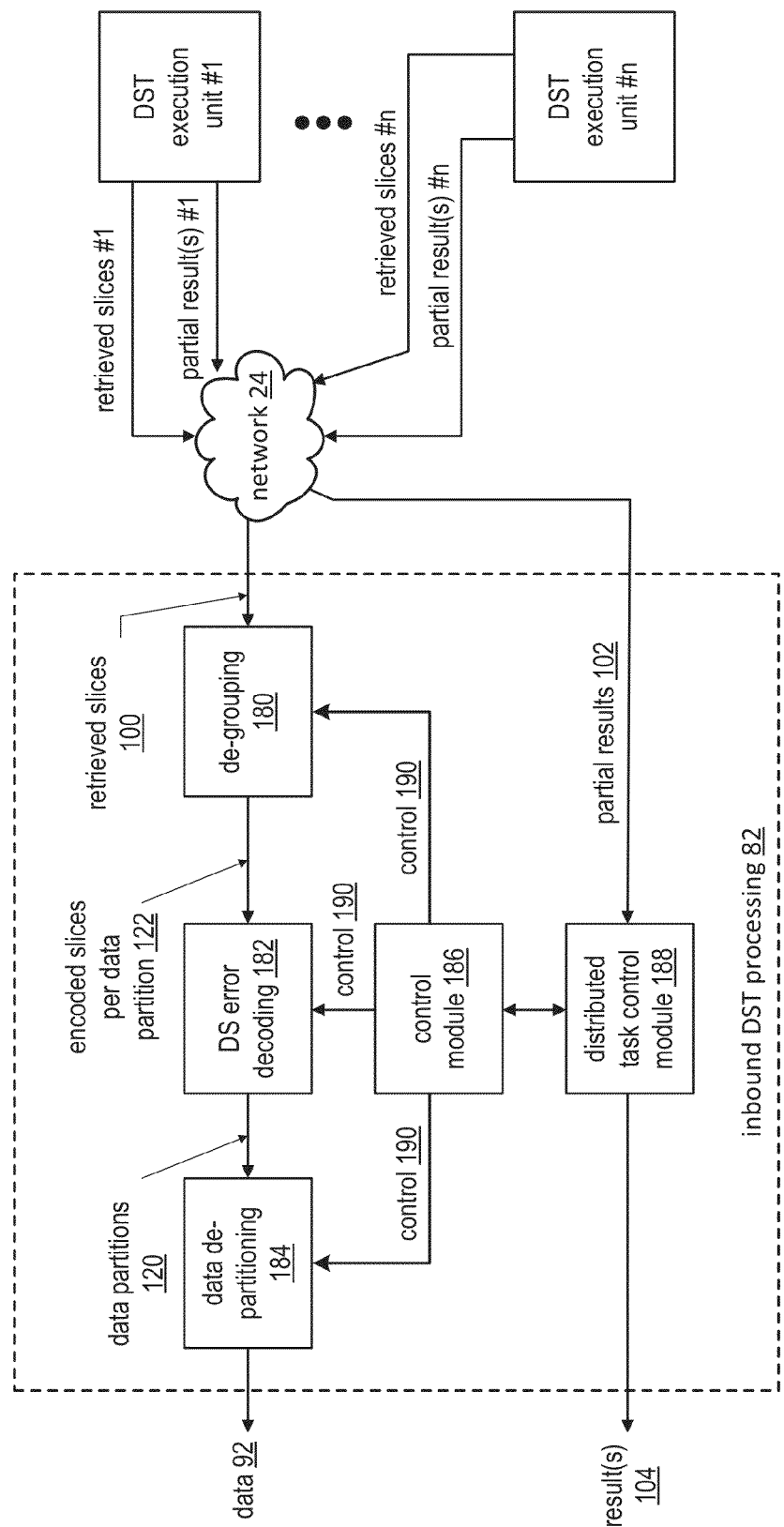
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
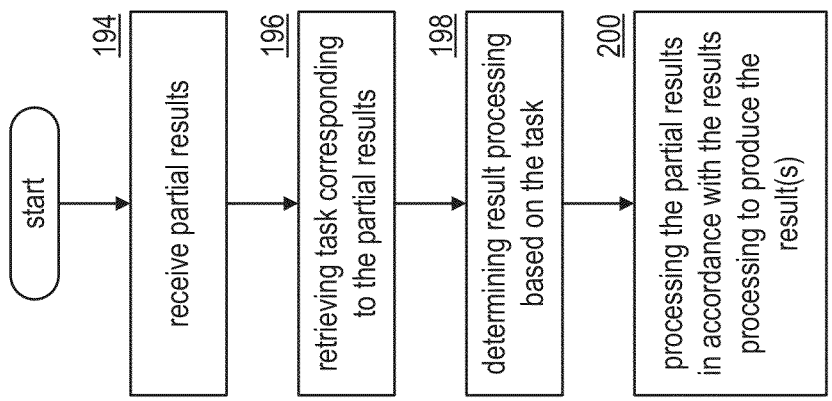
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
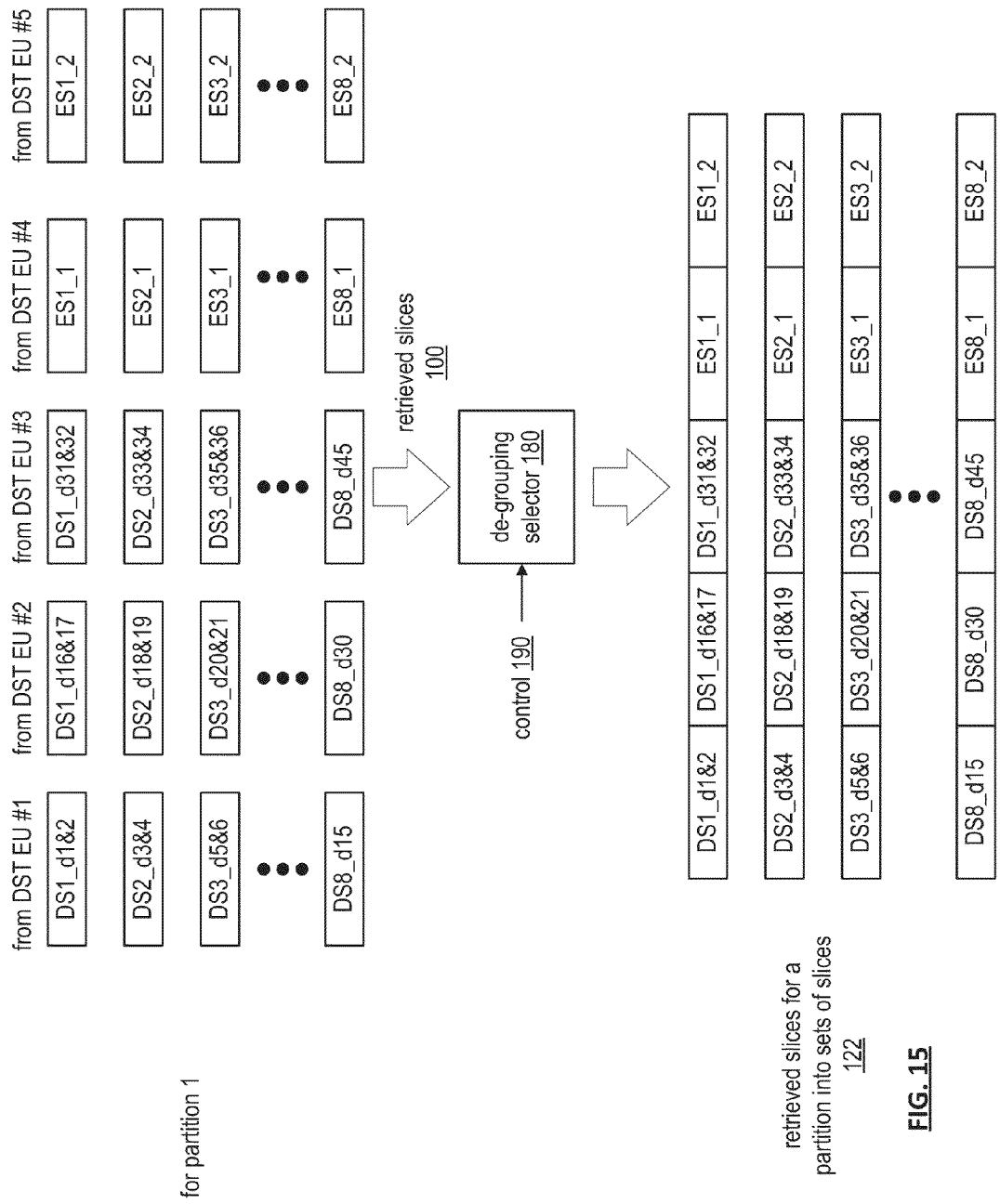
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
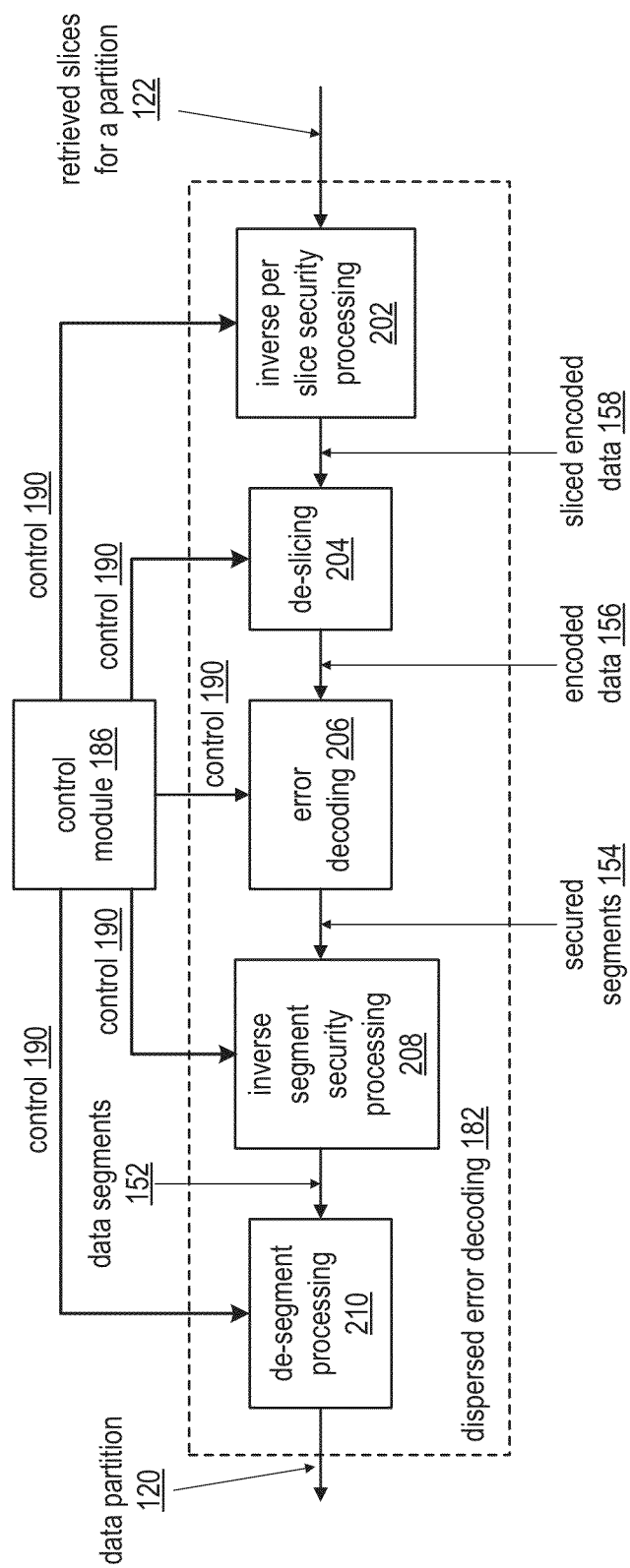
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186.

The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
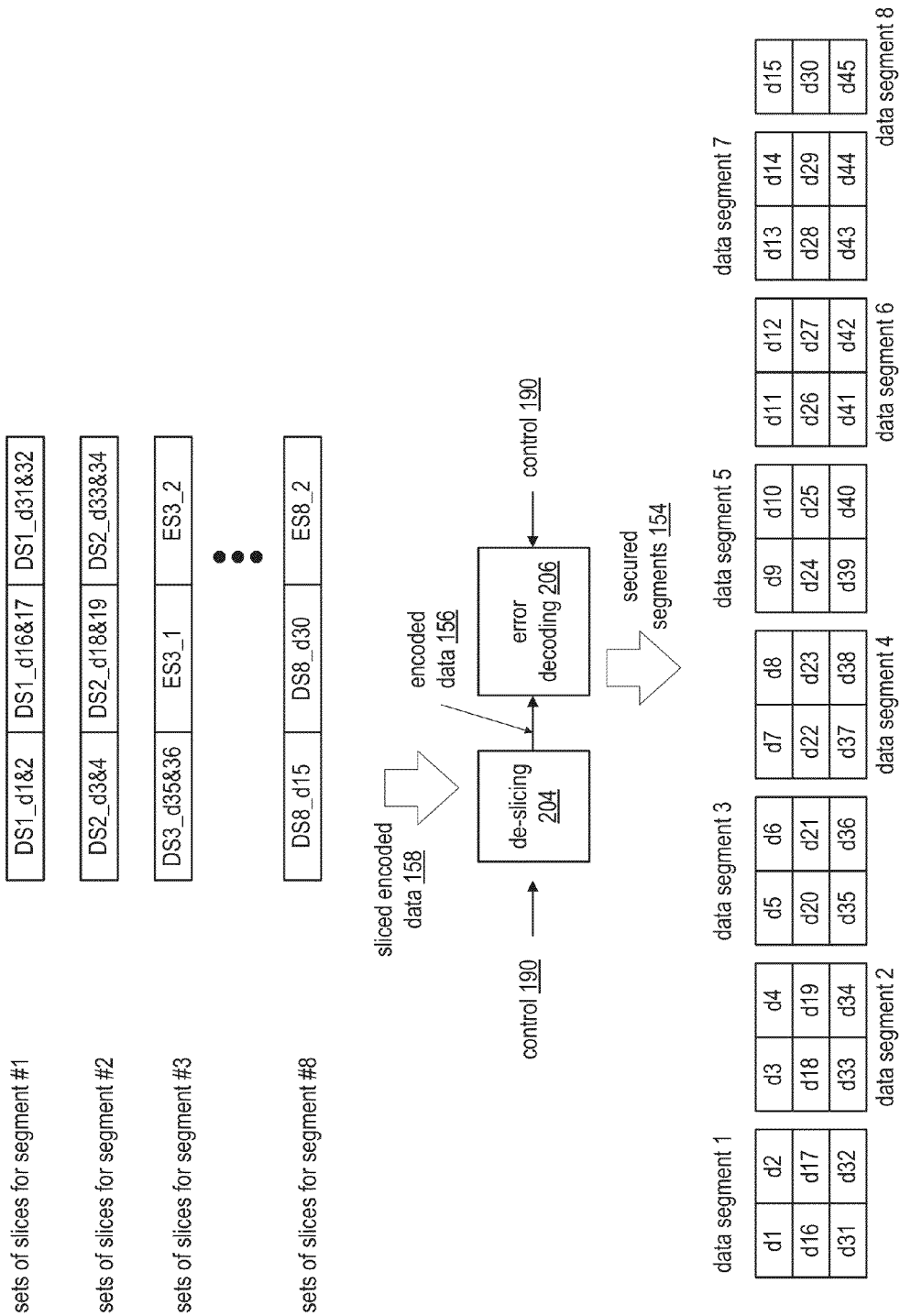
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
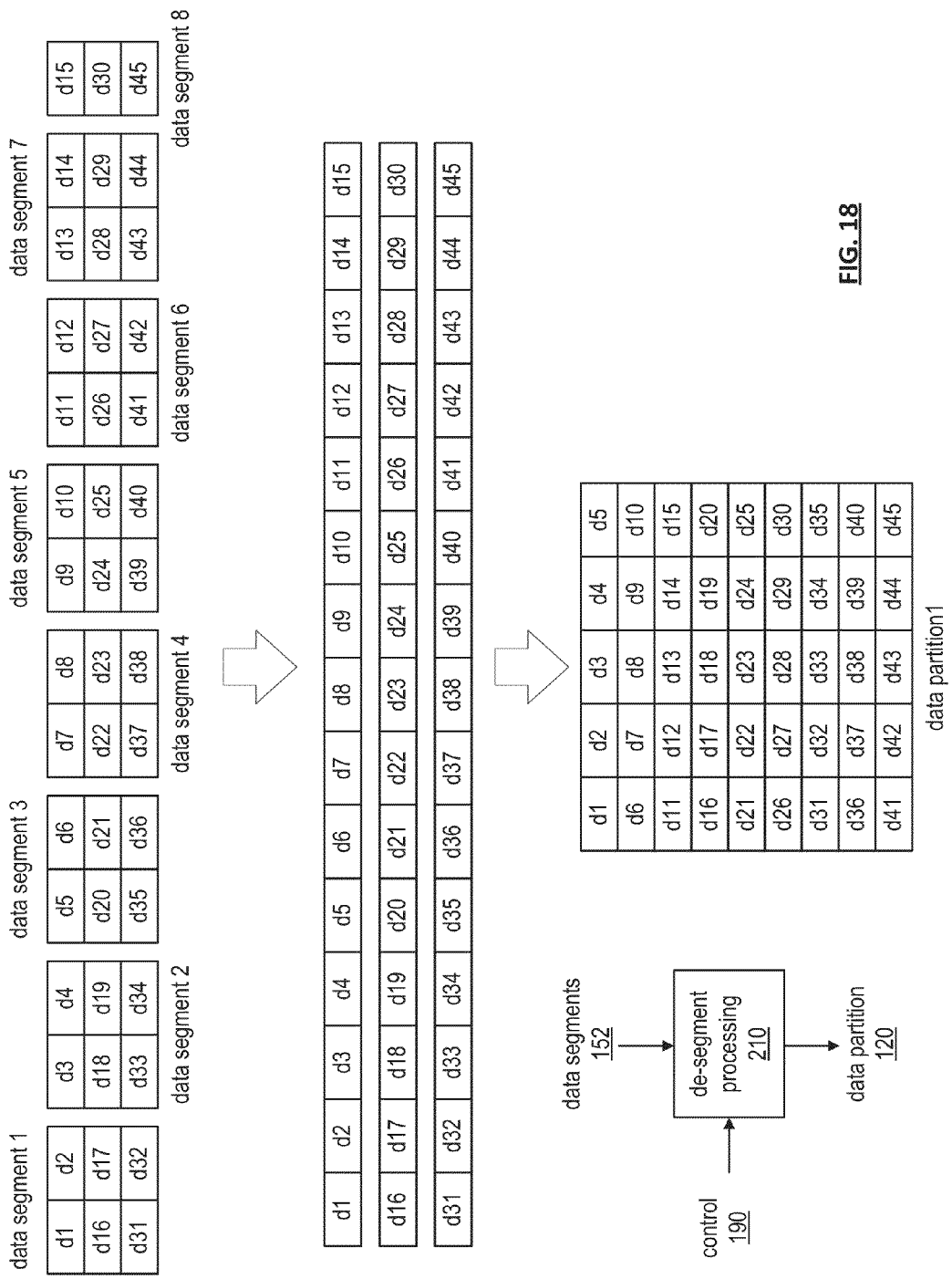
FIG. 18 is a diagram of an example of de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
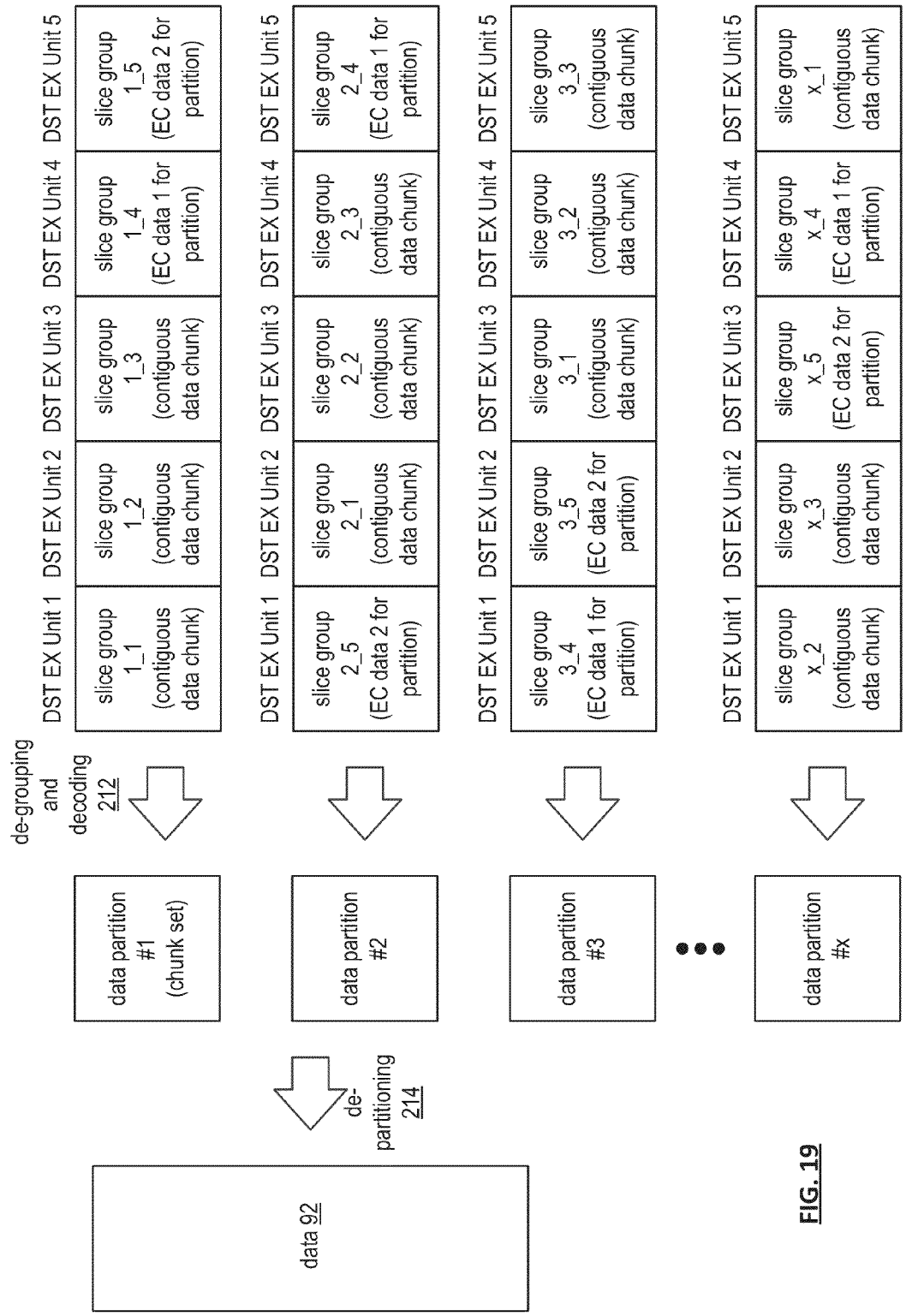
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
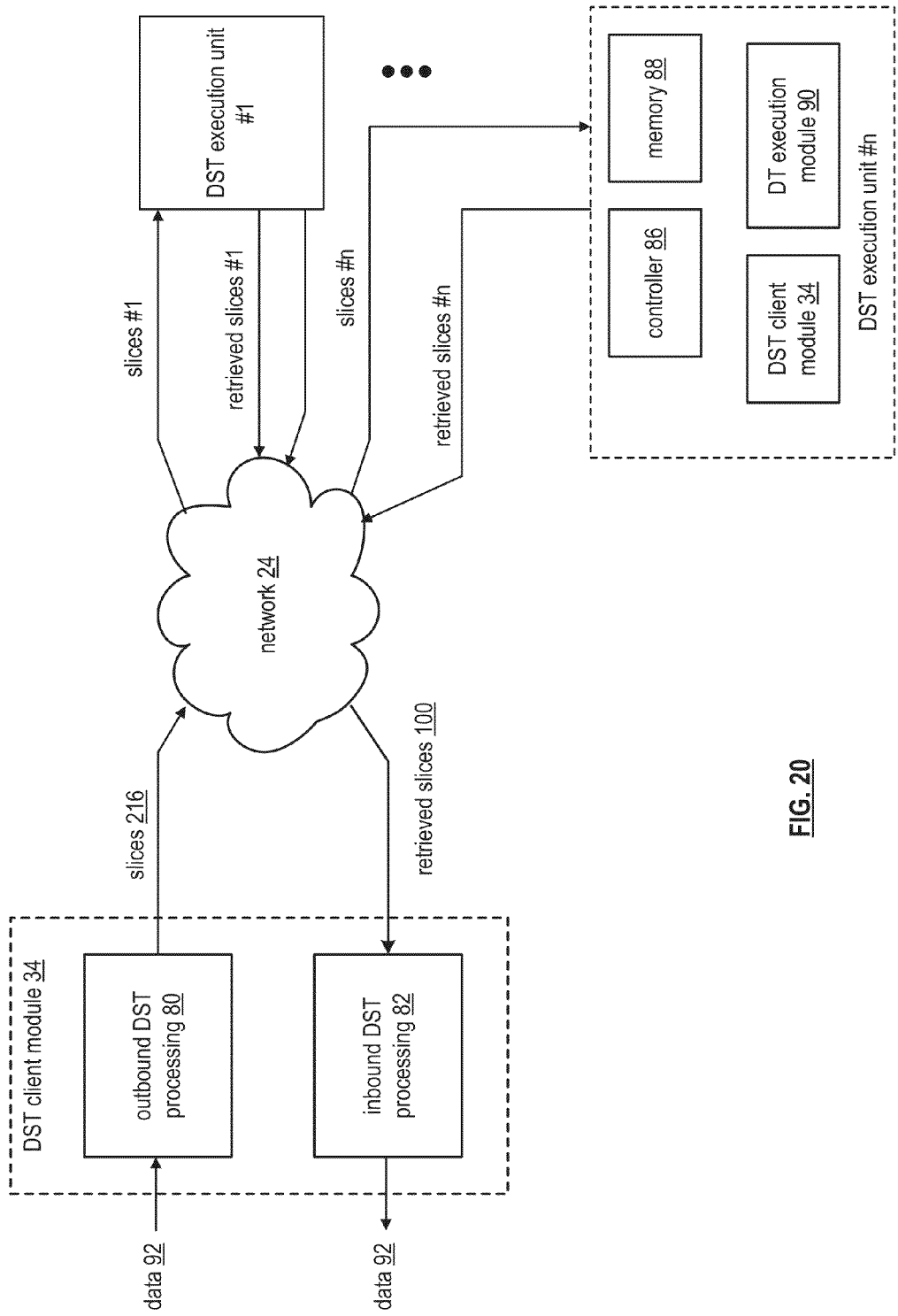
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
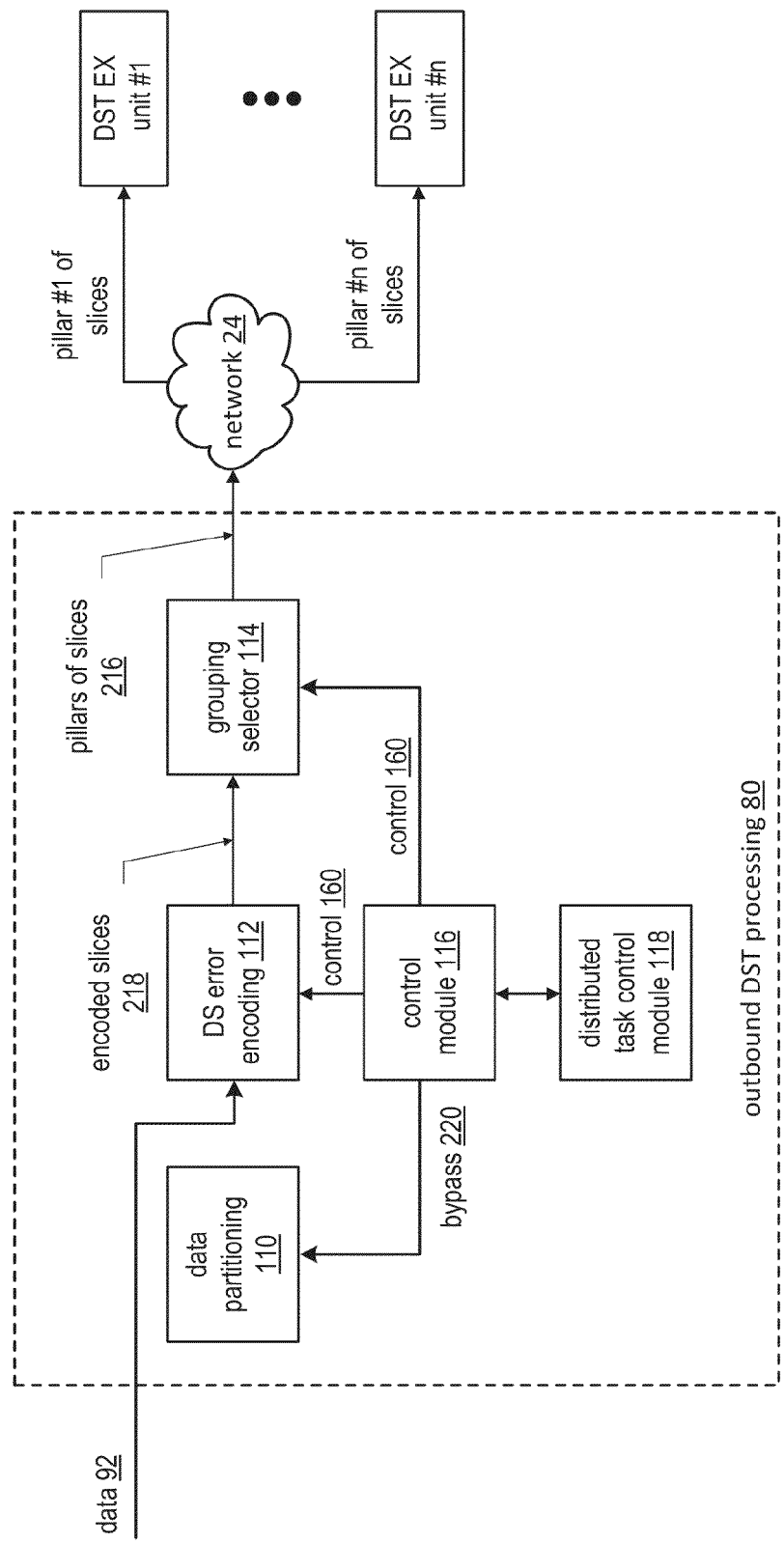
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
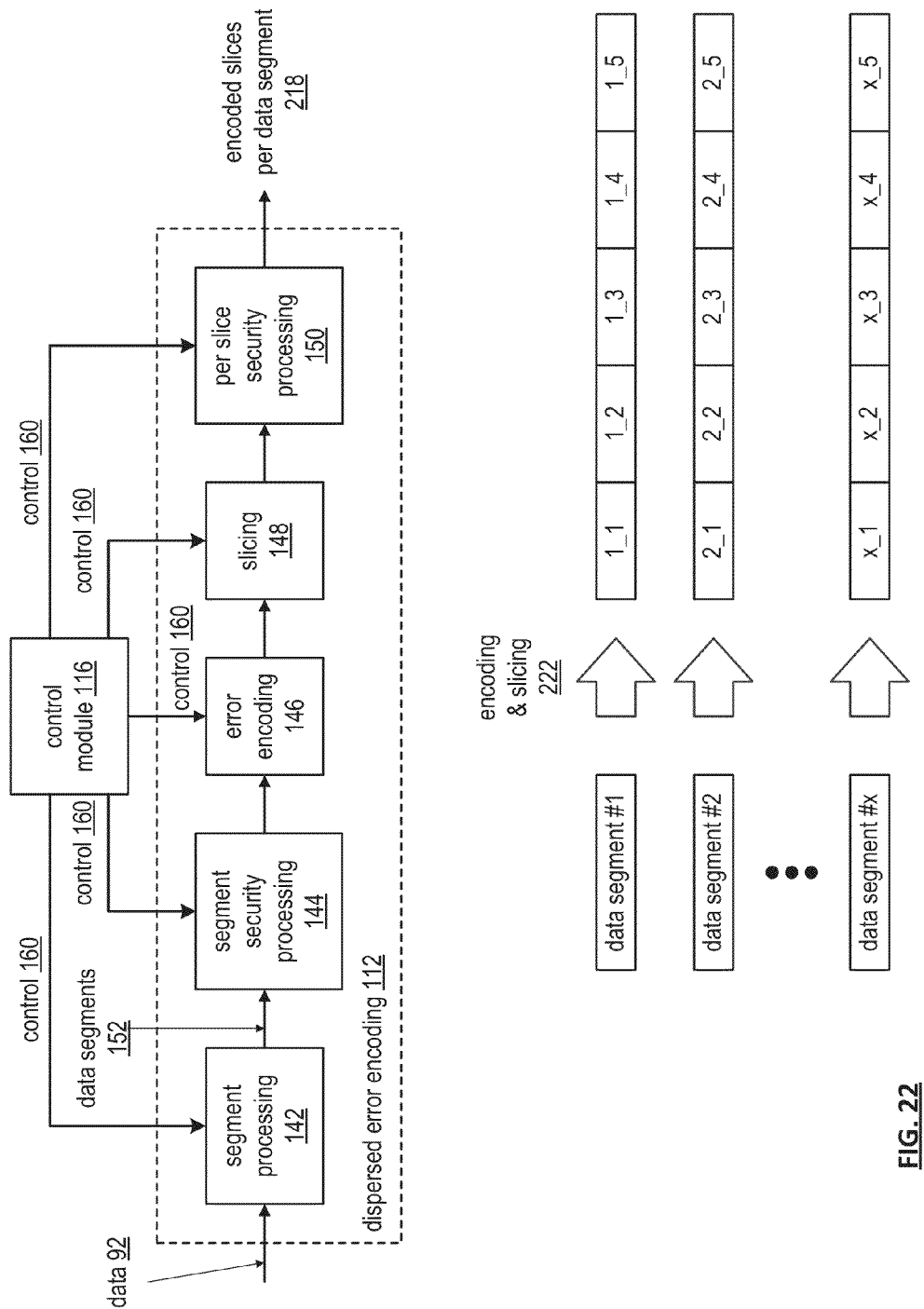
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
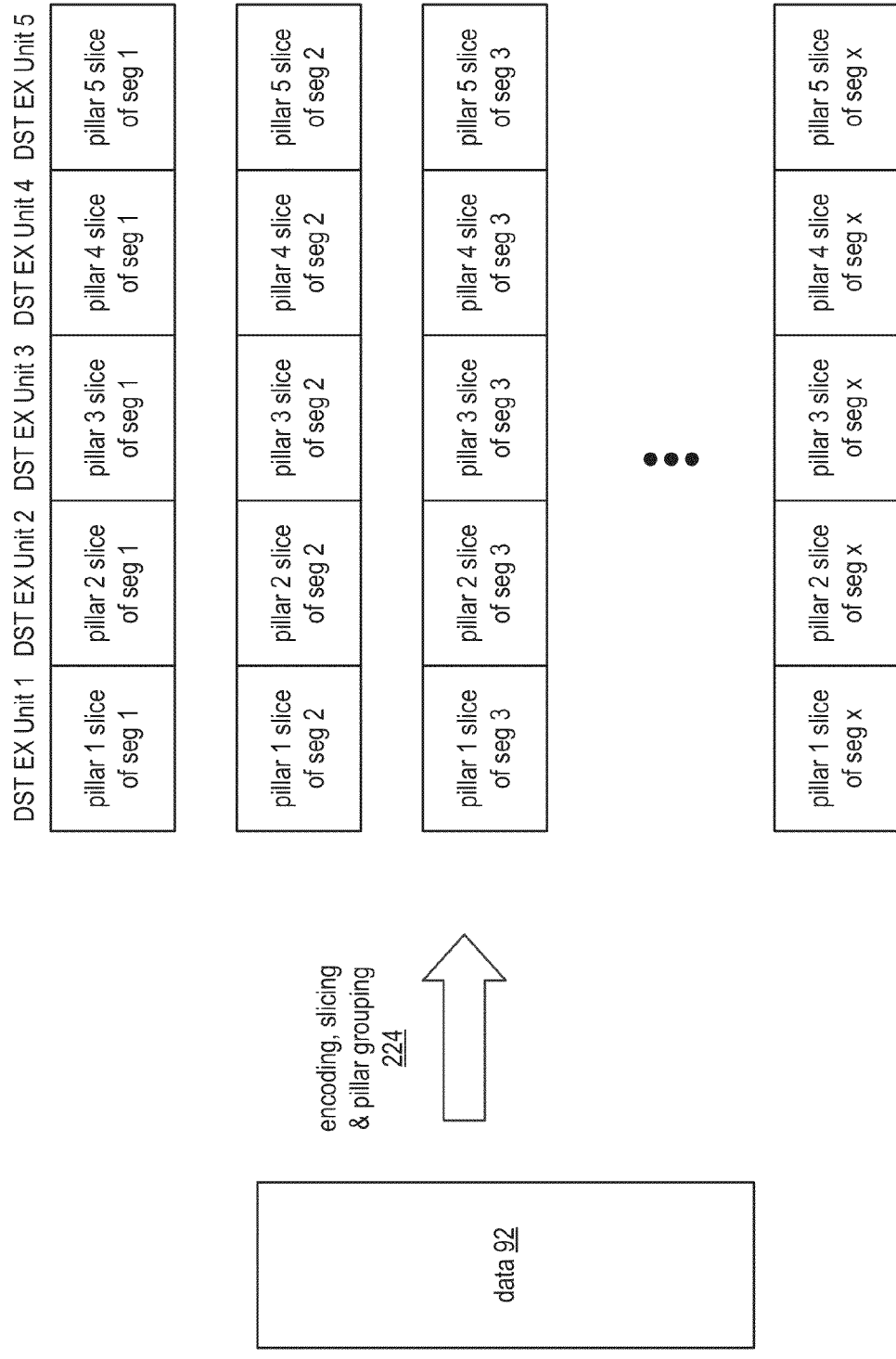
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
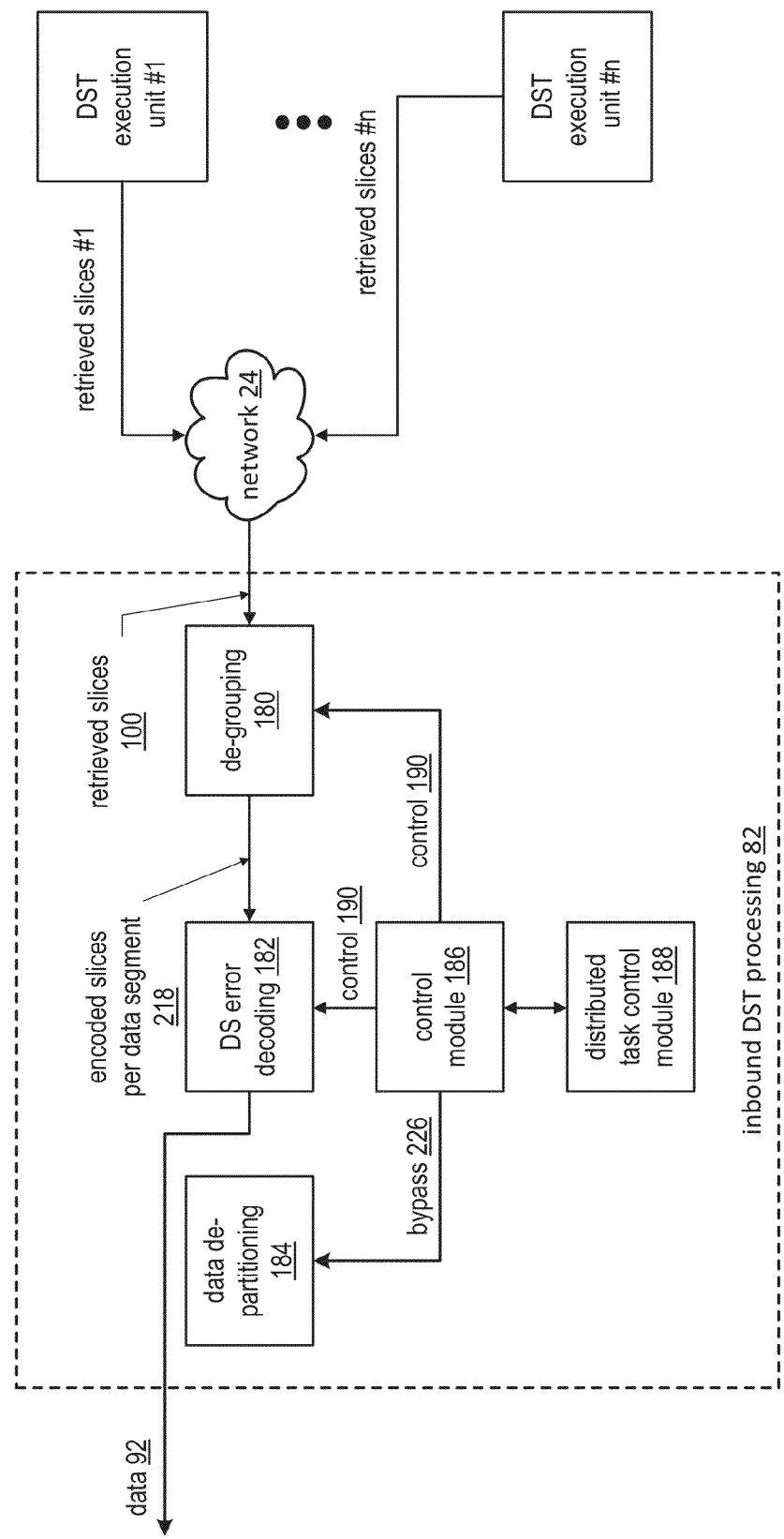
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
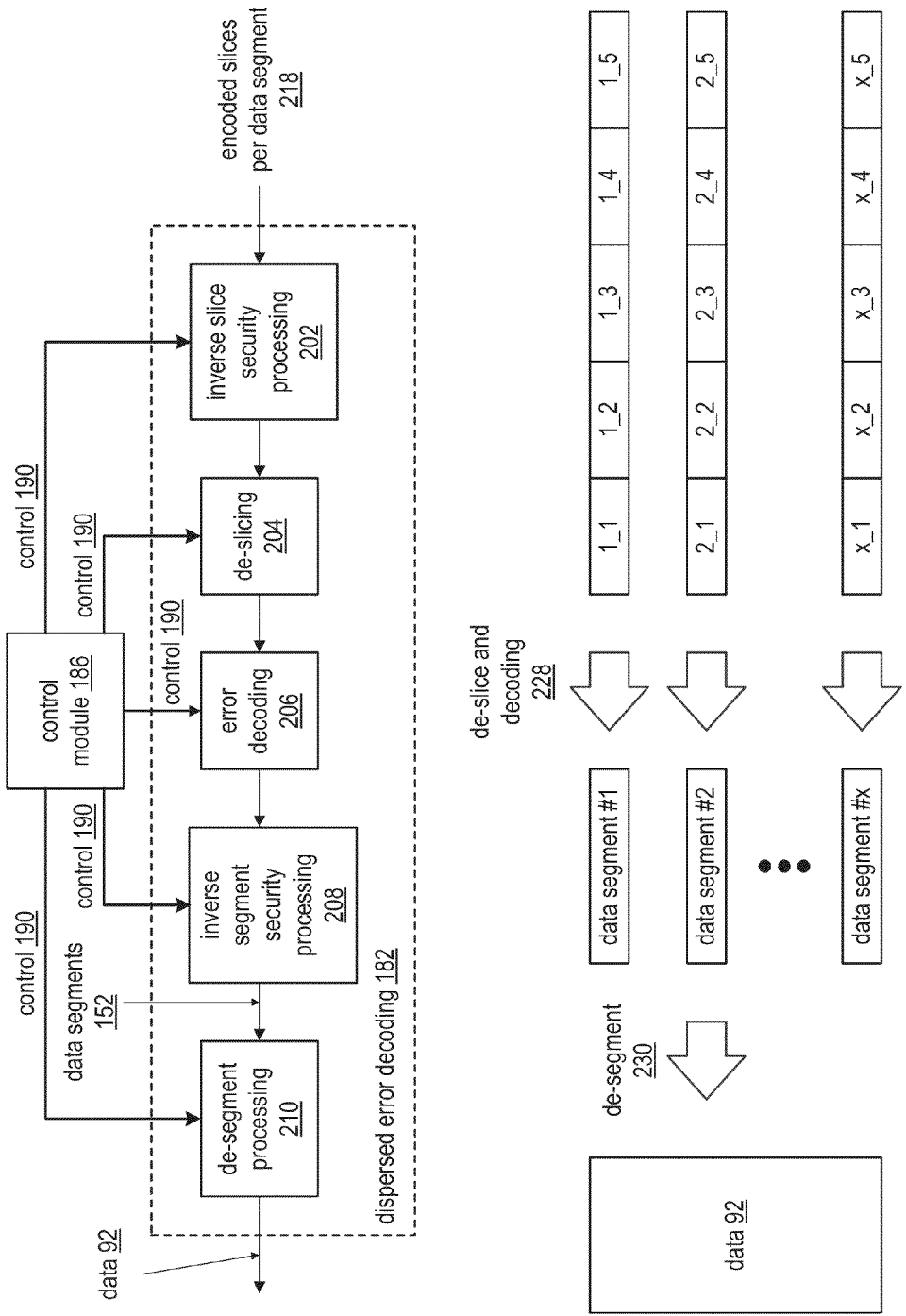
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
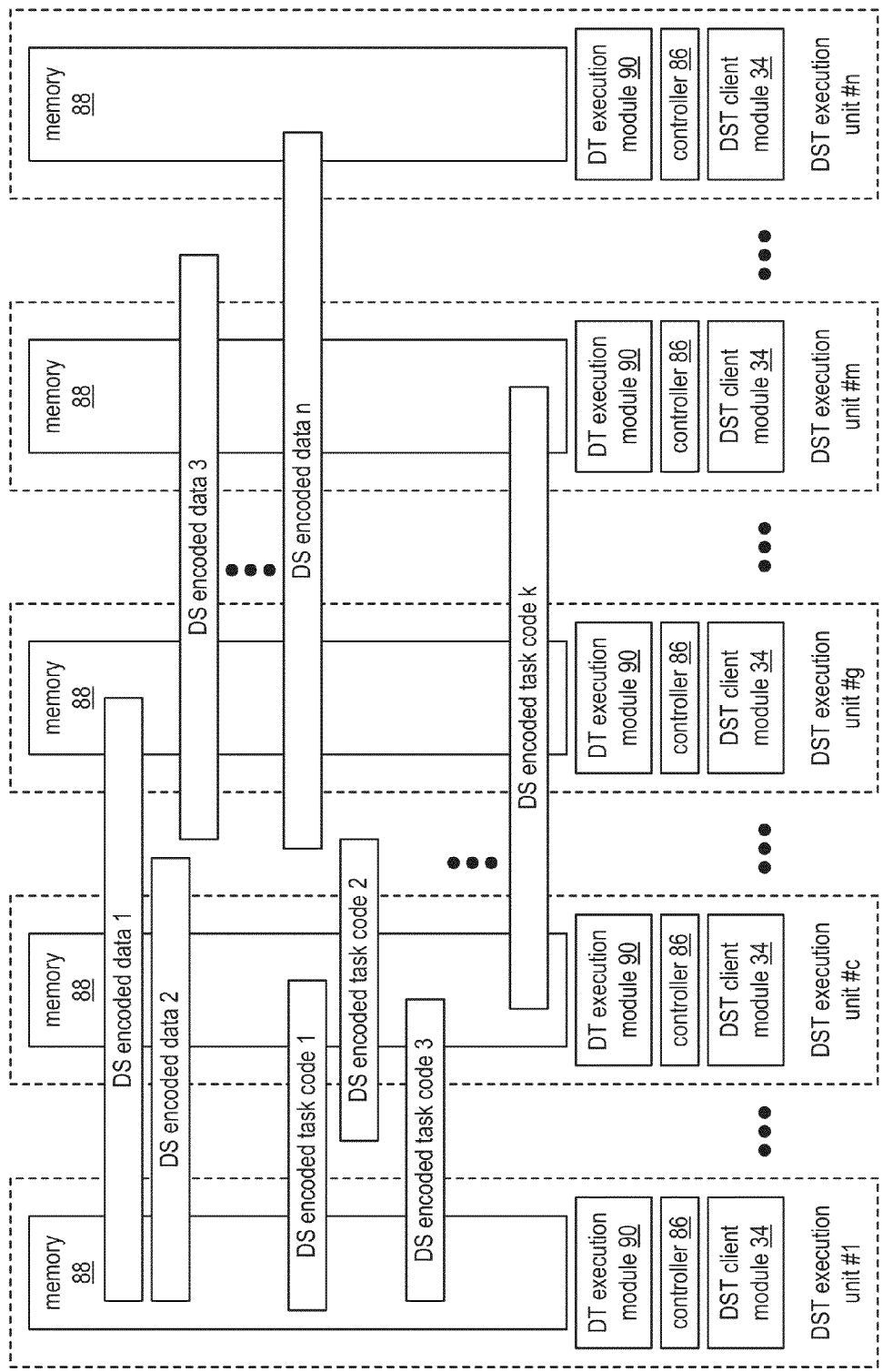
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
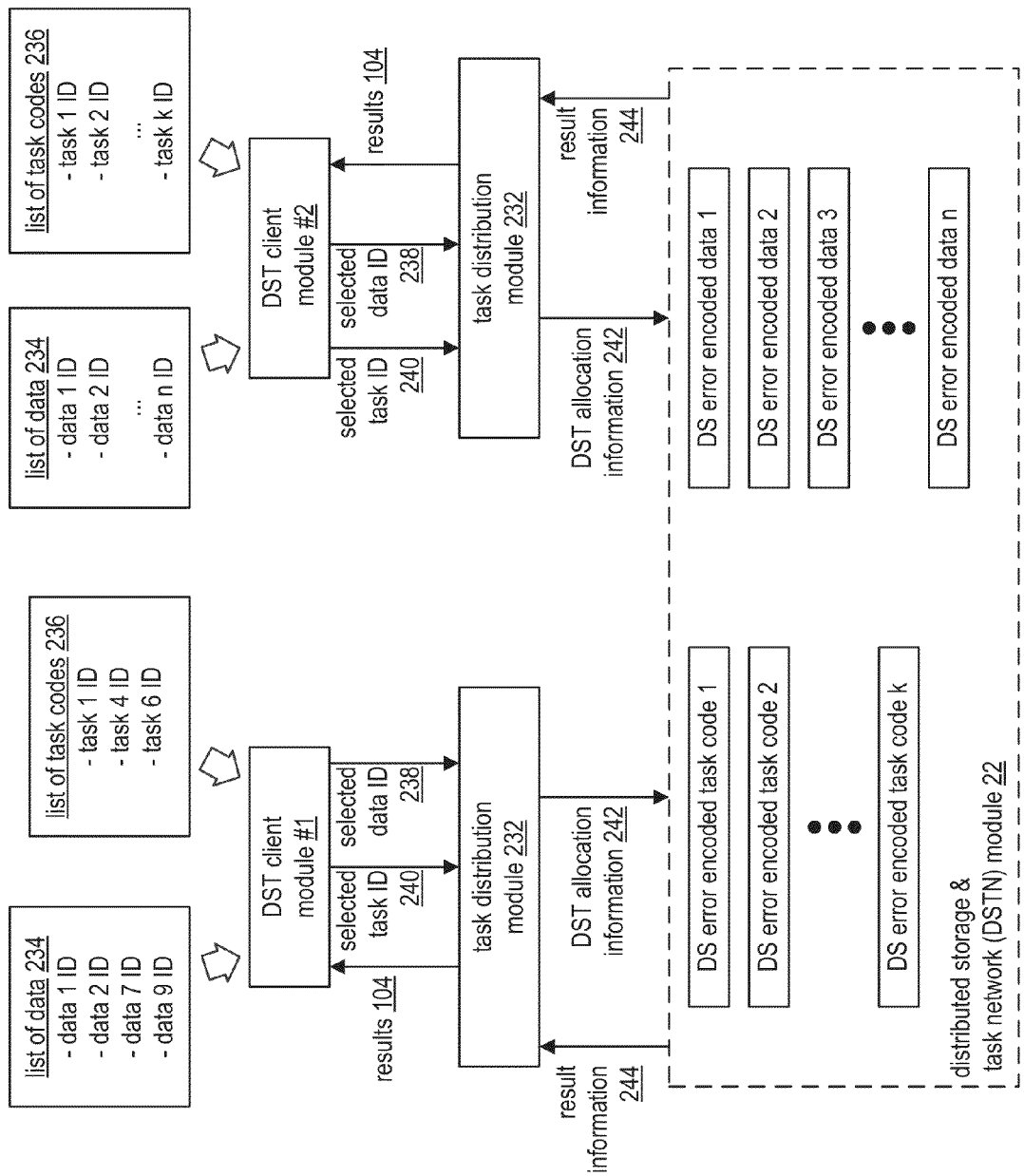
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
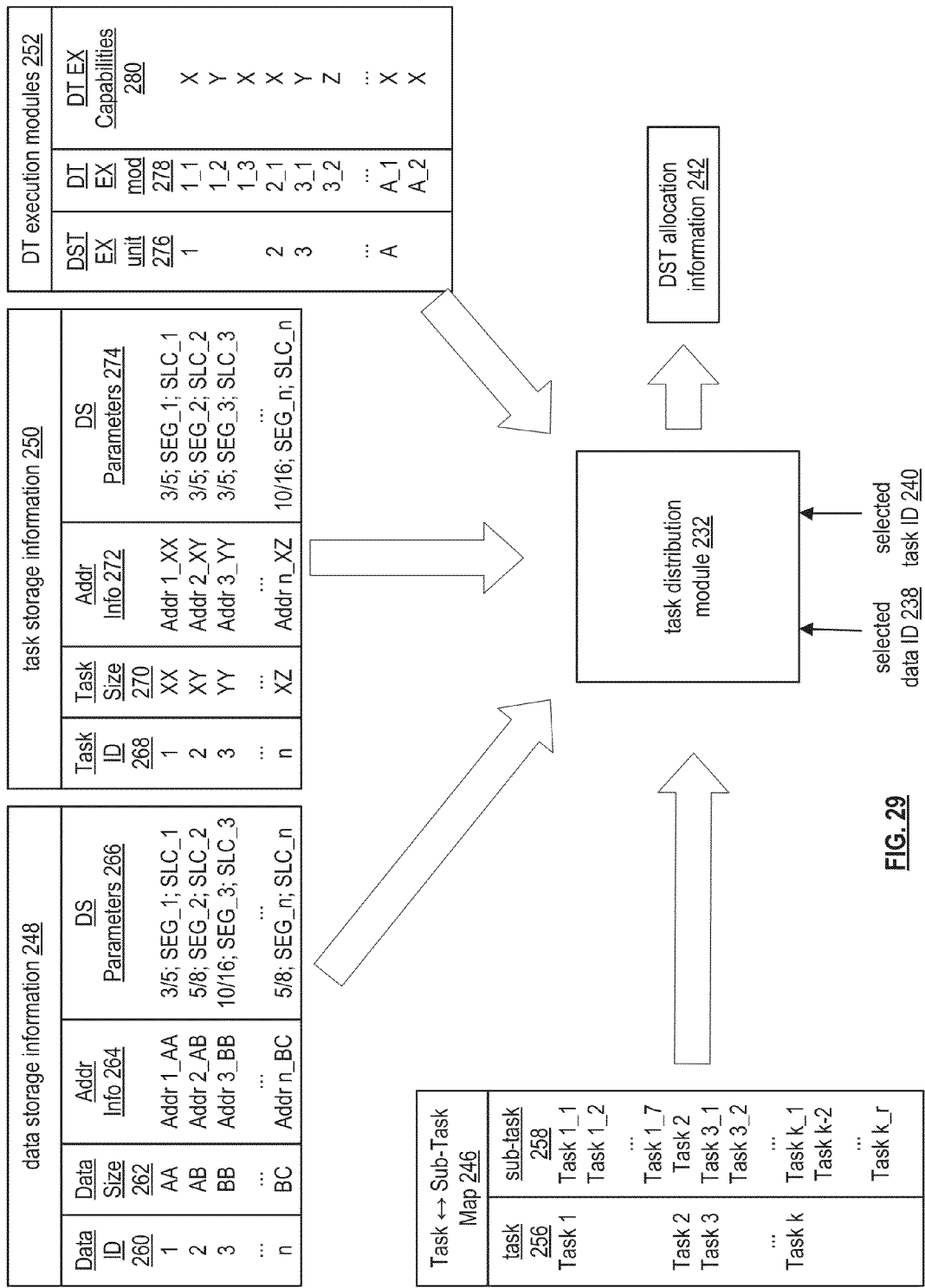
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any other information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
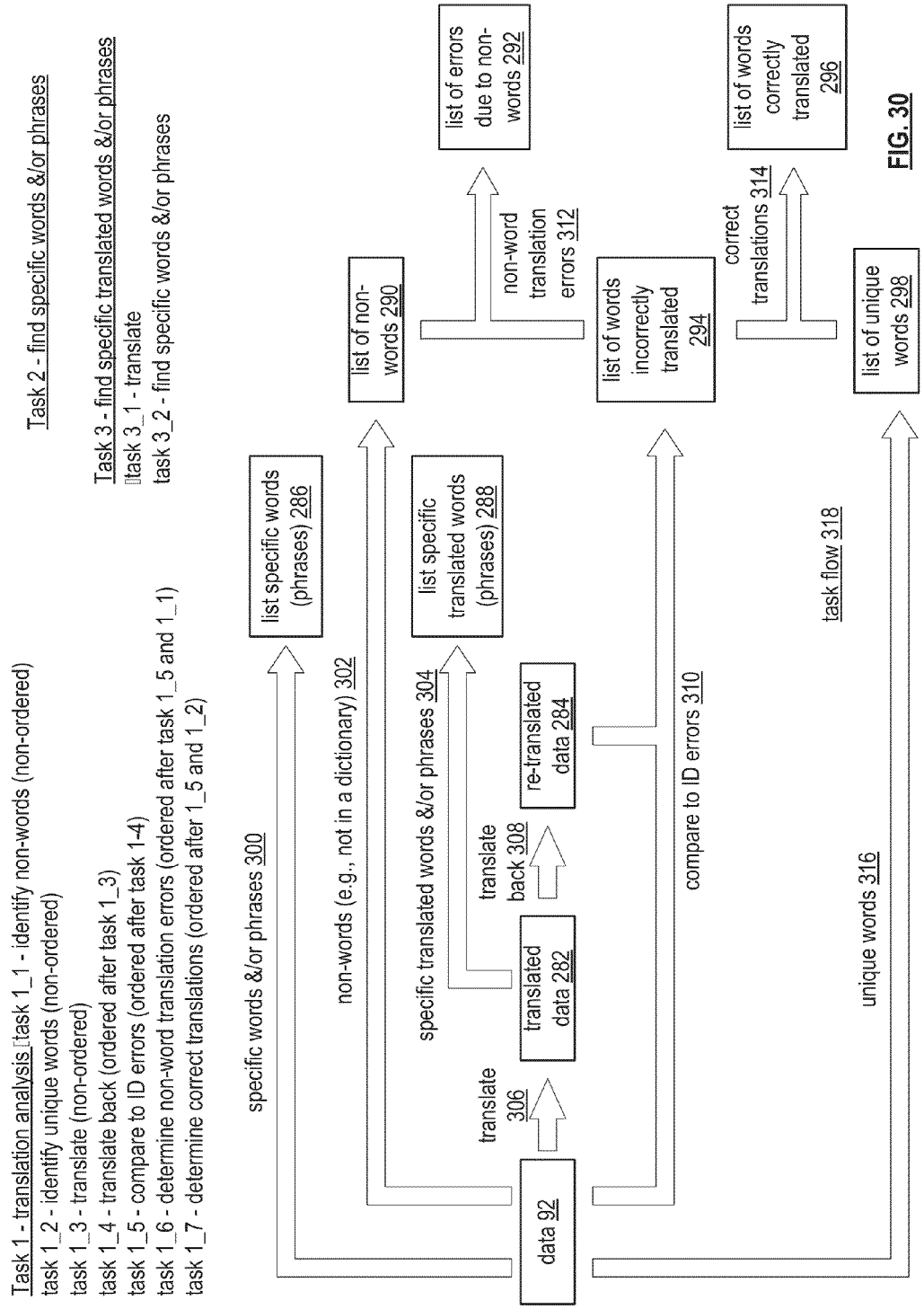
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
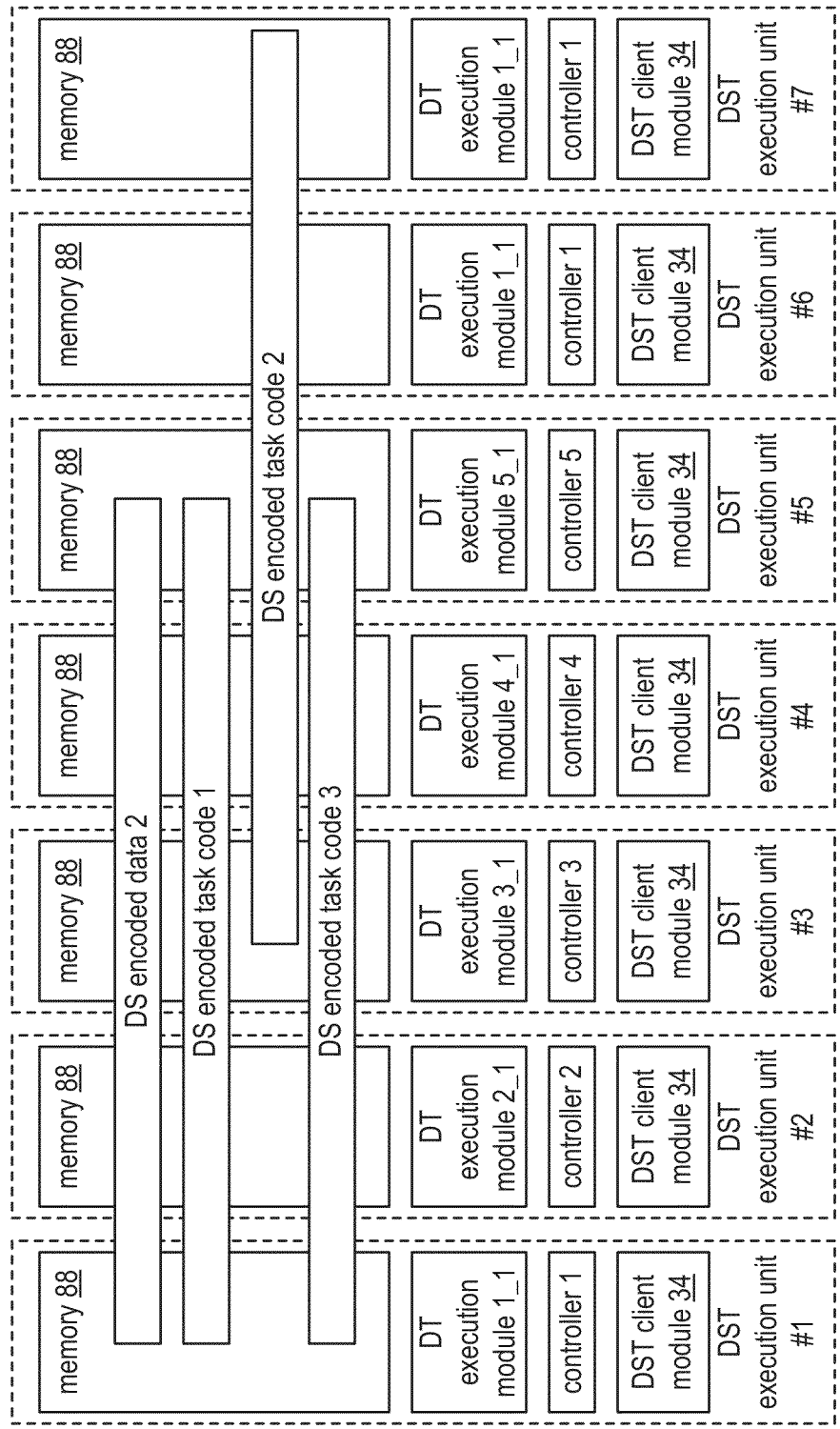
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1 -1, which is a list of non-words).

Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3 's intermediate result (e.g., R1-3_1 ) (e.g., the translated data). DT execution modules 1_1, 2_1, 3_1, 4_1, and 5_1 are allocated to translate back task 1_3 intermediate result partitions R1 -3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1 ) and on the data. DT execution modules 1_1, 2_1, 3_1, 4_1, and 5_1 are allocated to compare the data partitions (2_1 through 2_z) with partitions of task 1-4 intermediate results partitions R1 -4_1 through R -4_z to produce task 1_5 intermediate results (R1-5 , which is the list words translated incorrectly).

Task 1_6 (e.g., determine non-word translation errors) is ordered after tasks 1_1 and 1_5 and is to be executed on tasks 1_1 's and 1_5 's intermediate results (R1-1 and R1-5). DT execution modules 1_1, 2_1, 3_1, 4_$_1$, and 5_1 are allocated to compare the partitions of task 1_1 intermediate results (R1-1_$_1$ through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5 's intermediate results (R1 -1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1 ), DST unit 1 is responsible for overseeing execution of the task 1_1 and coordinates storage of the intermediate result as encoded intermediate result slices stored in memory of DST execution units 1-5 . In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1$^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
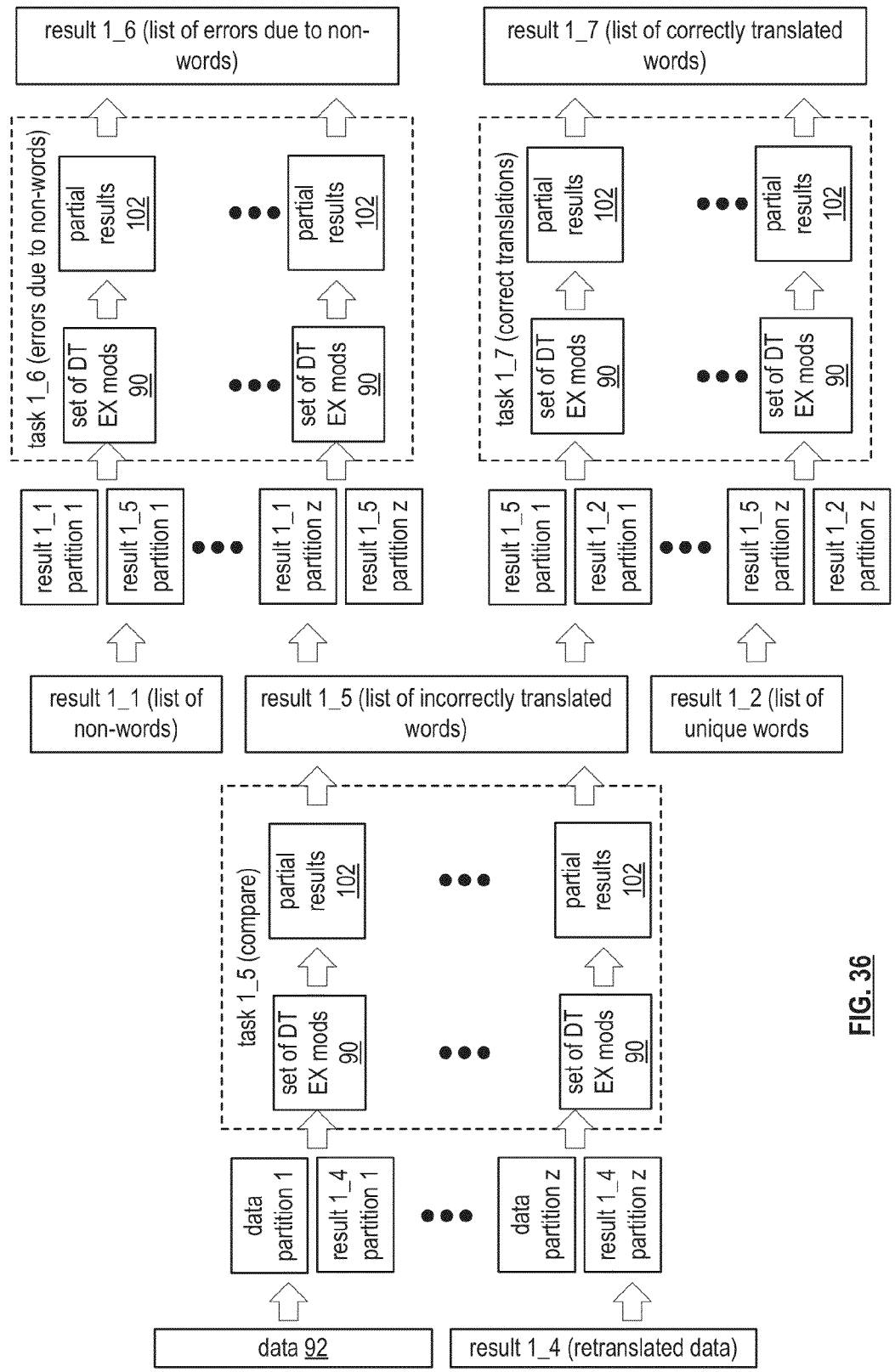

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z).

For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3 ). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3 ), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3 ) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1 ), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
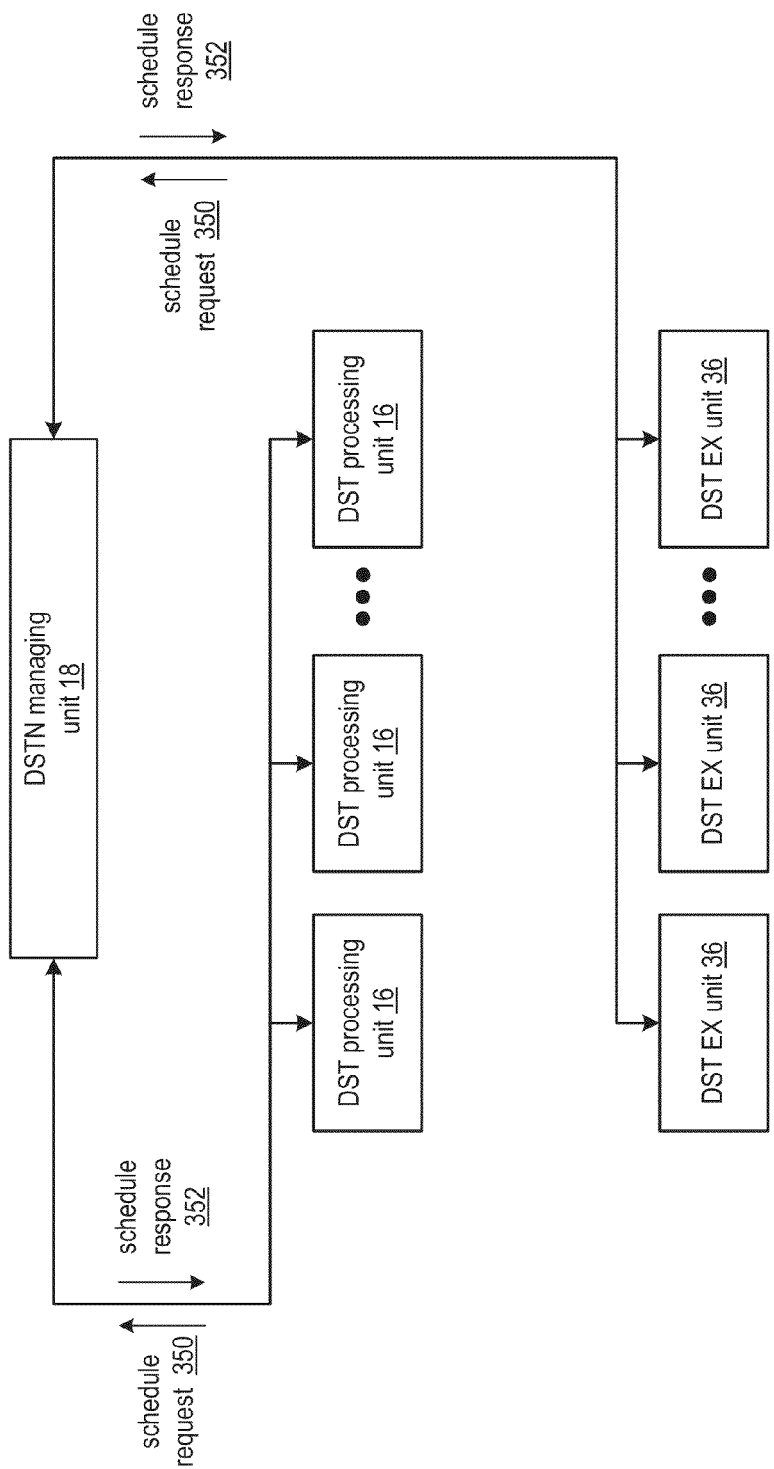
FIG. 40A is a schematic block diagram of another embodiment of a distributed computing system in accordance with the present invention.

FIG. 40A is a schematic block diagram of another embodiment of a distributed computing system that includes the distributed storage and task network (DSTN) managing unit 18, a plurality of the distributed storage and task (DST) processing units 16, and the plurality of DST execution units 36 of FIG. 1. The system is operable to store data in the plurality of DST execution units 36 using routine data access transactions. Each of the plurality of distributed storage and task (DST) processing units 16 and the plurality of DST execution units 36 may execute periodic tasks in support of the data access transactions. For example, a first DST execution unit 36 outputs a set of list slice requests to a set of DST execution units 36 to facilitate a periodic task associated with scanning storage for missing slices. Such a sequence to generate a set of list slice requests, output the list slice requests, and receive list slice responses utilizes system resources (e.g., network bandwidth, processing capacity, memory capacity, etc.).

Temporary utilization of system resources to support periodic tasks may unfavorably impact performance of the routine data access transactions. The system is further operable to minimize the unfavorable impact via coordination of periodic tasks. Each DST processing unit 16 and each DST execution units 36 generates a schedule request 350 based on associated pending periodic tasks. The schedule request 350 includes one or more of a unit identifier, a periodic task type, an estimated task duration, an estimated resource utilization level, and an estimated task frequency.

Each schedule request 350 is received by the DSTN managing unit 18. The DSTN managing unit 18 determines periodic task execution timing information based on received schedule request 350 and one or more of a routine data access system performance level goal and a periodic task system performance level goal. The periodic task execution timing information includes scheduling information for execution of periodic tasks by the plurality of DST processing units 16 and the plurality of DST execution units 36. The scheduling information includes one or more of a periodic task execution frequency level, a maximum periodic task execution runtime, and a start task time. For example, the scheduling information includes a periodic task execution frequency level of 0.6 seconds when the plurality of schedule requests includes 100 schedule requests that are to execute a minimum of once per minute.

The DSTN managing unit 18 generates a plurality of schedule responses 352 based on the periodic task execution timing information. The DSTN managing unit 18 outputs the plurality of schedule responses 352 to the plurality of DST processing units 16 and the plurality of DST execution units 36. Each unit receives a corresponding schedule response 352 and executes periodic tasks in accordance with scheduling information extracted from the schedule 352. The method to schedule periodic tasks is described in greater detail with reference to FIG. 40B.

Figure 40B:
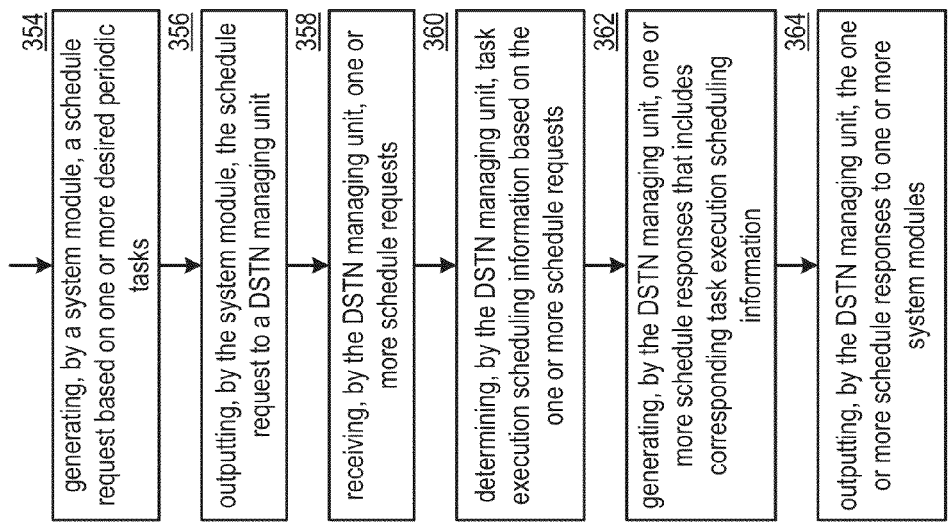
FIG. 40B is a flowchart illustrating an example of scheduling tasks in accordance with the present invention.

FIG. 40B is a flowchart illustrating an example of scheduling tasks. The method begins at step 354 where a system module (e.g., a distributed storage and task (DST) processing unit, a DST execution unit) generates a schedule request based on one or more desired periodic tasks.

The method continues to step 356 where the system module outputs the schedule request to a distributed storage and task network (DSTN) managing unit. The method continues at step 358 where the DSTN managing unit receives one or more schedule requests. For example, the DSTN managing unit receives 100 schedule requests from 100 system modules.

The method continues at step 360 where the DSTN managing unit determines task execution scheduling information based on the one or more schedule requests. The determining may be based on one or more of the plurality of schedule requests, system loading level, a system loading level goal, a system performance level, the system performance level goal, a desired periodic task execution frequency, and a periodic task execution performance level. For example, the DSTN managing unit determines the task execution scheduling information to include a unique start time for each periodic task of each system module of a plurality of system modules such that the start times are evenly distributed across a desired execution frequency time (e.g., an hour).

The method continues at step 362 where the DSTN managing unit generates one or more schedule responses that includes corresponding task execution scheduling information. For example, the DSTN managing unit generates a unique schedule response for each system module of the plurality of system modules that includes corresponding task execution scheduling information associated with the system module. The method continues at step 364 where the DSTN managing unit outputs the one or more schedule responses to one or more system modules.

Figure 41A:
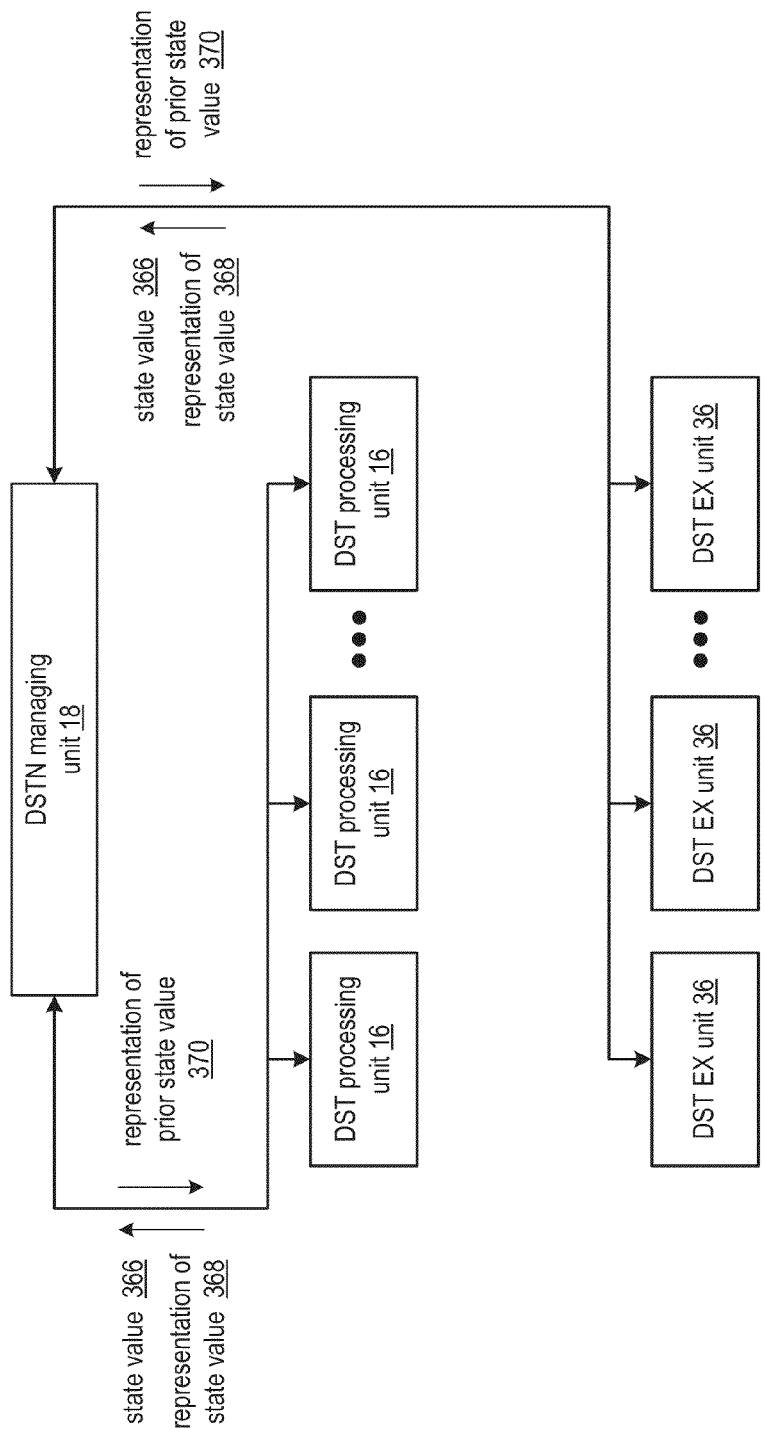
FIG. 41A is a schematic block diagram of another embodiment of a distributed computing system in accordance with the present invention.

FIG. 41A is a schematic block diagram of another embodiment of a distributed computing system that includes the distributed storage and task network (DSTN) managing unit 18, the plurality of distributed storage and task (DST) processing units 16, and the plurality of DST execution units 36 of FIG. 40A. The system is operable to store data in the plurality of DST execution units 36 using data access transactions. Each data access transaction includes a plurality of steps and each step is associated with a state value 366 of the transaction. The state value includes one or more of a state identifier, a transaction number, a data value associated with the state, a previous state indicator, a next anticipated state indicator, and a forecasted timeframe for transitioning to the next state.

Each system module (e.g., the plurality of DST processing units 16, the plurality of DST execution units 36) may send the state value 366 of a transaction to the DSTN managing unit 18 when a state value associated with the state changes. In addition, the module generates a representation of state value 368 for a plurality of transactions including the transaction. The generating includes performing a deterministic function on the state value 366 to produce the representation of state value 368. The deterministic function includes at least one of a hashing function, a mask generating function, a hash-based message authentication code function, a cyclic redundancy check function, and a mathematical algorithm. Next, the module outputs the representation of state value 368 to the DSTN managing unit 18.

The DSTN managing unit 18 receives a plurality of state values 366 and representations of state value 368 from the plurality of modules of the system. From time to time, the DSTN managing unit 18 outputs a representation of prior state value 370 to an associated module system. The representation of prior state value 370 includes a reflection of a prior representation of state value received from the associated system module. For example, the DSTN managing unit 18 generates the representation of prior state value 370 as a last representation of state value 366 received from the module.

The system module receives the representation of prior state value 370 and compares the representation of prior state value 370 to a last sent representation of state value 368. When the comparison is unfavorable (e.g., not the same), the system module outputs the state value 366 and the representation of state value 368 to the DSTN managing unit 18.

Figure 41C:
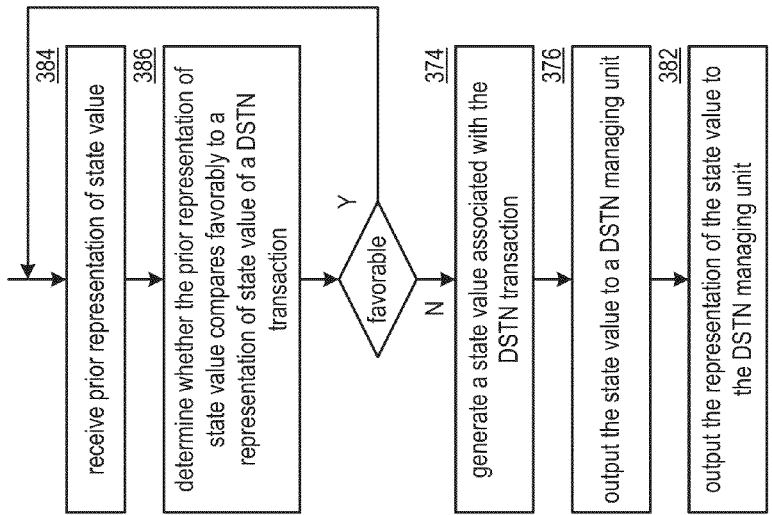
FIG. 41C is a flowchart illustrating an example of synchronizing state information in accordance with the present invention.
Figure 41B:
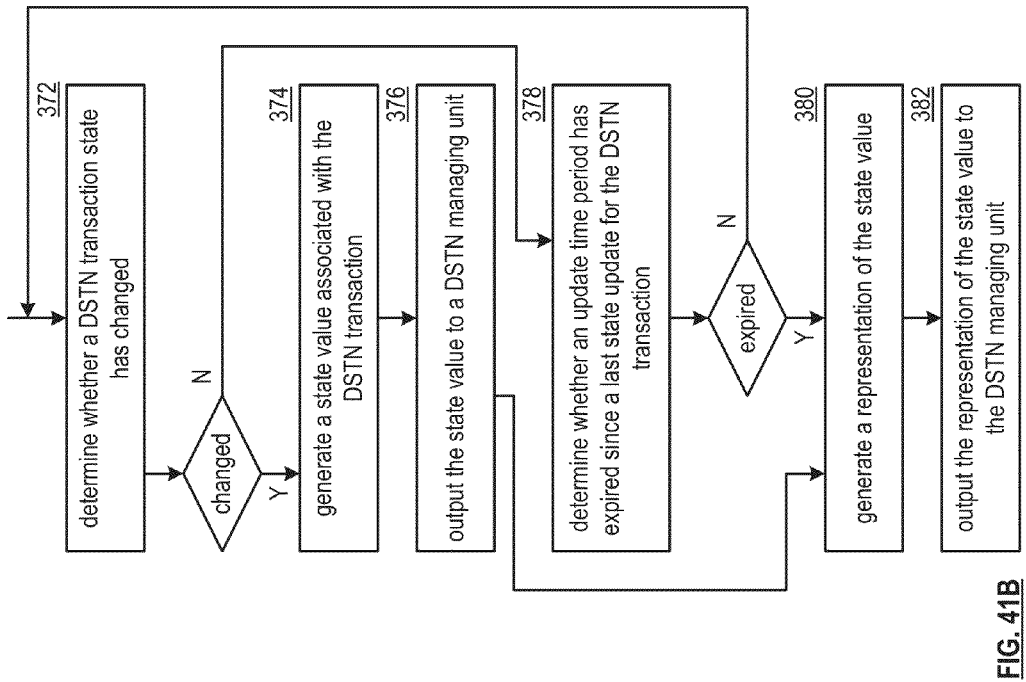
FIG. 41B is a flowchart illustrating an example of providing state information in accordance with the present invention.

FIG. 41B is a flowchart illustrating an example of providing state information. The method begins at step 372 where a processing module of a distributed storage and task (DST) client module determines whether a distributed storage and task network (DSTN) transaction state has changed. For example, the processing module indicates that the DSTN transaction state has changed when the DSTN transaction state is different than a previous state. The method branches to step 378 when the DSTN transaction state has not changed. The method continues to step 374 when the DSTN transaction state has changed.

The method continues at step 374 where the processing module generates a state value associated with the DSTN transaction. For example, the processing module compiles state information associated with the DSTN transaction to produce the state value. The method continues at step 376 where the processing module outputs the state value to a DSTN managing unit. The method branches to step 380.

The method continues at step 378 where the processing module determines whether an update time period has expired since a last state update for the DSTN transaction when the DSTN transaction state has not changed. For example, the time period expires after one minute. The method repeats back to step 372 when the update time period has not expired. The method continues to step 380 when the update time period has expired. The method continues at step 380 where the processing module generates a representation of the state value. For example, the processing module performs a deterministic function on the state value to generate the representation of the state value. The method continues at step 382 where the processing module outputs the representation of the state value to the DSTN managing unit.

FIG. 41C is a flowchart illustrating an example of synchronizing state information, which includes similar steps to FIG. 41B. The method begins at step 384 where a processing module of a distributed storage and task (DST) client module receives a prior representation of state value (e.g., from a distributed storage and task network (DSTN) managing unit). The method continues at step 386 where the processing module determines whether the prior representation of state value compares favorably to a representation of state value of a DSTN transaction. For example, the processing module indicates that the comparison is favorable when the prior representation of state value is substantially the same as a most recent representation of state value of the corresponding DSTN transaction. The method repeats back to step 384 when the comparison is favorable. The method continues to step 374 of FIG. 41B when the comparison is unfavorable.

The method continues with step 374 of FIG. 41B where the processing module generates a state value associated with the DSTN transaction. The method continues with step 376 of FIG. 41B where the processing module outputs the state value to a DSTN managing unit. The method continues with step 382 of FIG. 41B where the processing module outputs the representation of the state value to the DSTN managing unit.

FIG. 42A is a schematic block diagram of an embodiment of a dispersed storage network (DSN) that includes DSN memory 393, the network 24 and the distribute storage and task (DST) processing unit 16 of FIG. 1. The DST processing unit 16 includes a utilization module 390 and an address range assignment module 392. The DSN memory 393 includes a plurality of sites (e.g., sites 1-4), where each site includes one or more physical storage units (e.g., DST execution units 36 of FIG. 1).

The address range assignment module 392 logically divides DSN memory 393 into a plurality of logical storage nodes, where a DSN address range of the DSN memory is assigned to the plurality of logical storage nodes. The address range assignment module 392 assigns a portion of the DSN address range to each logical storage node. The address range assignment module 392 issues address range assignments 396 to the logical storage nodes, where the address range assignments 396 includes the assigned portion of the DSN address range.

Data associated with the portion of the DSN address range is accessed via the logical storage node. For example, a first storage node at each of four sites is associated with an "a" and a "b" DSN address range (e.g., contiguous address ranges), a second storage node at each of four sites is associated with a "c" and a "d" DSN address range, etc. The plurality of logical storage nodes may be associated with a plurality of storage vaults, where each storage vault is a logical assignment of at least a portion of one or more of the plurality of logical storage nodes to a user entity (e.g., individual storage system user, group of storage system users, multiple groups, etc.). For example, a first vault includes the "a", "b", and a "c" DSN address ranges, and a second vault includes a "d" DSN address range. As another example, a plurality of sets of encoded data slices associated with a plurality of sets of slice names of a first portion of the DSN address range for vault 1 (e.g., v1 range 1 a slices-through v1 range 4a slices) are stored in the first storage node at each of the four sites.

Each logical storage node maps to at least a portion of a physical storage unit. As a specific example, the logical storage node maps to at least a portion of one of the one or more physical storage units of one of the plurality of sites. As another specific example, the logical storage node maps to at least a portion of multiple physical storage units of one of the plurality of sites. As yet another specific example, the logical storage node maps to at least a portion of one of the one or more physical storage units of multiple sites of the plurality of sites. As a further example, the logical storage node maps to at least a portion of multiple physical storage units of multiple sites of the plurality of sites. The mapping of the logical storage node to the at least the portion of the physical storage unit is discussed in greater detail with reference to FIGS. 42D-G.

Each vault may be associated with unique dispersal parameters of a dispersed storage error coding function which is utilized to encode data to produce sets of encoded data slices for storage in a set of storage nodes associated with the vault. The dispersal parameters includes a slice length parameter such that the encoded data slices produced for the associated vault are in accordance with the slice length parameter. Over time, an imbalance may occur in utilization of the storage nodes when the number of slices per vault varies significantly and/or the slice lengths varies for similar numbers of encoded data slices. A memory space utilization state of each logical storage node includes under-utilized, over-utilized, or average.

In an example of balancing storage node utilization, the utilization module 390 determines memory space utilization state of the logical storage nodes. As a specific example, the utilization module 390 receives utilization state information 394 from the logical storage nodes. The utilization state information 394 includes one or more of a maximum memory device capacity level, a memory device utilization level, an available memory device capacity level, an under-utilized state indicator, an over-utilized state indicator, and an average state indicator. As another specific example, the utilization module 390 determines vault utilization levels. For instance, the utilization module 390 issues list slice requests and receives list slice responses from storage nodes associated with the first vault.

Having determined the memory space utilization state of the logical storage nodes, the utilization module 390 determines whether one or more logical storage nodes is in the over-utilized memory space utilization state and another one or more logical storage nodes is in the under-utilized memory space utilization state. When the one or more logical storage nodes is in the over-utilized memory space utilization state and another one or more logical storage nodes is in the under-utilized memory space utilization state, the address range assignment module 392 selects one of the other one or more logical storage nodes that is in the under-utilized memory space utilization state to produce a selected logical storage node. Having produced the selected logical storage node, the address range assignment module 392 reassigns a first portion of the DSN address range assigned to the selected logical storage node to one or more logical storage nodes that is in the average memory space utilization state to create an address free logical storage node. As a specific example, the address range assignment module 392 migrates (e.g., retrieve and store) encoded data slices 398 from the selected logical storage node to the one or more logical storage nodes that is in the average memory space utilization state and the address range assignment module 392 associates the first portion of the DSN address range with the one or more logical storage nodes that is in the average memory space utilization state (e.g., disassociating the first portion of the DSN address range from the address free logical storage node).

Having reassigned the first portion of the DSN address range to free up the address free logical storage node, the address range assignment module 392 reassigns one or more address blocks of a second portion of the DSN address range assigned to one of the one or more logical storage nodes that is in the over-utilized memory space utilization state to the address free logical storage node. As a specific example, the address range assignment module 392 migrates encoded data slices 398 from the one of the one or more logical storage nodes that is in the over-utilized memory space utilization state to the address free logical storage node and the address range assignment module 392 associates the second portion of the DSN address range with the address free logical storage node (e.g., disassociating the second portion of the DSN address range from the one of the one or more logical storage nodes that is in the over-utilize memory space utilization state).

FIGS. 42B-C are diagrams illustrating examples of an addressing mapping associated with a plurality of logical storage nodes of a dispersed storage network (DSN). A DSN address range is assigned to the plurality of logical storage nodes, where each logical storage node is assigned a portion of the DSN address range. An addressing pinwheel 400 represents a total DSN addressing range wrapped into a circle where a beginning of the circle at the top of the addressing pinwheel 400 represents an address zero (ADDR 0) for a starting point of the DSN address range and an end of the circle at the top represents an addressing maximum (ADDR MAX).

The addressing pinwheel 400 may be divided into equal DSN address ranges corresponding to a number of pillars of DSN addresses, where dispersal parameters of a dispersed storage error coding function includes a pillar number (e.g., four pillars when a set of encoded data slices includes four encoded data slices as in FIG. 42B; eight pillars when the set of encoded data slices includes a de-encoded data slices as in FIG. 42C). The portions of each DSN address range are mapped to storage nodes. Typically, one or more storage nodes are mapped to each DSN address range associated with a pillar. For example, as illustrated in FIG. 42B, a storage node 1_1 is mapped to DSN address range portions 1a and 1b, through a storage node 1_x is mapped to DSN address range portions 1y and 1z. Similarly, each other DSN address range of other pillars are mapped into a same number of DSN address range portions a through z. As another example, as illustrated in FIG. 42C, storage nodes 1_1 through 1_6 are mapped to the DSN address range portions 1a-1z, storage nodes 1_7 through 1_x are mapped to the DSN address range portions 2a-2z when two pillars are associated with each site and a common set of storage nodes is applied to storage utilizing eight pillars, etc.

FIGS. 42D, E, F, and G are schematic block diagrams illustrating examples of logical storage node mapping to physical memories that includes one or more distributed storage and task (DST) execution units 36 of FIG. 1. Each DST execution unit 36 includes one or more memories 88 of FIG. 3. The DST execution unit 36 receives a dispersed storage network (DSN) address range assignment that includes a DSN address range, where a portion of the DSN address range is assigned to one or more logical storage nodes 402. The DST execution unit 36 obtains a mapping of the one or more logical storage nodes 402 to at least one of the one or more memories 88. As a specific example, the DST execution unit 36 determines the mapping. As another specific example, the DST execution unit 36 receives the mapping.

FIG. 42D illustrates an example where the logical storage node 402 is mapped to a single memory 88 within the DST execution unit 36. FIG. 42E illustrates another example where the logical storage node 402 is mapped to two memories 88 within the DST execution unit 36. FIG. 42F illustrates another example where the logical storage node 402 is mapped to all memories 88 within the DST execution unit 36. FIG. 42G illustrates another example where the logical storage node 402 is mapped at least one memory 88 within the DST execution unit 36 and at least one other DST execution unit 36.

FIG. 42H is a series of schematic block diagrams of logical storage nodes undergoing balancing of storage node utilization that includes site 2 storage nodes 404 in an initial balanced state, a non-balanced state where over-utilization of at least one storage node is detected, a post-first balancing step state, and a balanced state after a second balancing step. The site 2 logical storage nodes 404 includes logical storage node 2_1 through logical storage node 2_5. Logical storage node 2_1 is associated with storage of encoded data slices of 2a and 2b dispersed storage network (DSN) address ranges of a first vault. Logical storage node 2_2 is associated with storage of encoded data slices of a 2c DSN address range of the first vault and a 2d DSN address range of a second vault. Logical storage node 2_3 is associated with storage of encoded data slices of 2e and 2f DSN address ranges of a third vault. Logical storage node 2_4 is associated with storage of encoded data slices of 2g and 2h DSN address ranges of a fourth vault. Logical storage node 2_5 is associated with storage of encoded data slices of 2i and 2j DSN address ranges of the fourth vault.

In an example of balancing, memory space utilization state of the logical storage nodes is determined. As a specific example of the determining the memory space utilization state, for each logical storage node, a quantity of addresses (e.g., number of encoded data slices) of the assigned portion of the DSN address range that are utilized is determined. When the quantity compares unfavorably (e.g., greater than) to an address over-used threshold, the over-utilized memory space utilization state is indicated. When the quantity compares unfavorably (e.g., less than) to an address under-used threshold, the under-utilized memory space utilization state is indicated. When the quantity compares favorably to the address over-used threshold and to the address under-used threshold, the average memory space utilization state is indicated. The address over-used threshold and the address under-used threshold may be determined based on a function of overall address usage of DSN memory and a ratio between desired address overuse and underuse levels. For instance, a moving threshold may be utilized as the DSN memory is utilized. In another instance, a threshold of overall use may be utilized.

As another specific example of the determining the memory space utilization state, for each logical storage node, a data storage level is determined (e.g., a number of bytes of stored encoded data slices). When the data storage level compares unfavorably (e.g., greater than) to a storage over-used threshold, the over-utilized memory space utilization state is indicated. When the data storage level compares unfavorably (e.g., less than) to a storage under-used threshold, the under-utilized memory space utilization state is indicated. When the data storage level compares favorably to the storage over-used threshold and to the storage under-used threshold, the average memory space utilization state is indicated. The storage over-used threshold and the storage under-used threshold is based on a function of overall storage usage of the DSN memory and a ratio between storage overuse and underuse levels.

As yet another specific example of the determining the memory space utilization state of the plurality of logical storage nodes, the memory space utilization state is determined based on an initial balanced assignment of portions of an associated DSN address range among the logical storage nodes and a balanced allocation of physical memory space among the logical storage nodes. As a still further specific example of the determining of the memory space utilization state of the plurality of logical storage nodes, vault utilization levels are determined storage vaults. For example, a vault utilization level for vault 1 is determined to be over-utilized, a vault utilization level for vault 2 is determined to be under-utilized, a vault utilization level for vault 3 is determined to be average-utilized, and a vault utilization level for vault 4 is determined to be under-utilized.

In an instance, the determining of the memory space utilization state indicates that logical storage node 2_1 is associated with the over-utilized memory space utilization state based on an above average utilization of memory for storage of vault 1 range 2a encoded data slices. As another instance, the determining indicates that logical storage node 2_2 is associated with the over-utilized memory space utilization state based on an above average utilization of memory for storage of vault 1 range 2c encoded data slices. As yet another instance, the determining indicates that logical storage nodes 2_3 and 2_5 are associated with an average utilized memory space utilization state based on an average utilization of memory for storage of vault 3 range 2f encoded data slices and vault 4 range 2j encoded data slices. As a still further instance, the determining indicates that logical storage node 2_4 is associated with an under-utilized memory space utilization state based on a below average utilization of memory for storage of vault 4 range 2g encoded data slices.

With the indications that logical storage nodes 2_1 and 2_2 are associated with the over-utilized memory space utilization state and with the indication that logical storage node 2_4 is associated with the under-utilized memory space utilization state, one logical storage node is selected that is in the under-utilized memory space utilization state to produce a selected logical storage node. As a specific example, logical storage node 2_4 is selected as the selected logical storage node when the logical storage node 2_4 has a neighboring logical storage node in the average memory space utilization state (e.g., logical storage nodes 2_3 and 2_5 ).

With the selected logical storage node selected, a portion of the DSN address range assigned to the selected logical storage node is reassigned to one or more logical storage nodes of the plurality of logical storage nodes that is in the average memory space utilization state (e.g., logical storage nodes 2_3 and 2_5 ) to create an address free logical storage node (e.g., logical storage node 2_4 is freed up). As a specific example, the portion of the DSN address range assigned to storage node 2_4 is reassigned to the neighboring logical storage nodes 2_3 and 2_5 . The encoded data slices stored in the address free logical storage node are transferred to the neighboring logical storage nodes 2_3 and 2_5 (e.g., represented by step 1). For instance, vault 4 range 2g encoded data slices are transferred from logical storage node 2_4 to logical storage node 2_3 and vault 4 range 2h encoded data slices are transferred from logical storage node 2_4 to logical storage node 2_5.

With the portion of the DSN address range re-assigned, one or more address blocks of another portion of the DSN address range assigned to the logical storage nodes that are in the over-utilized memory space utilization state are reassigned to the address free logical storage node. As a specific example, the one or more address blocks are selected based on at least one of: ordering of the DSN address range and utilization of address blocks of the other portion of the DSN address range (e.g., continuous addresses from one to another). As another specific example, the other portion of the DSN address range is partitioned into a plurality of address blocks and the one or more address blocks are selected from the plurality of address blocks (e.g., split out addresses). For instance, vault 1 DSN address range 2a is selected to remain with storage node 2_1 , vault 2 DSN address range 2d is selected to remain with storage node 2_2, vault 1 DSN address range 2b are reassigned to storage node 2_4, and vault 1 DSN address range 2c is selected for reassignment away from storage node 2_2. An address range may include multiple address blocks and may be split to accommodate over-utilization. For instance, vault 1 DSN address range 2c encoded data is split between storage node 2_4 as a vault 1 DSN address range 2c1 and storage node 2_2 as a vault 1 DSN address range 2c2. With the other portion of the DSN address range reassigned, associated encoded data slices are transferred to storage nodes associated with reassignment of the other portion of the DSN address range.

FIG. 42I is a flowchart illustrating an example of balancing storage node utilization of a plurality of logical storage nodes of a dispersed storage network (DSN). The method begins at step 410 where a processing module (e.g., of a distributed storage and task (DST) execution unit) determines memory space utilization state of the plurality of logical storage nodes of the DSN. DSN memory of the DSN is logically divided into the plurality of logical storage nodes. A DSN address range of the DSN memory is assigned to the plurality of logical storage nodes. A logical storage node of the plurality of logical storage nodes is assigned a portion of the DSN address range. The memory space utilization state of a logical storage node of the plurality of logical storage nodes is under-utilized, over-utilized, or average. The DSN memory may include a plurality of sites, where a site includes one or more physical storage units. Each storage node maps to at least a portion of one of the one or more physical storage units of one of the plurality of sites, at least a portion of multiple physical storage units of one of the plurality of sites, at least a portion of one of the one or more physical storage units of multiple sites of the plurality of sites or at least a portion of multiple physical storage units of multiple sites of the plurality of sites.

As a specific example of the determining the memory space utilization state, the processing module, for each logical storage node of the plurality of logical storage nodes, determines a quantity of addresses of the assigned portion of the DSN address range that are utilized. When the quantity compares unfavorably to an address over-used threshold, a processing module indicates the over-utilized memory space utilization state. When the quantity compares unfavorably to an address under-used threshold, the processing module indicates the under-utilized memory space utilization state. When the quantity compares favorably to the address over-used threshold and to the address under-used threshold, a processing module indicates the average memory space utilization state. The processing module may determine the address over-used threshold and the address under-used threshold based on a function of overall address usage of the DSN memory and a ratio between desired address overuse and underuse levels. For instance, a moving threshold may be utilized as the DSN memory is utilized. In another instance, a threshold of overall use may be utilized.

As another specific example of the determining the memory space utilization state, the processing module, for each logical storage node of the plurality of logical storage nodes, determines a data storage level. When the data storage level compares unfavorably to a storage over-used threshold, the processing module indicates the over-utilized memory space utilization state. When the data storage level compares unfavorably to a storage under-used threshold, the processing module indicates the under-utilized memory space utilization state. When the data storage level compares favorably to the storage over-used threshold and to the storage under-used threshold, the processing module indicates the average memory space utilization state. The processing module may determine the storage over-used threshold and the storage under-used threshold based on a function of overall storage usage of the DSN memory and a ratio between storage overuse and underuse levels.

As yet another specific example of the determining the memory space utilization state of the plurality of logical storage nodes, the processing module determines the memory space utilization state based on an initial balanced assignment of portions of the DSN address range among the plurality of logical storage nodes and a balanced allocation of physical memory space among the plurality of logical storage nodes. As a still further specific example of the determining of the memory space utilization state of the plurality of logical storage nodes, the processing module determines vault utilization levels of a plurality of storage vaults, where a storage vault of the plurality of storage vaults is a logical assignment of at least a portion of one or more of the plurality of logical storage nodes to a user entity (e.g., individual, group, multiple groups, etc.).

The method continues at step 412 where the processing module, when one or more logical storage nodes of the plurality of logical storage nodes is in the over-utilized memory space utilization state and another one or more logical storage nodes of the plurality of logical storage nodes is in the under-utilized memory space utilization state, selects one of the other one or more logical storage nodes of the plurality of logical storage nodes that is in the under-utilized memory space utilization state to produce a selected logical storage node. As a specific example, the processing module selects at least one of the other one or more logical storage nodes of the plurality of logical storage nodes that is in the under-utilized memory space utilization state as the selected logical storage node. As another specific example, the processing module selects at least one of the other one or more logical storage nodes of the plurality of logical storage nodes that is in the under-utilized memory space utilization state and has a neighboring logical storage node in the average memory space utilization state as the selected logical storage node.

The method continues at step 414 where the processing module reassigns the portion of the DSN address range assigned to the selected logical storage node to one or more logical storage nodes of the plurality of logical storage nodes that is in the average memory space utilization state to create an address free logical storage node. As a specific example, the processing module identifies neighboring logical storage nodes of the plurality of logical storage nodes of the selected logical storage node. When at least one of the neighboring logical storage nodes is in the average memory space utilization state, the processing module selects the at least one of the neighboring logical storage nodes as the one or more logical storage nodes of the plurality of logical storage nodes. Next, the processing module transfers data stored in the address free logical storage node to the one or more logical storage nodes of the plurality of logical storage nodes. As an example of selecting the at least one of the neighboring logical storage nodes, the processing module determines that the one or more logical storage nodes of the plurality of logical storage nodes has memory space capacity to receive the data stored in the address free logical storage unit and remain in the average memory space utilization state.

The method continues at step 416 where the processing module reassigns one or more address blocks of the portion of the DSN address range assigned to one of the one or more logical storage nodes of the plurality of logical storage nodes that is in the over-utilized memory space utilization state to the address free logical storage node. As a specific example, the processing module selects the one or more address blocks based on at least one of: ordering of the DSN address range and utilization of address blocks of the portion of the DSN address range (e.g., continuous addresses from one to another). As another specific example, the processing module partitions the portion of the DSN address range into a plurality of address blocks and selects the one or more address blocks from the plurality of address blocks (e.g., split out addresses).

FIG. 43A is a schematic block diagram of another embodiment of a distributed computing system that includes a distributed storage and task (DST) processing unit 16, and a plurality of storage sets 1-N. Each storage set includes a set of DST execution units 36. Each storage set of the plurality of storage sets 1-N is associated with a distributed storage and task network (DSTN) address range (e.g., storage set 1 is associated with a first DSTN address range, storage set 2 is associated with a second DSTN address range, etc.).

In an example of operation, the DST processing unit 16 receives data 420 for storage in at least one storage set of the plurality of storage sets 1-N. The DST processing unit 16 encodes the data 420 to produce at least one set of slices. The DST processing unit 16 selects the at least one storage set for storage of the at least one set of slices. The DST processing unit 16 generates at least one set of slice names corresponding to the at least one set of slices based on selection of the at least one storage set. The DST processing unit 16 generates at least one set of write slice requests 422 that includes the at least one set of slice names and the at least one set of slices.

The DST processing unit 16 outputs the at least one set of write slice requests 422 to the at least one storage region to facilitate storage of data in the at least one storage region. The method to store the data is discussed in greater detail with reference to FIG. 43B.

FIG. 43B is a flowchart illustrating an example of generating slice names. The method begins at step 424 where a processing module of a distributed storage and task (DST) client module receives data for storage in a storage set of DST execution units of a plurality of storage sets. The request may include a requester identifier (ID) associated with a vault ID. The method continues at step 426 where the processing module encodes the data using a dispersed storage error coding function to produce a plurality of sets of encoded data slices. The method continues at step 428 where the processing module determines availability of the plurality of storage sets of DST execution units. The determining may be based on one or more of initiating a query, performing a test, receiving an error message, and receiving availability information.

The method continues at step 430 where the processing module identifies a vault ID associated with the data. The determining may be based on one or more of a registry lookup, receiving the vault ID, and initiating a query with a requesting entity. The method continues at step 432 where the processing module generates an object number based on the vault ID, DSTN address range assignments of the plurality of storage sets, and the availability of the plurality of storage sets. The generating includes selecting a storage set of the plurality of storage sets based on the availability of the plurality of storage sets of DST execution units. For example, the processing module selects a storage set associated with the vault ID and that has a favorable availability level. The generating further includes identifying a DSTN address range assignment of the selected storage set (e.g., based on a lookup, a query). The generating further includes generating the object number based on the DSTN address range assignment (e.g., the object number value is included as a corresponding portion of the DSTN address range assignment).

The method continues at step 434 where the processing module generates a plurality of sets of slice names utilizing the vault ID of the object number. For example, the processing module generates each slice name to include a slice index value based on a pillar width associated with the vault ID, the vault ID, the object number, and a segment number associated with each set of encoded data slices of the plurality of sets of encoded data slices. The method continues at step 436 where the processing module generates a plurality of sets of write slice requests that includes the plurality of sets of encoded data slices and the plurality of sets of slice names. The method continues at step 438 where the processing module identifies the selected storage set. The identifying may be based on at least one of performing a lookup in a slice name to physical location table, accessing a list, and receiving a storage set identifier. The identifying may include obtaining an Internet protocol address corresponding to each DST execution unit of the selected storage set. The method continues at step 440 where the processing module outputs the plurality of sets of write slice requests to the identified storage set.

FIG. 44A is a schematic block diagram of another embodiment of a distributed computing system that includes a distributed storage and task (DST) processing unit 16 and a distributed storage and task network (DSTN) module 22. The DST processing unit 16 includes the dispersed storage (DS) error encoding module 112 of FIG. 4, a plurality of filters 442, and a local memory 444. The local memory 444 is utilized to store a plurality of indexes 446 corresponding to the plurality of filters. Each index 446 of the plurality of indexes may be utilized to locate DSTN addresses associated with slices 452 stored in the DSTN module 22.

Data 448 for ingestion is received by the plurality of filters 442, where each filter 442 of the plurality of filters analyzes the data 448 to produce corresponding metadata 450. A filter 442 may include searching for a keyword, searching a picture for a pattern match, converting voice into text, etc. Each corresponding metadata 450 is utilized to update an index 446 associated with a metadata type of each metadata 450. For example, a metadata 450 associated with searching pictures for a pattern is utilized to update an index 446 associated with searching pictures for patterns. Each index 446 provides an association between the metadata 450 and a data object stored as a plurality of sets of encoded data slices 452 in the DSTN module 22 by providing a DSTN address associated with storage of the data object. The DS error encoding 112 encodes the data 448 utilizing a dispersed storage error coding function to produce a plurality of sets of encoded data slices 452 for storage in the DSTN module 22 in accordance with the DSTN address associated with storage of the data. The method to ingest, index, and store the data 448 is discussed in greater detail with reference to FIG. 44B.

FIG. 44B is a flowchart illustrating an example of ingesting data. The method begins at step 454 where a processing module of a distributed storage and task (DST) client module receives data for storage in a distributed storage and task network (DSTN) module. The method continues at step 456 where the processing module assigns a DSTN address to the data. The assigning includes at least one of generating an object number, generating a source name, and generating slice names utilizing the source name and a pillar index associated with a pillar width of dispersed storage or coding function parameters.

The method continues at step 458 where the processing module facilitates storing the data as a plurality of sets of encoded data slices in the DSTN module utilizing the DSTN address. The facilitating includes encoding the data using a dispersed storage error coding function to produce the plurality of sets of encoded data slices, generating a plurality of sets of write slice requests, and outputting the plurality of sets of write slice requests to the DSTN module.

The method continues at step 460 where the processing module analyzes the data utilizing one or more filters to produce one or more sets of metadata. The analyzing includes selecting filters based on one or more of a predetermination, a filter associated with a data type, a requester identifier, a request, a lookup, and a filter availability indicator. The method continues at step 462 where the processing module modifies one or more associated indexes utilizing the one or more sets of metadata and the DSTN address. The modified includes adding the DSTN address and associated metadata from each filter. For example, the processing module may utilize one index for each filter.

FIGS. 45A-E are diagrams illustrating examples of hierarchical data access control information 472 associated with network memory 470. The network memory 470 may be physically implemented utilizing the distributed storage and task network (DSTN) module 22 of FIG. 1. The network memory 470 includes a plurality of logical memory spaces for storage of data objects. A logical memory space may be associated with a list of users that have access to the logical memory space. For example, a list of "A" group users has access to a logical memory space A that includes data objects A1, A2, A3, through Kn. As another example, a list of "Z" group users has access to another logical memory space Z that includes data objects Z1, Z2, Z3, through Fn.

The hierarchical data access control information 472 includes logical memory access control files and sets of data object access control files. Each logical memory access control file includes a list of users 474 that have access to a particular logical memory space and a list of corresponding access rights 476 to data stored within the particular logical memory space. For example, a logical memory access A control file indicates that users AA, AB, AC, through MM have access to the logical memory space A. As another example, the logical memory access A control file further indicates that user AA has access rights including reading (R), writing (W), editing (E), listing (L), and deleting (D) the data objects within the logical memory space A.

Each data object access control file is associated with a corresponding data object and a corresponding logical memory access control file. Each data object access control file includes a list of data access restrictions 478 for one or more of the users of the list of users 474 of the logical memory access control file. For example, a data object A1 access control file is associated with data object A1 of logical memory space A and is associated with the logical memory access A control file. As a specific example, the data object A1 access control file indicates that user AA has no further access restrictions for data object A1, user AB is not allowed to edit data object A1 even though the access rights of the logical memory access A control file indicate that user AB is allowed to edit data objects of the logical memory space A, etc.

The hierarchical data access control information 472 may be utilized when processing a data access request to network memory of a dispersed storage network (DSN). In an example of the utilization, a logical memory access control file is obtained for a user of the data access request. For instance, the logical memory access Z control file is obtained when user ZC is requesting to edit the data object Z1. The access rights 476 of the logical memory access Z control file for user ZC is interpreted to determine whether the edit request type is within access rights of user ZC. When the edit request type is within the access rights of user ZC, the data object Z1 access control file is obtained for data object Z1. The access restrictions 478 of the data object Z1 access control file is interpreted to determine whether the edit data access request type is restricted. When the data access request type is restricted, the data access request is rejected. When the data access request type is not restricted, the data access request to edit data object Z1 is processed.

FIG. 45B illustrates another example of the hierarchical data access control information 472 associated with the network memory 470 where each logical memory space may utilize one or more folders to store the data objects and the hierarchical data access control information 472 includes a plurality of sets of folder access control files. Each set of folder access control files is associated with a corresponding logical memory access control file, where a folder access control file of the set of folder access control files includes a list of data access restrictions 478 for users 474 of the logical memory access control file regarding data objects stored within a corresponding folder of the particular logical memory space. A sub-set of data object access control files of the set of data object access control files is associated with the folder access control file.

In an example of association of the hierarchical data access control information 472 and the network memory 470, the logical memory space A includes a folder 1 A that includes data objects A1-A3, a folder 2 A that includes other data objects, through a folder KA that includes still further data objects including data object Kn. When the logical memory space utilizes the one or more folders to store the data objects, the hierarchical data access control information 472 includes an access control file for each folder. For example, a folder 1 A access control file, a folder 2 A access control file, through a folder KA access control file is utilized for control of access to the logical memory space A in addition to the data object access control files. As a specific example, the folder 1 A access control file indicates that user AB has a further restriction and is not allowed to edit any data object associated with folder 1 A (e.g., data objects A1-A3 ).

FIG. 45C illustrates another example of the hierarchical data access control information 472 where the logical memory access control file is updated. Updating of the logical memory access control file includes one or more of adding a new user, deleting an older user, and editing access rights. As a specific example of adding a new user, a new user AX1 is added to the list of users 474 and corresponding access rights are added to the list of corresponding access rights 476 (e.g., R, W, E, L). As a specific example of deleting the older user, older user AC is deleted from the list of users 474 and corresponding access rights for user AC are deleted from the list of corresponding access rights 476. As a specific example of editing access rights, access rights for user MM are edited to remove a delete (D) data object access right to update the list of corresponding access rights 476. As another specific example of editing access rights, a new access right may be added to update the list of corresponding access rights 476. As such, the updating of the logical memory access control file may not require changes to associated data object access control files.

FIG. 45D illustrates another example of the hierarchical data access control information 472 where the data object access control file is updated by at least one of adding new data access restrictions or deleting data access restrictions. In an example of adding new data access restrictions, a new data access restriction to restrict editing (E) and deleting (D) of data object A1 is added to the data object A1 access control file in the list of data access restrictions 478 for user AA of the list of users 474 of the corresponding logical memory access A control file. In an example of deleting data access restrictions, an edit (E) data access restriction is deleted from the data object A1 access control file for user AB of the corresponding logical memory access A control file. As such, adding and deleting of restrictions does not impact the logical memory access control file.

FIG. 45E illustrates another example of the hierarchical data access control information 472 where a new data object is written and an older data object is deleted. In an example of deleting the older data object, a delete data object request is received from user device AA to delete data object A3, where user device AA has access rights to delete the older data object A3 (e.g., the logical memory access A control file indicates that user device AA has delete access rights and the data object A3 access control file indicates that there is no delete access type restriction for user device AA). When the user device AA has corresponding access rights to delete the data object A3, the data object A3 is deleted, the data object A3 access control file is deleted, and linking of the data object access A3 control file to the logical memory access A control file is deleted.

In an example of writing a new data object Kn+1, when user device AB has corresponding access rights to initially write the new data object into the particular logical memory space A, a data object access Kn+1 control file is created for the new data object Kn+1. The data object Kn+1 access control file includes a list of data access restrictions for one or more of the users of the list of users 474 of the logical memory access A control file. Next, the data object Kn+1 access control file is linked to the logical memory access A control file (e.g., represented by the dashed box). In an example of linking, the data object access control file in the logical memory access control file share a common vault identifier.

FIGS. 45F-I are schematic block diagrams of more embodiments of a dispersed storage network (DSN) that includes the user device 14, the distributed storage and task (DST) processing unit 16, the network 24, and a set of DST execution units 1-n of the DST execution units 36 of FIG. 1. The DST processing unit 16 includes the outbound DST processing module 80 and the inbound DST processing module 82 of FIG. 3.

In an example of operation, the user device 14 issues a data access request 480 to the DST processing unit 16. The data access request 480 includes a data access request type 484 (e.g., write, read, delete, list, edit), a data object identifier 486 of a data object, and a user identifier (ID) 482. In response to the data access request 480, the inbound DST processing module 82 accesses hierarchical logical access control information 492. The inbound DST processing module 82 sends the hierarchical logical access control information 492 to the outbound DST processing module 80. The hierarchical data access control information 492 includes a plurality of logical memory access control files and a plurality of sets of data object access control files. A logical memory access control file includes a list of users 474 that have access to a particular logical memory space and a list of corresponding access rights 476 to data stored within the particular logical memory space. A set of data object access control files is associated with the logical memory access control file, where a data object access control file of the set of data object access control files includes a list of data access restrictions for one or more of the users of the list of users 474 of the logical memory access control file.

In an example of accessing the hierarchical data access control information 492, the inbound DST processing module 82 issues a set of logical access control read slice requests 1-n 488 to the set of DST execution units 1-n, receives a set of logical access control slice responses 1-n 490, and decodes a decode threshold number of logical access control slices of the set of logical access control slice responses 1-n using a dispersed storage error coding function to reproduce the hierarchical logical access control information 492. Alternatively, the inbound DST processing module 82 retrieves the hierarchical logical access control information 492 from a local memory of the DST processing unit 16.

The inbound DST processing module 82 obtains one of the plurality of logical memory access control files based on the user identifier 482 from the hierarchical logical access control information 492. For example, the inbound DST processing module 82 obtains logical memory access A control file when the user ID 482 includes user AB. The inbound DST processing module 82 determines, from the one of the plurality of logical memory access control files, whether the data access request type is within the corresponding access rights of the user device.

For example, the inbound DST processing module 82 indicates that the data access request type is not within the corresponding access rights of user device AB when the data access request includes an access type 484 of delete.

When the data access request type is not within the corresponding access rights of the user device, the data access request is rejected and further processing of the data access request is ceased. For instance, the inbound DST processing module 82 issues a data access response 494 to the user device 14 (e.g., user device AB), where the data access response 494 includes a data access request rejection indicator.

As another example, the inbound DST processing module 82 indicates that the data access request type is within the corresponding access rights of the user device AB when the data access request includes an access type 484 of write. The example of accessing the hierarchical data access control information 492 is continued with reference to FIG. 45G.

The DSN further functions to maintain the hierarchical access control information 492 for data storage in the DSN. In an example of maintaining the hierarchical access control information, the inbound DST processing module 82 interprets the data access request 480 (e.g., a write request that includes a data object) to determine whether the data object corresponding to a data object identifier 486 of the data access request 480 is already stored in the set of DST execution units 1-n. For instance, the inbound DST processing module 82 attempts to access the data object from the set of DST execution units 1-n to determine whether the data object has already been stored. When the data object corresponding to the data object identifier is not stored in the set of DST execution units 1-n, the inbound DST processing module 82 accesses, based on the user identifier, the hierarchical data access control information 492 to retrieve logical memory access A control file when the user identifier 482 indicates that the user AA has requested the write data access request 480. The inbound DST processing module 82 determines, based on the logical memory access A control file, whether the user device AA has corresponding access rights to initially write the data object into the particular logical memory space A. For instance, the inbound DST processing module 82 indicates that the user device AA has the corresponding access rights to initially write the data object when access rights 476 of the logical memory access A control file indicates that user AA of users 474 has write access rights. The example to maintain the hierarchical access control information 492 is continued with reference to FIG. 45G.

FIG. 45G illustrates examples of operation continued. In the example of accessing the hierarchical logical access control information 492, when the data access request type is within the corresponding access rights of the user device, the inbound DST processing module 82 obtains a corresponding data object access control file 502 (e.g., data object A1 access control file) based on the data object identifier A1. A set of data object access control files is associated with the logical memory access A control file, where data object A1 access control file of the set of data object access control files includes a list of data access restrictions 478 for one or more of the users of the list of users 474 of the logical memory access A control file.

As a specific example, the inbound DST processing module 82 retrieves the corresponding data object access control file 502 from the set of DST execution units 1-n as a separate file. For instance, the inbound DST processing module 82 issues a set of data access control read slice requests 1-n 498 to the set of DST execution units 1-n, receives data access control slice responses 1-n 500, and decodes a decode threshold number of data access control slices of the received data access control slice responses 500 using a dispersed storage error coding function to reproduce the data object A1 access control file.

As another specific example, the inbound DST processing module 82 retrieves a first portion of the data object from the set of DST execution units 1-n, where the first portion includes the corresponding data object access control file. For instance, the inbound DST processing module 82 issues a set of read slice requests to the set of DST execution units 1-n, receives read slice responses, and decodes a decode threshold number of encoded data slices of the received read slice responses using the dispersed storage error coding function to reproduce the first portion (e.g., a first data segment of a plurality of data segments) of data object A1 that includes the data object A1 access control file.

Having obtained the corresponding data object access control file 502, the inbound DST processing module 82 determines, from the corresponding data object access control file, whether the data access request type is restricted. When the data access request type is restricted, the inbound DST processing module 82 issues a data access response 494 that includes a rejection indicator of the data access request. When the data access request type is not restricted, the DST processing unit 16 processes the data access request as is discussed with reference to FIGS. 45H-I.

In the example of maintaining the hierarchical data access control information 492, when storing a new data object and the user device has corresponding access rights to initially write the data object into the particular logical memory space, the outbound DST processing module 80 creates a data object access control file for the data object, where the data object access control file includes a list of data access restrictions for one or more of the users of the list of users of the logical memory access control file. The outbound DST processing module 80 stores the data object access control file. As a specific example, the outbound DST processing module 80 and decodes the data object access control file using a dispersed storage error coding function to produce a set of access control slices and issues a set of data access control write slice requests 496 to the set of DST execution units 1-n, where the set of data access control write slice requests 496 includes the set of access controls slices. The outbound DST processing module 80 links the data object access control file to the logical memory access control file. For example, the outbound DST processing module 80 generates a dispersed storage network (DSN) address for a storage location of the data object access control file, where the DSN address includes a common vault ID with the logical memory access control file.

FIGS. 45H-I illustrates examples of operation continued, where the data access request type is not restricted, the DST processing unit 16 processes the data access request. In particular, FIG. 45H illustrates an example of the operation continued where the data access request includes a write data access request. As a specific example, the outbound DST processing module 80 encodes a data object for storage using a dispersed storage error coding function to produce a plurality of sets of encoded data slices. The outbound DST processing module issues one or more sets of write data slice requests 1-n 504 to the set of DST execution units 1-n, where the one or more sets of write data slice requests 504 includes the plurality of sets of encoded data slices. The outbound DST processing module 80 receives sets of write data slice responses 1-n as write data slice responses 506. The outbound DST processing module 80 generates a data access response 494 based on the received write data slice responses 506. For example, the outbound DST processing module 80 generates the data access response 494 to indicate successful storage of the data object when at least a decode threshold number of favorable write data slice responses per set of write data slice responses 506 have been received. The outbound DST processing module 80 sends the data access response 494 to the user device 14.

FIG. 45I illustrates an example of the operation continued where the data access request includes a read data access request. As a specific example, the inbound DST processing module 82 issues one or more sets of read data slice requests 1-n 508 to the set of DST execution units 1-n, where the one or more sets of read data slice requests includes a plurality of sets of slice names corresponding to a data object for retrieval. The DST processing module 82 receives sets of data slices 1-n as data slices 510 from the set of DST execution units 1-n. The inbound DST processing module 82 decodes at least a decode threshold number of encoded data slices of each set of the data slices 510 to reproduce the data object. The inbound DST processing module 82 issues a data access response 494 to the user device 14, where the data access response 494 includes the data object.

FIG. 45J is a flowchart illustrating an example of utilizing data access control. The method begins at step 520 where a processing module (e.g., a dispersed storage (DS) processing module of a dispersed storage network (DSN)), in response to a data access request, accesses hierarchical data access control information. The data access request includes a data access request type, a data object identifier of a data object, and a user identifier. The hierarchical data access control information includes a plurality of logical memory access control files and a plurality of sets of data object access control files. Each logical memory access control file includes a list of users that have access to a particular logical memory space and a list of corresponding access rights to data stored within the particular logical memory space. Each set of data object access control files is associated with the logical memory access control file, where each data object access control file includes a list of data access restrictions for one or more of the users of the list of users of the logical memory access control file.

Alternatively, or in addition to, the hierarchical data access control information further includes a plurality of sets of folder access control files, where a set of folder access control files of the plurality of sets of folder access control files is associated with the logical memory access control file. A folder access control file of the set of folder access control files includes a list of data access restrictions for one or more of the users of the list of users of the logical memory access control file regarding data objects stored within a corresponding folder of the particular logical memory space. A sub-set of data object access control files of the set of data object access control files is associated with folder access control file.

The method continues at step 522 where the processing module obtains one of the plurality of logical memory access control files based on the user identifier from the hierarchical data access control information. For example, the processing module identifies a vault associated with the user identifier (e.g., a lookup) and retrieves the one of the plurality of logical memory access control files from at least one of a DSN memory and a local memory. The method continues at step 524 where the processing module determines whether the data access request type is within the corresponding access rights of the user device from the one of the plurality of logical memory access control files. For example, the processing module indicates that the data access request type is within the corresponding access rights of the user device when the access type is a list request type and access rights of the user device includes a list request type. When the data access request type is within the corresponding access rights of the user device, the method branches to step 528. When the data access request type is not within the corresponding access rights of the user device, the method continues to step 526. The method continues at step 526 where the processing module rejects the data access request and ceases further processing of the data access request when the data access request type is not within the corresponding access rights of the user device.

When the data access request type is within the corresponding access rights of the user device, the method continues at step 528 where the processing module obtains a corresponding data object access control file from a corresponding set of data object access files of the plurality of sets of data object access control files based on the data object identifier. As a specific example, the processing module receives a first portion of the data object from network memory, where the first portion includes the corresponding data object access control file. As another specific example, the processing module retrieves the corresponding data object access control file from the DSN memory as a separate file.

With the corresponding data object access control file obtained, the method continues at step 530 where the processing module determines, from the corresponding data object access control file, whether the data access request type is restricted. For example, the processing module indicates that the data access request type is restricted when the request type is a list request type and the data object access control file indicates that the user identifier of the request is requested for the list request type. When the data access request type is not restricted, the method branches to step 534. When the data access request type is restricted, the method continues to step 532. The method continues at step 532 where the processing module rejects the data access request when the data access request type is restricted. When the data access request type is not restricted, the method continues at step 534 where the processing module processes the data access request.

FIG. 45K is a flowchart illustrating an example of maintaining access control information for data storage. The method begins at step 536 where a processing module (e.g., a dispersed storage (DS) processing module of a dispersed storage network (DSN)) interprets a data access request (e.g., a write request) to determine whether a data object corresponding to a data object identifier of the data access request is stored in the DSN memory (e.g., attempt to access). The data access request includes a data access request type, the data object identifier, and a user identifier.

When the data object corresponding to the data object identifier is not stored in the DSN memory, the method continues at step 538 where the processing module accesses, based on the user identifier, hierarchical data access control information to retrieve a logical memory access control file of a plurality of logical memory access control files. The logical memory access control file includes a list of users that have access to a particular logical memory space of the network memory and a list of corresponding access rights to data stored within the particular logical memory space.

When the request type is a delete request, the method branches to step 548. When the request type is a write request, the method continues at step 540 where the processing module determines, based on the logical memory access control file, whether the user device has corresponding access rights to initially write the data object into the particular logical memory space. For example, the processing module interprets access rights from the logical memory access control file for the user device to indicate that the user device has write access rights.

When the user device has corresponding access rights to initially write the data object into the particular logical memory space, the method continues at step 542 where the processing module creates a data object access control file for the data object. The data object access control file includes a list of data access restrictions for one or more of the users of the list of users of the logical memory access control file. The processing module may obtain the list of data access restrictions from at least one of a user input, utilizing a data object access control file template, and receiving a manager input. Having created the data object access control file, the method continues at step 544 where the processing module stores the data object access control file. As a specific example, the processing module stores the data object access control file with the data object in the network memory (e.g., appended/replace a first data segment of a plurality of data segments of the data object). As another specific example, the processing module stores the data object access control file as a separate file in the network memory (e.g., encodes the separate file that includes a data object access control file to produce a set of data access control slices for storage in the network memory).

With the data object access control file stored, the method continues at step 546 where the processing module links the data object access control file to the logical memory access control file. As a specific example, the processing module links the data object access control file to a folder access control file of a set of folder access control files of a plurality of sets of folder access control files, wherein the set of folder access control files is associated with the logical memory access control file. The folder access control file includes a list of data access restrictions for one or more of the users of the list of users of the logical memory access control file regarding data objects stored within a corresponding folder of the particular logical memory space. A sub-set of data object access control files of the set of data object access control files is associated with the folder access control file.

When the data access request type is a delete the data object request and when the data object corresponding to the data object identifier is stored in the network memory, the method continues at step 548 where the processing module determines, based on the logical memory access control file, whether the user device has corresponding access rights to delete the data object. When the user device has corresponding access rights to delete the data object, the method continues at step 550 where the processing module deletes the data object access control file and the data object (e.g., issues delete slice requests to the network memory). The method continues at step 552 where the processing module deletes the linking of the data object access control file to the logical memory access control file.

FIG. 45L is a flowchart illustrating an example of updating a logical memory access control file. When the updating includes adding a user, the method begins at step 554 where a processing module (e.g., of a dispersed storage (DS) processing module) adds a new user to a list of users and adds new corresponding access rights to a list of corresponding access rights. As a specific example, the processing module retrieves the logical memory access control file from a dispersed storage network (DSN) memory, updates the logical memory access control file to include an identifier of the new user, and utilizes an access rights template to indicate corresponding access rights for the new user. Having updated the logical memory access control file, the processing module stores the updated logical memory access control file in the DSN memory.

When the updating includes deleting an older user, the method continues at step 556 where the processing module deletes the older user from the list of users and deletes the corresponding access rights from the list of corresponding access rights. As a specific example, the processing module retrieves the logical memory access control file, updates the logical memory access control file to delete an identifier of the older user, and removes the corresponding access rights from the logical memory access control file. Having updated the logical memory access control file, the processing module stores the updated logical memory access control file in the DSN memory.

When the updating includes editing access rights, the method continues at step 558 where the processing module edits corresponding access rights of a user device in the list of corresponding access rights. As a specific example, the processing module retrieves the logical memory access control file and edits access rights of the logical memory access control file that correspond to the user device. Having updated the logical memory access control file, the processing module stores the updated logical memory access control file in the DSN memory.

FIG. 45M is a flowchart illustrating an example of updating a data object access control file. When the updating includes adding restrictions, the method begins at step 560 where a processing module (e.g., of a dispersed storage (DS) processing module) adds new data access restrictions to a list of data access restrictions for one or more users of a list of users of a logical memory access control file, where the data object access control file includes the list of data access restrictions for the one or more of the users of the list of users of the logical memory access control file. As a specific example, the processing module retrieves the data object access control file from a dispersed storage network (DSN) memory and adds the new data access restrictions to the data object access control file with regards to the one or more of the users. Having updated the data object access control file, the processing module stores the updated data object access control file in the DSN memory.

When the updating includes adding restrictions to other users, the method continues at step 562 where the processing module adds the new data access restrictions to a list of data access restrictions for another one or more users of the list of users of the logical memory access control file. As a specific example, the processing module retrieves the data object access control file from the DSN memory and adds the new data access restrictions to the data object access control file with regards to the other one or more of the users. Having updated the data object access control file, the processing module stores the updated data object access control file in the DSN memory.

When the updating includes deleting data access restrictions, the method continues at step 564 where the processing module deletes one or more data access restrictions from the list of data access restrictions for the one or more of the users of the list of users of the logical memory access control file. As a specific example, the processing module retrieves the data object access control file from the DSN memory and deletes the one or more data access restrictions from the data object access control file with regards to the one or more of the users. Having updated the data object access control file, the processing module stores the updated data object access control file in the DSN memory.

FIG. 46A is a schematic block diagram of another embodiment of a distributed computing system that includes the distributed storage and task (DST) processing unit 16 and the distributed storage and task network (DSTN) module 22 of FIG. 1. The DST processing unit 16 functions to receive a data access request 480 from a requesting entity where the data access request includes a data identifier and a requester identifier (ID). The DST processing unit 16 outputs a vault slice access request 570 to the DSTN module 22, where the vault slice access request 570 includes an access type (e.g., read, write) and a vault DSTN address. The DST processing unit 16 receives a vault slice access response 572 that includes vault slices and vault DSTN addresses. The DST processing unit 16 decodes the vault slices to produce an access control list. The DST processing unit 16 authorizes the data access request 480 based on the access control list and the requester identifier. For example, the DST processing unit 16 indicates that the data access request 480 is favorably authorized when the requester identifier substantially matches a requester identifier associated with an extracted requester identifier of the access control list.

When favorably authorized, the DST processing unit 16 outputs a data slice access request 574 to the DSTN module 22 that includes an access type and a data DSTN address. The DST processing unit 16 receives a data slice access response 576 from the DSTN module 22 where the data slice access response includes data slices and data DSTN addresses. The DST processing unit 16 decodes the data slice access responses 576 to generate a data access response 494. The data access response 494 may include an access status, data, a data identifier, and a DSTN address. The access status includes at least one of a failed status indicator, a completed status indicator, an access denied indicator, and an access allowed indicator. For example, the data access response 494 includes forwarding the data slice access response 576 as a data access response to the requesting entity when the data access request is a write request. As another example, the data access response 494 includes decoding data slices of the data slice access response to produce data and generating the data access response 494 to include the data for transfer to the requesting entity. The method to process the data access request 480 is discussed in greater detail with reference to FIG. 46B.

FIG. 46B is a flowchart illustrating another example of providing access control to data. The method begins at step 578 where a processing module of a distributed storage and task (DST) client module receives a data access request (e.g., read, write) from a requesting entity. The method continues at step 580 where the processing module generates a set of vault slice access requests. The generating may be based on one or more of a data identifier, a requester identifier, and a lookup of a distributed storage and task network (DSTN) address associated with the vault. The method continues at step 582 where the processing module outputs the set of vault slice access requests to a DSTN module.

The method continues at step 584 where the processing module receives at least a decode threshold number of vault slice access responses. The method continues at step 586 where the processing module decodes the at least a decode threshold number of vault slice access responses to reproduce an access control list. The decoding includes decoding the vault slices using a dispersed storage error coding function to reproduce the access control list. The method continues at step 588 where the processing module authorizes the data access request using the access control list. When the data access request is favorably authorized, the method continues at step 590 where the processing module generates a plurality of sets of data slice access requests. The method continues at step 592 where the processing module outputs the plurality of sets of data slice access requests to the DSTN module. The method continues at step 594 where the processing module receives at least a decode threshold number of data slice access responses corresponding to each set of data slice access requests. The method continues at step 596 where the processing module interprets the at least a decode threshold number of data slice access responses to produce a data access response. The method continues at step 598 where the processing module outputs the data access response to the requesting entity.

FIG. 47A is a schematic block diagram of another embodiment of a distributed computing system that includes the distributed storage and task (DST) processing unit 16 of FIG. 1, a DST execution unit 36 of FIG. 1, and a plurality of storage nodes 600 (e.g., a dispersed storage unit, a DST execution unit, a storage server, a memory device). The DST execution unit 36 includes a DST client module 34 and a memory device 88. The DST execution unit 36 is assigned a portion of a distributed storage and task network (DSTN) address range. Each of the memory device 88 and the plurality of storage nodes 600 is assigned a some portion of the portion of the DSTN address range.

The DST processing unit 16 outputs a data slice access request 602 to the DST execution unit 36 that includes an access type (e.g., read, write) and a DSTN address of the portion of the DSTN address range (e.g., a slice name corresponding to the DST execution unit 36). The DST client module 34 receives the data slice access request 602 and identifies the at least one of the memory device 88 and the plurality of storage nodes 600 associated with the DSTN address of the request. When the DSTN address of the request is associated with the memory device 88, the DST client module 34 accesses DSTN address range 1 slices associated with the memory device 88.

When the DSTN address of the request is associated with one storage node 600 of the plurality of storage nodes, the DST client module 34 identifies a storage protocol associated with the one storage node 600 (e.g., based on at least one of a lookup, and a query). The storage protocol enables storage of encoded data slices as raw data and may operate in accordance with an industry-standard including one or more of network file system (NFS), common Internet file system (CIFS), flash file system (FFS), disk file system (DFS), file transfer protocol (FTP), web-based distributed authoring and versioning (WebDAV), small computer system interface (SCSI), and internet small computer system interface (iSCSI). The DST client module 34 accesses slices associated with the one storage node 600 utilizing the identified storage protocol. For example, the DST client module 34 accesses DSTN range 2 slices stored in a first storage node 600 of the plurality of storage nodes utilizing the NFS storage protocol when the NFS storage protocol is the identified storage protocol. As another example, the DST client module 34 accesses DSTN range 3 slices stored in a second storage node 600 of the plurality of storage nodes utilizing the FTP storage protocol when the FTP storage protocol is the identified storage protocol. The DST client module 34 generates a data slice access response 604 that includes at least one of data slices and a data DSTN address based on accessing the at least one of the memory device 88 and the plurality of storage nodes 600. The DST client module 34 outputs the data slice access response 604 to the DST processing unit 16. The method to access the slices is discussed in greater detail with reference to FIG. 47B.

FIG. 47B is a flowchart illustrating an example of providing access to data. The method begins at step 606 where a processing module of a distributed storage and task (DST) client module receives a data slice access request that includes a distributed storage and task network (DST) address. The method continues at step 608 where the processing module identifies an independent storage node associated with the DSTN address. The identifying may include at least one of receiving an identity, initiating a query, and performing a lookup. The method continues at step 610 where the processing module identifies an access protocol associated with the identified independent storage node. The identifying may include at least one of receiving an identity, initiating a query, and performing a lookup.

The method continues at step 612 where the processing module generates an independent storage node access request in accordance with the access protocol based on the data slice access request. The generating includes translating the data slice access request into the storage node access request in accordance with the access protocol. The generating may be based on one or more of a translation table lookup, a translation algorithm, outputting a translation request, and receiving a translation response. The method continues at step 614 where the processing module outputs the independent storage node access request in accordance with the access protocol to the identified independent storage node. The method continues at step 616 where the processing module receives an independent storage node access response.

The method continues at step 618 where the processing module interprets the independent storage node access response. The interpreting includes translating the access response to produce response information for generation of a data slice access response. The interpreting may further include one or more of utilizing an interpreting table, utilizing an interpreting algorithm, outputting an interpretation request, and receiving an interpretation response. The method continues at step 620 where the processing module generates a data slice access response based on the interpreted independent storage node access response. For example, the processing module extracts an encoded data slice from the independent storage node access response and generates a read slice response as the data slice access response that includes encoded data slice. The method continues at step 622 where the processing module outputs the data slice access response to a requesting entity.

FIGS. 48A-D are schematic block diagrams of another embodiment of a dispersed storage network (DSN) illustrating example steps of processing an unsuccessful write request. The DSN includes the distributed storage and task (DST) processing unit 16, the network 24, the DST integrity processing unit 20, and a set of DST execution units 1-5 of the DST execution units 36 of FIG. 1 and the DSN further includes an auxiliary write unit 630. The DST processing unit 16 includes the outbound DST processing module 80 of FIG. 3. The auxiliary write unit 630 includes a processing module 632.

FIG. 48A illustrates example first steps of processing the unsuccessful write request, where the outbound DST processing module 80 dispersed storage error encodes data segments of data to produce sets of encoded data slices and issues, via the network 24, write requests to the set of DST execution units 1-5. The write requests may include issuing multiple phases of messages and each write request includes one or more encoded data slices of the sets of encoded data slices. As a specific example, a first phase write message includes write slice requests 634 that includes one or more sets of write slice requests 1-5. Each write slice request 634 includes one or more of a transaction number identifier 636 (e.g., common to each of the multiple phases), one or more encoded data slices 642 (e.g., slices of a common pillar from multiple sets of slices), corresponding slice names 638 for the one or more encoded data slices, and a corresponding slice revision 640 of the one or more encoded data slices. At least a threshold number (e.g., a decode threshold number) of encoded data slices of a set of encoded data slices is required to reproduce a corresponding data segment.

Available and operational DST execution units issue write slice responses 644, via the network 24, to the DST processing unit 16. Each write slice response 644 indicates a status 648 corresponding to each of the one or more encoded data slices number 646. The status 648 includes at least one of a succeeded indicator (e.g., indicating a successful write slice request operation) and an error indicator (e.g., indicating an unsuccessful write slice request operation).

The outbound DST processing module 80 indicates a no response status when a write slice response has not been received from an associated DST execution unit within a response timeframe. For instance, the outbound DST processing module 80 indicates that a response has not been received from DST execution unit 2 for slice number 2 when the DST execution unit 2 is unavailable.

FIG. 48B illustrates example next steps of processing the unsuccessful write request, where the outbound DST processing module 80 determines that a threshold number (e.g., a write or decode threshold number) of write slice responses 644 are associated with the succeeded status. When the threshold number of write slice response 644 are associated with the succeeded status, the outbound DST processing module 80 generates a second phase commit write messages that includes the transaction number identifier 636 of the write slice requests 634 and a commit command (e.g., a commit transaction request type indicator). The outbound DST processing module 80 sends commit transaction requests 650 of the second phase commit write messages to DST execution units associated with the threshold number of succeeded status write slice responses 644. For example, the outbound DST processing module 80 identifies DST execution units 1, 3, and 5 associated with succeeded write slice response status. Next, the outbound DST processing module 80 generates the commit transaction request 650 to include the transaction number identifier 636. Having generated the commit transaction request 650, the outbound DST processing module 80 sends the commit transaction request 650 as commit transaction requests 1, 3, and 5 to DST execution units 1, 3, and 5. The outbound DST processing module 80 receives commit transaction response 652 from the DST execution units.

For example, the outbound DST processing module 80 receives commit transaction responses 1, 3, and 5 from DST execution units 1, 3, and 5.

Having received the commit transaction responses 652, the outbound DST processing module 80 determines whether a number of successful write requests of a set of write requests is equal to or greater than a threshold number (e.g., write or decode threshold) but less than all. For example, the outbound DST processing module 80 determines that the number of successful write requests is equal to a decode threshold number of three when three write slice responses 644 indicated the succeeded status and when three favorable commit transaction responses 652 were received, and the outbound DST processing module 80 determines that less than all of the write requests were successful when the write slice response associated with slice 2 was interpreted as no response and an error status was received associated with slice 4 of the set of slices.

When the number of successful write requests of the set of write requests is equal to or greater than the threshold number but less than all, the outbound DST processing module 80 identifies one or more unsuccessful write requests (e.g., a write slice requests 634, commit transaction requests 650) of the set of write requests. For example, the outbound DST processing module 80 identifies a write request 2 for DST execution unit 2 and a write request 4 for DST execution unit 4 as the one or more unsuccessful write requests.

FIG. 48C illustrates example next steps of processing the unsuccessful write request, where the outbound DST processing module 80 issues, in response to the acknowledgment of the second phase commit write messages where the threshold number of commit responses were received, third phase finalize write messages. For example, the outbound DST processing module 80 issues finalize transaction request 654 to include finalize transaction requests 1, 3, and 5 to the DST execution units 1, 3, and 5. Each finalize transaction request 654 includes the one or more slice names 638 corresponding to the one or more encoded data slices and the one or more slice revision 640 corresponding to the one or more encoded data slices.

The outbound DST processing module 80 sends the one or more unsuccessful write requests to the processing module 632 of the auxiliary writing unit 630. For example, the outbound DST processing module 80 issues a delayed write sequence request 656 to the processing module 632. The delayed write sequence request 656 includes, for the unsuccessful write request 2, the encoded data slice 2, the slice name for slice 2, and the slice revision for slice 2. The delayed write sequence request 656 includes, for the unsuccessful write request 4, an encoded data slice 4, a slice name for slice 4, and a slice revision for slice 4.

The processing module 632 sends a delayed write indicator 658 (e.g., a message) to the DST integrity processing unit 20 (e.g., a rebuilder unit) indicating that the auxiliary writing unit 630 is processing writing of encoded data slices of the one or more sets of encoded data slices associated with the one or more unsuccessful write requests to DST execution units (e.g., storage units of the DSN).

FIG. 48D illustrates example final steps of processing the unsuccessful write request, where for an unsuccessful write request of the one or more unsuccessful write requests, the processing module 632 identifies a DST execution unit to produce an identified DST execution unit. As a specific example, the processing module 632 identifies, when the unsuccessful write request was unsuccessful due to DST execution unit 2 being unavailable (e.g., off-line, performing a software update, network outage, message corruption, processing error etc.), the DST execution unit 2 as the identified DST execution unit when the DST execution unit 2 becomes available (e.g., the processing module 632 receives an availability message, interprets an error message, etc). As another specific example, the processing module 632 identifies, when the unsuccessful write request was unsuccessful due to the DST execution unit 2 being unavailable, another DST execution unit X (e.g., a spare storage unit) as the identified DST execution unit.

Having identified the identified DST execution unit, the processing module 632 sends the unsuccessful write request to the identified DST execution unit 2 as write sequence requests 660 (e.g., to DST execution unit 2 or to DST execution unit X). The processing module 632 may send the write sequence request 660 as a single message that includes a first phase write message, a second phase commit write message, and a third phase finalize write message. The first phase write message (e.g., write slice request 634) includes the one or more encoded data slices (e.g., slice 2), corresponding slices names (e.g., slice name for slice 2, slice revision for slice 2) for the one or more encoded data slices, and a new transaction number identifier 664. The second phase commit write message (e.g., commit transaction request 650) includes a commit command and the new transaction identifier 664. The third phase finalize write message (e.g., finalize transaction request 654) includes the slice name for slice 2 and the slice revision for slice 2.

The processing module 632 receives one or more write sequence responses 662 from the identified DST execution unit. The one or more write sequence response 662 includes one or more of a write slice response, a commit transaction response, and a finalize transaction response. The processing module 632 verifies successful execution of the unsuccessful write request by the identified DST execution unit. As a specific example, the processing module 632 indicates that the execution of the unsuccessful write request is successful when a favorable write slice request and a favorable commit transaction request have been received from the identified DST execution unit. When the identified DST execution unit successfully executes the unsuccessful write request, the processing module 632 may notify the DST processing unit 16 of the successful writing of the unsuccessful write request by the identified DST execution unit by issuing a successful writing notification 666.

The processing module 632, for a second unsuccessful write request (e.g., write slice request 4) of the one or more unsuccessful write requests, identifies a second storage unit (e.g., DST execution unit 4) of the DSN to produce a second identified storage unit. The processing module 632 sends the second unsuccessful write request to the second identified storage unit and verifies successful execution of the second unsuccessful write request by the second identified storage unit.

FIG. 48E is a flowchart illustrating an example of processing an unsuccessful write request. The method begins at step 670 where a dispersed storage (DS) processing module (e.g., of a first device of a dispersed storage network (DSN)), when a number of successful write requests of a set of write requests is equal to or greater than a threshold number (e.g., write or decode threshold) but less than all, identifies one or more unsuccessful write requests of the set of write requests. The set of write requests is regarding writing one or more sets of encoded data slices to storage units of the DSN. A write request of the set of write requests includes one or more encoded data slices of the one or more sets of encoded data slices. A set of encoded data slices of the one or more sets of encoded data slices is a dispersed storage error encoded representation of a data segment of data, where at least the threshold (e.g., decode threshold) number of encoded data slices of the set of encoded data slices is required to reproduce the data segment.

The write request may further include three phases. As a specific example, the write request includes a first phase write message that includes the one or more encoded data slices, corresponding slices names for the one or more encoded data slices, and a transaction number. In response to an acknowledgement of the first phase write message, the write request further includes a second phase commit write message that includes the transaction number and a commit command. In response to an acknowledgement of the second phase commit write message, the write request further includes a third phase finalize write message.

The method continues at step 672 where the DS processing module of the first device sends the one or more unsuccessful write requests (e.g., content of the write requests) to a processing module of an auxiliary writing unit of the DSN. The method continues at step 674 where the processing module of the auxiliary writing unit sends a message to a rebuilder unit indicating that the auxiliary writing unit is processing writing of encoded data slices of the one or more sets of encoded data slices associated with the one or more unsuccessful write requests to storage units of the DSN.

For an unsuccessful write request of the one or more unsuccessful write requests, the method continues at step 676 where the processing module of the auxiliary writing unit identifies a storage unit of the DSN to produce an identified storage unit. As a specific example, the processing module identifies, when the unsuccessful write request was unsuccessful due to a particular storage unit of the DSN being unavailable (e.g., off-line, performing a software update, network outage, message corruption, processing error etc.), the particular storage unit as the identified storage unit when the particular storage unit becomes available (e.g., the processing module receives an availability message, interprets an error message, etc). As another specific example, the processing module identifies, when the unsuccessful write request was unsuccessful due to the particular storage unit of the DSN being unavailable, another storage unit (e.g., a spare storage unit) of the DSN as the identified storage unit.

The method continues at step 678 where the processing module of the auxiliary writing unit sends the unsuccessful write request to the identified storage unit. As a specific example, the processing module sends a single message that includes a first phase write message that includes the one or more encoded data slices, corresponding slices names for the one or more encoded data slices, and a new transaction number; a second phase commit write message that includes a commit command; and a third phase finalize write message. The method continues at step 680 where the processing module of the auxiliary writing unit verifies successful execution of the unsuccessful write request by the identified storage unit (e.g., based on a response). When the identified storage unit successfully executes the unsuccessful write request, the method continues at step 682 where the processing module of the auxiliary writing unit notifies the first device of the successful writing of the unsuccessful write request by the identified storage unit.

For a second unsuccessful write request of the one or more unsuccessful write requests, the method continues at step 684 where the processing module of the auxiliary writing unit identifies a second storage unit of the DSN to produce a second identified storage unit. The method continues at step 686 where the processing module of the auxiliary writing unit sends the second unsuccessful write request to the second identified storage unit. The method continues at step 688 where the processing module of the auxiliary writing unit verifies successful execution of the second unsuccessful write request by the second identified storage unit.

FIG. 49A is a schematic block diagram of another embodiment of a distributed computing system that includes the user device 12, the distributed storage and task (DST) execution unit 36, and a plurality of other DST execution units 36 of FIG. 1. The DST execution unit 36 includes the DST client module 34 and the memory device 88 of FIG. 3. The DST execution unit 36 is assigned a portion of a distributed storage and task network (DSTN) address range. Each of the memory device 88 and the plurality of other DST execution units 36 is assigned a some portion of the portion of the DSTN address range (e.g., different pillars of a common set of slices).

The user device 12 outputs a data access request 480 to the DST execution unit 36 that includes an access type (e.g., read, write) and a data identifier (ID) associated with data stored at least one of the memory device 88 and the plurality of other DST execution units 36. The DST client module 34 processes the data access request 480 to generate corresponding slice access requests (e.g., including slice names corresponding to the data) for the plurality of other DST execution units 36. The DST client module 34 outputs the corresponding slice access requests to the other DST execution units 36. The DST client module 34 accesses the memory device 88 for slices associated with the memory device 88. The DST client module 34 generates a data access response 494 based on responses from the plurality of other DST execution units 36 and the access of the memory device 88. The DST client module 34 outputs the data access response 494 to the user device 12. The method to access the data is discussed in greater detail with reference to FIG. 49B.

FIG. 49B is a flowchart illustrating another example of providing access to data. The method begins at step 690 where a processing module of a distributed storage and task (DST) client module receives a data access request to access data. For a data segment of a plurality of data segments of the data, the method continues at step 692 where the processing module generates n−1 slice access requests based on the data access request to access n−1 encoded data slices of a set of encoded data slices associated with the data segment. The method continues at step 694 where the processing module outputs the n−1 slice access requests to n−1 DST execution units.

The method continues at step 696 where the processing module accesses another encoded data slice of the set of encoded data slices via a memory device based on the data access request to produce an access result. The accessing includes identifying the memory device based on a slice name associated with the other encoded data slice, reading the memory device for a read data access, and writing a slice to the memory device for a write data access.

The method continues at step 698 where the processing module receives a plurality of slice access responses (e.g., read response, write response) from the n−1 DST execution units. The method continues at step 700 where the processing module interprets the plurality of slice access responses and the access result to produce and access interpretation. The interpreting includes extracting slices for read slice responses and decoding a decode threshold number of slices from the access result and the plurality of received slices to reproduce a data segment. The interpreting further includes extracting write status for write slice responses.

The method continues at step 702 where the processing module generates a data access response based on the access interpretation. The generating includes aggregating a plurality of decoded data segments to produce the data access response. The generating may further include compiling a plurality of write status responses. The method continues at step 704 where the processing module outputs the data access response to a requesting entity.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more devices of a dispersed storage network (DSN), the method comprises:
   when a number of successful write requests of a set of write requests is equal to or greater than a threshold number but less than all, identifying, by a first device of the DSN, one or more unsuccessful write requests of the set of write requests, wherein the set of write requests is regarding writing one or more sets of encoded data slices to storage units of the DSN, wherein a write request of the set of write requests includes one or more encoded data slices of the one or more sets of encoded data slices, wherein a set of encoded data slices of the one or more sets of encoded data slices is a dispersed storage error encoded representation of a data segment of data, and wherein at least a threshold number of encoded data slices of the set of encoded data slices is required to reproduce the data segment;
   sending, by the first device, the one or more unsuccessful write requests to an auxiliary writing unit of the DSN; and
   for an unsuccessful write request of the one or more unsuccessful write requests:
      identifying, by the auxiliary writing unit, a storage unit of the DSN to produce an identified storage unit;
      sending, by the auxiliary writing unit, the unsuccessful write request to the identified storage unit; and
      verifying, by the auxiliary writing unit, successful execution of the unsuccessful write request by the identified storage unit.

2. The method of claim 1 further comprises:
   when the unsuccessful write request was unsuccessful due to a particular storage unit of the DSN being unavailable, identifying, by the auxiliary writing unit, the particular storage unit as the identified storage unit when the particular storage unit becomes available.

3. The method of claim 1 further comprises:
   when the unsuccessful write request was unsuccessful due to a particular storage unit of the DSN being unavailable, identifying, by the auxiliary writing unit, another storage unit of the DSN as the identified storage unit.

4. The method of claim 1, wherein the write request further comprises:
   a first phase write message that includes the one or more encoded data slices, corresponding slices names for the one or more encoded data slices, and a transaction number;
   in response to an acknowledgement of the first phase write message, the write request further includes a second phase commit write message that includes the transaction number and a commit command; and
   in response to an acknowledgement of the second phase commit write message, the write request further includes a third phase finalize write message.

5. The method of claim 1, wherein the sending the unsuccessful write request to the identified storage unit comprises:
   sending as a single message:
      a first phase write message that includes the one or more encoded data slices, corresponding slices names for the one or more encoded data slices, and a transaction number;
      a second phase commit write message that includes a commit command; and
      a third phase finalize write message.

6. The method of claim 1 further comprises:
   when the identified storage unit successfully executes the unsuccessful write request, notifying, by the auxiliary writing unit, the first device of successful writing of the unsuccessful write request by the identified storage unit.

7. The method of claim 1 further comprises:
   sending, by the auxiliary writing unit, a message to a rebuilder unit indicating that the auxiliary writing unit is processing writing of encoded data slices of the one or more sets of encoded data slices associated with the one or more unsuccessful write requests to the storage units of the DSN.

8. The method of claim 1 further comprises:
   for a second unsuccessful write request of the one or more unsuccessful write requests:
      identifying, by the auxiliary writing unit, a second storage unit of the DSN to produce a second identified storage unit;
      sending, by the auxiliary writing unit, the second unsuccessful write request to the second identified storage unit; and
      verifying, by the auxiliary writing unit, successful execution of the second unsuccessful write request by the second identified storage unit.

9. A dispersed storage network (DSN) comprises:
   a dispersed storage processing module, when operable within a first device of the DSN, causes the first device to:
      when a number of successful write requests of a set of write requests is equal to or greater than a threshold number but less than all, identify one or more unsuccessful write requests of the set of write requests, wherein the set of write requests is regarding writing one or more sets of encoded data slices to storage units of the DSN, wherein a write request of the set of write requests includes one or more encoded data slices of the one or more sets of encoded data slices, wherein a set of encoded data slices of the one or more sets of encoded data slices is a dispersed storage error encoded representation of a data segment of data, and wherein at least a threshold number of encoded data slices of the set of encoded data slices is required to reproduce the data segment; and
      send the one or more unsuccessful write requests to an auxiliary writing unit of the DSN; and a processing module, when operable within the auxiliary writing unit, causes the auxiliary writing unit to:
for an unsuccessful write request of the one or more unsuccessful write requests:
identify a storage unit of the DSN to produce an identified storage unit;
send the unsuccessful write request to the identified storage unit; and
verify successful execution of the unsuccessful write request by the identified storage unit.

10. The DSN of claim 9 further comprises:
the processing module, when operable within the auxiliary writing unit, further causes the auxiliary writing unit to:
when the unsuccessful write request was unsuccessful due to a particular storage unit of the DSN being unavailable, identify the particular storage unit as the identified storage unit when the particular storage unit becomes available.

11. The DSN of claim 9 further comprises:
the processing module, when operable within the auxiliary writing unit, further causes the auxiliary writing unit to:
when the unsuccessful write request was unsuccessful due to a particular storage unit of the DSN being unavailable, identify another storage unit of the DSN as the identified storage unit.

12. The DSN of claim 9, wherein the write request further comprises:
a first phase write message that includes the one or more encoded data slices, corresponding slices names for the one or more encoded data slices, and a transaction number;
in response to an acknowledgement of the first phase write message, the write request further includes a second phase commit write message that includes the transaction number and a commit command; and
in response to an acknowledgement of the second phase commit write message, the write request further includes a third phase finalize write message.

13. The DSN of claim 9, wherein the processing module functions to send the unsuccessful write request to the identified storage unit by:
sending as a single message:
a first phase write message that includes the one or more encoded data slices, corresponding slices names for the one or more encoded data slices, and a transaction number;
a second phase commit write message that includes a commit command; and
a third phase finalize write message.

14. The DSN of claim 9 further comprises:
the processing module, when operable within the auxiliary writing unit, further causes the auxiliary writing unit to:
when the identified storage unit successfully executes the unsuccessful write request, notify the first device of successful writing of the unsuccessful write request by the identified storage unit.

15. The DSN of claim 9 further comprises:
the processing module, when operable within the auxiliary writing unit, further causes the auxiliary writing unit to:
send a message to a rebuilder unit indicating that the auxiliary writing unit is processing writing of encoded data slices of the one or more sets of encoded data slices associated with the one or more unsuccessful write requests to the storage units of the DSN.

16. The DSN of claim 9 further comprises:
the processing module, when operable within the auxiliary writing unit, further causes the auxiliary writing unit to:
for a second unsuccessful write request of the one or more unsuccessful write requests:
identify a second storage unit of the DSN to produce a second identified storage unit;
send the second unsuccessful write request to the second identified storage unit; and
verify successful execution of the second unsuccessful write request by the second identified storage unit.

* * * * *